United States Patent [19]

Pike et al.

[11] Patent Number: 5,623,666
[45] Date of Patent: Apr. 22, 1997

[54] DISTRIBUTED COMPUTING SYSTEM

[75] Inventors: Robert C. Pike, Basking Ridge; Kenneth L. Thompson, Watchung, both of N.J.

[73] Assignee: Lucent Technologies Inc., Murray Hill, N.J.

[21] Appl. No.: 443,650

[22] Filed: May 18, 1995

Related U.S. Application Data

[63] Continuation of Ser. No. 237,967, May 3, 1994, abandoned, which is a continuation of Ser. No. 702,651, May 17, 1991, abandoned, which is a continuation-in-part of Ser. No. 551,218, Jul. 11, 1990, abandoned.

[51] Int. Cl.$^6$ .................................................. G06F 9/44
[52] U.S. Cl. .................................................. 395/616
[58] Field of Search ................................................ 395/700

[56] References Cited

U.S. PATENT DOCUMENTS

| | | | |
|---|---|---|---|
| 4,525,780 | 6/1985 | Bratt et al. | 395/425 |
| 4,853,843 | 8/1989 | Ecklund | 395/600 |
| 5,032,979 | 7/1991 | Hecht et al. | 395/600 |
| 5,060,150 | 10/1991 | Simor | 395/325 |
| 5,237,680 | 8/1993 | Adams et al. | 364/DIG. 1 |

OTHER PUBLICATIONS

Pike, R., "A Concurrent Window System", Computing Systems, vol. 2, No. 2, Spring 1989, U. of CA Press, Berkeley, CA.

Pike, R., Thompson, K., "Position Paper for IEEE Workshop on Operating Systems", Proc. Workshop on Workstation Operating Systems, IEEE Computer Society, Nov. 5–6, 1987, Cambridge, MA.

Presotto, David, "Plan 9 from Bell Labs –The Network"; UKUUC Proc. of the Spring 1988 Conf., London, England (Apr., 1988).

Tanenbaum, et al., "Distributed Operating System", Computing Surveys, vol. 17, No. 4, Dec. 1985.

Mullender, et al., "Amoeba—A Distributed Operating System for the 1990s", IEEE Comp. Magazine, May, 1990.

Comer, et al., "An Experimental Implementation of the Tilde Naming System", Comp. Systems, vol. 3, No. 4, Fall, 1990, pp. 487–515.

Cabrera, et al., "Quick Silver Distributed File Services: An Architecture for Horizontal Growth", CH2441–4/88/0000/0023, IEEE, 1988.

R. Pike, et al. "Plan 9 from Bell Labs" Proc. Summer 1990, UKUUG Conference, Longon, Jul. 9–13, 1990.

*Primary Examiner*—Thomas M. Heckler
*Attorney, Agent, or Firm*—Gordon E. Nelson

[57] ABSTRACT

An operating system which is particularly adapted to heterogenous distributed systems. Entities available to a process running in the operating system are provided by services. Each service models its entity as a set of files. The entity is controlled by performing operations on the set of files provided by the entity. Services other than those provided by the operating system all employ the same protocol specifying operations on files. The only requirement placed on a service by the operating system is that it be able to accept and respond to messages employing the protocol. The files are named, and the operating system provides a plurality of name spaces, relates each process to one of the name spaces, and permits any process to modify its name space or to create a new name space. Services are disclosed which provide each process using the service with its own set of the service's files and which provide files belonging to one process's namespace to another process executing on a different processor.

21 Claims, 15 Drawing Sheets

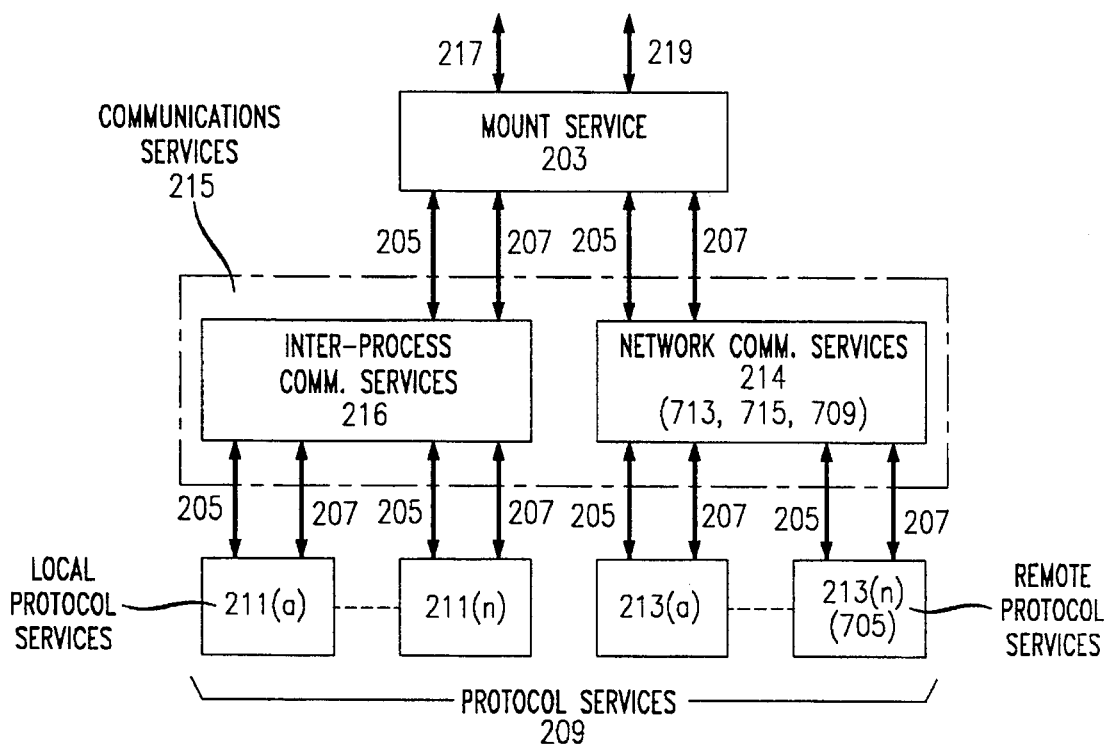

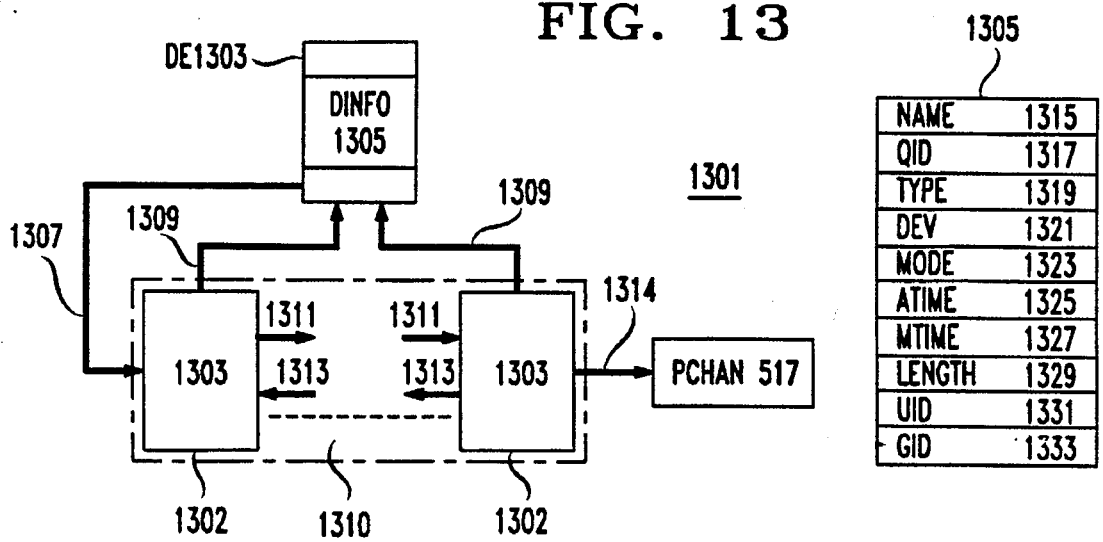
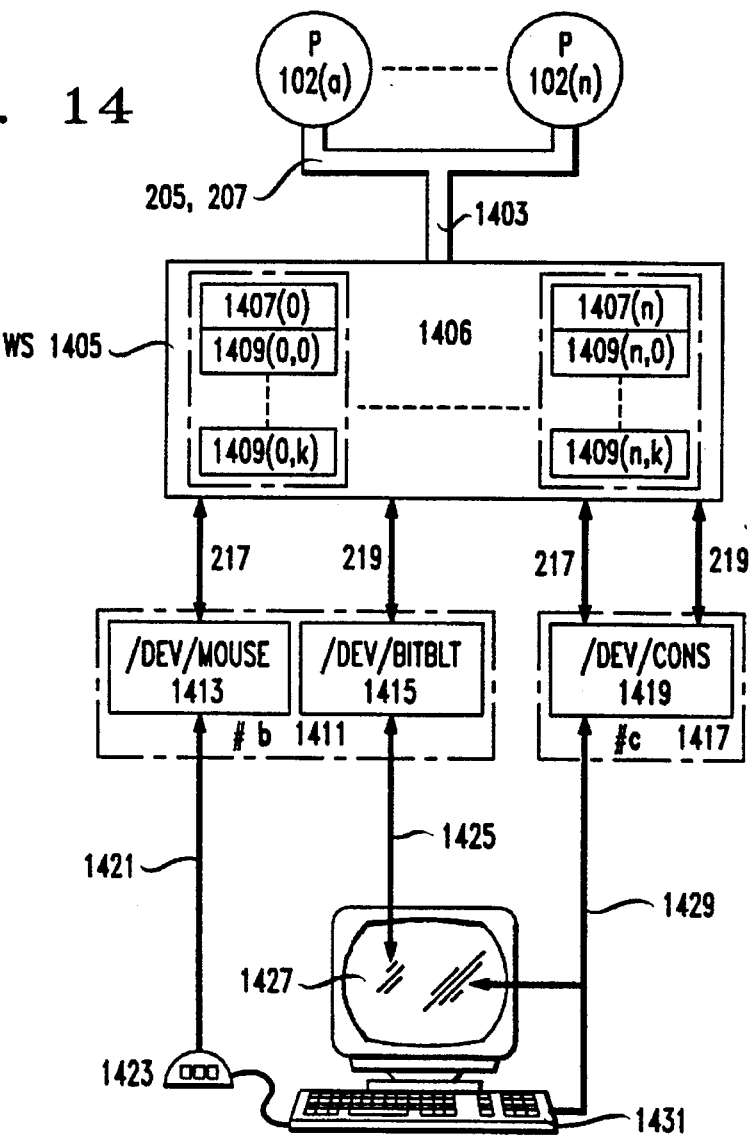

DISTRIBUTED COMPUTING SYSTEM

CROSS REFERENCE TO RELATED APPLICATION

This application is a continuation of application Ser. No. 08/237,967, filed on May 3, 1994, abandoned, which is a continuation of application Ser. No. 07/702,651, filed on May 17, 1991, now abandoned, which is a continuation-in-part of Ser. No. 07/551,218 filed on Jul. 11, 1990 abandoned

BACKGROUND OF THE INVENTION

1. Field of the Invention

The inventions disclosed herein relate generally to computing systems and more specifically to distributed computing systems, i.e., computing systems in which components of the system are connected by communications media.

2. Description of the Prior Art

Many of the entities available to a program executing on a computer system have names, i.e., identifiers which are not addresses but which may nevertheless be used by a program to locate the entity specified by the identifier. The computer system's operating system includes components which permit the user to name entities, which keep track of the relationships between names and entities, and which permit the user to locate the entity by means of its name.

Files are common examples of such named entities. The file system component of the operating system permits the user to give a file a character-string name and to locate the file using the character-string name. Other named entities may be devices such as terminals or printers. The set of names which a program may use to locate entities is termed the *name space* in which the program executes. The operating system determines how the name space is organized. In some cases, the name space is flat, that is, all names are on a single level. In other cases, the operating system organizes the names into hierarchies. A common form of hierarchical organization is the single tree. All of the names in the name space are organized into a tree with a single root. Names at interior nodes of the tree represent directories; names at leaf nodes represent ordinary entities. To locate an entity or directory in such a tree, a program specifies the name of the entity or directory and the names of all of the directories between the root of the tree and the entity or directory or the name of the entity or directory and the names of all of the directories between the process's current directory and the entity or directory. The combination of names necessary to locate the entity is termed the entity's *path name*.

In the past, name spaces have generally been per-system. Any program operating on a system could locate any named entity in the system. An example of such a per-system name space is that provided by a computer running the well-known UNIX™ operating system. All of the files provided by the UNIX operating system are organized into a single tree, and a program may locate any file in the system by specifying the file's path name in the tree. An advantage of this form of organization was that entities used by all programs, such as the executable code for the operating system or other utilities, could be made available to all programs by putting them in at predetermined places in the name space. Indeed, if two systems shared the same naming conventions for those predetermined places, a program which executed on one UNIX system would execute on another. For example, in UNIX systems, commonly-used utility programs are generally kept in the directory which is accessible by the path name/bin.

Originally, computer systems were independent entities. They could be connected by communications media, but the connected systems did not form a single system. As communications media have improved and the price of processors and memory have dropped, distributed computer systems have arisen. In these systems, a set of processors, display devices, and file storage devices which are connected by communications media form a single system. An advantage of a distributed system is that there is no logical limit to system size. While current distributed systems typically consist of a set of work stations which are connected via a local area network to each other and to a file server, i.e., a file storage device with a processor which is specialized to perform file operations, there is no reason why every work station, processor, file storage device, display device, and printer in a large corporation could not be part of a single distributed system.

One problem in the design of distributed systems is how to define the name space. One approach, exemplified in the Amoeba distributed system, is to simply ignore the problem. In the Amoeba system, described in Mullender, et al., Amoeba-A Distributed Operating System for the 1990's, *IEEE Computer*, May, 1990, the operating system does not define a name space. Instead, the system may include components called name servers. A name server defines a name space. When a process presents the name of an entity to the name server which defines the name space to which the name belongs, the name server returns the address of the entity in the distributed system and a capability which permits access to the entity. The process can then use the address and the capability to access the named entity. As may be seen from the foregoing, name space definition in the Amoeba system is left completely to the name servers.

Where operating systems have defined name spaces, several approaches have been taken. The approaches are explained in more detail in Comer, Droms, and Murtagh, An Experimental Implementation of the Tilde Naming System, *Computing Systems*, vol. 3, no. 4, University of California Press, Berkeley, Calif., 1991, pp. 487–515. One approach is to include all of the names in the distributed system in a single system-wide hierarchy of names. In some cases, the hierarchy of names includes the names of the system components upon which the entities represented by the names are located. One difficulty with this approach is the sheer size of the name space. A typical program uses only a few names, yet programs and users must deal with an enormous hierarchy. Further, where system component names are included in the hierarchy, a user or program must know which component has the entity he is looking for. Obviously, the magnitude of these difficulties increases as the size of the distributed system increases.

The problem of size has been dealt with by subdividing the name space. One way of subdividing the name space is by processor or work station. Each processor or work station has its own hierarchy of names which is a subset of the total name space of the system. A name in the processor's name space may represent an entity located anywhere in the distributed system, but what names are in the processor's name space and where the names are in the processor's name space will vary from processor to processor. A disadvantage of this approach is that a program which will execute in the name space defined for one processor will not necessarily execute in the name space defined for another processor. Consequently, a user of such a distributed system cannot easily move from one work station to another. Another way of subdividing the name space is by user. Each user of the system has its own hierarchy of names which is again a subset of the total name space of the system and which may include names for entities anywhere in the system. When the name space is subdivided by user, a program executed for a given user will execute in the same fashion regardless of which processor the program is executed on.

Neither the subdivision by user nor the subdivision by processor deals with the fact that the entities which execute programs in computer systems are processes, and not users or machines. In all respects but name space, the environment in which a program executes is the environment of the process which executes it. For example, when a program creates a temporary variable, that variable is part of the environment of the process which is executing the program and is accessible only by that process. However, when a program creates a temporary file, that file becomes part of the name space in which the process is executing, be it the system-wide name space, the name space for a processor, or the name space for a user.

In general, the fact that the same name used by two processes running in the same name space refers to the same entity causes serious naming problems. For example, if an entity, for example, a temporary file, is truly relevant only to a single process, then the process must create a name for the entity such that it is unique within the name space. The need to create such unique names and the complications flowing from their use are avoided if the two processes have different name spaces. The difficulties caused by the lack of per-process name spaces are not limited to distributed systems, but clearly become more severe as the size of the name space in which the process is running increases, and thus are larger in the larger name spaces provided by distributed systems.

It is an object of the invention disclosed herein to provide a solution to the problems described above, as well as to other problems of distributed systems.

SUMMARY OF THE INVENTION

One aspect of the invention disclosed herein is a multiprocess operating system which is characterized by the following components:
one or more name spaces;
a set of processes associated with each name space;
name space modification means available to any process for changing the meaning of names in the name space associated with the process; and
New name space creation means available to any process for ending the association of the process with its present name space and associating the process with a newly-created name space.
Other aspects include per-process name spaces which consist of a single tree of names, name space modification means which change the meanings of names within the single tree, compact means for maintaining a record of the changes in the meanings of names, services in which entities are represented by files such that operations on the files control the entity, an operating system root service which provides a predefined file tree for binding to the root of the process's name space, an operating system mount service which translates file operations into file protocols, protocol services which all respond to the set of file protocols provided by the mount service, and services which provide the files which control an entity on a per-process basis.

The above aspects of the invention and others will be made clear to those of ordinary skill in the art upon perusal of the following Detailed Description and Drawing, wherein:

BRIEF DESCRIPTION OF THE DRAWING

FIG. 2 is an overview of the mount service and protocol services in the operating system;

FIG. 3 is a diagram of the CHANNEL data structure;

FIG. 13 is a diagram of the data structures used to register a protocol service in a preferred embodiment;

FIG. 14 is an overview of a window service used with the operating system of the present invention;

The reference numbers employed in the Detailed Description have two parts: the rightmost two digits are a number within a figure, and the remaining digits are the figure number. Thus, an item identified by the reference number 115 appears for the first time in FIG. 1.

DETAILED DESCRIPTION

The following Detailed Description of a preferred embodiment begins with an overview of the Plan 9 operating system in which the invention is embodied. The overview is substantially the same as that found in the parent of the present patent application. The overview is followed by additional material which describes the following aspects of Plan 9 in more detail:

The manner in which Plan 9 creates a name space for a process;
The Plan 9 window system; and
The CPU command.

Figure 7:
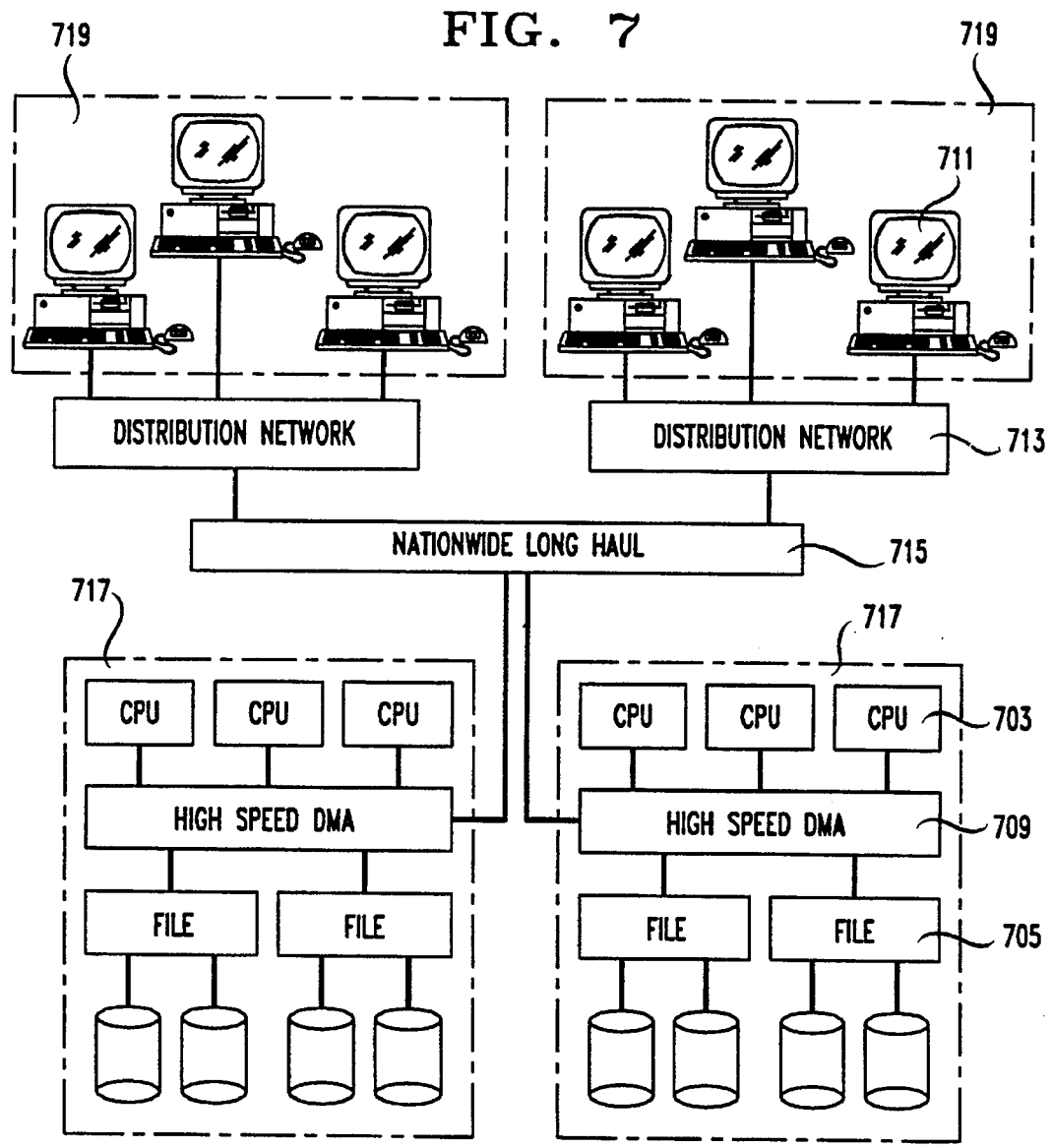
FIG. 7 is a diagram of the distributed system in which the operating system of the present invention is implemented.

Overview of the Plan 9 Operating System: FIG. 7

Plan 9 is a general-purpose, multi-user, portable distributed system implemented on a variety of computers and networks.

Plan 9 is divided along lines of service function. CPU servers concentrate computing power into large (not overloaded) multiprocessors; file servers provide repositories for storage; and terminals give each user of the system a dedicated computer with bitmap screen and mouse on which to run a window system. The sharing of computing and file storage services provides a sense of community for a group of programmers, amortises costs, and centralizes and hence simplifies management and administration.

The pieces communicate by a single protocol, built above a reliable data transport layer offered by an appropriate network, that defines each service as a rooted tree of files. Even for services not usually considered as files, the unified design permits some noteworthy and profitable simplification. Each process has a local file *name space* that contains attachments to all services the process is using and thereby to the files in those services. One of the most important jobs of a terminal is to support its user's customized view of the entire system as represented by the services visible in the name space.

To be used effectively, the system requires a CPU server, a file server, and a terminal; it is intended to provide service at the level of a departmental computer center or larger. The CPU server and file server are large machines best housed in an air conditioned machine room with conditioned power.

The following sections describe the basic components of Plan 9, explain the name space and how it is used, and offer some examples of unusual services that illustrate how the ideas of Plan 9 can be applied to a variety of problems.

CPU Servers

Several computers provide CPU service for Plan 9. The production CPU server is a Silicon Graphics Power Series machine with four 25 MHz MIPS processors, 128 megabytes of memory, no disk, and a 20 megabyte-per-second back-to-back DMA connection to the file server. It also has Datakit and Ethernet controllers to connect to terminals and non-Plan 9 systems. The operating system provides a conventional view of processes, based on fork and exec system calls, and of files, mostly determined by the remote file server. Once a connection to the CPU server is established, the user may begin typing commands to a command interpreter in a conventional-looking environment.

A multiprocessor CPU server has several advantages. The most important is its ability to absorb load. If the machine is not saturated (which can be economically feasible for a multiprocessor) there is usually a free processor ready to run a new process. This is similar to the notion of free disk blocks in which to store new files on a file system. The comparison extends farther: just as one might buy a new disk when a file system gets full, one may add processors to a multiprocessor when the system gets busy, without needing to replace or duplicate the entire system. Of course, one may also add new CPU servers and share the file servers.

The CPU server performs compilation, text processing, and other applications. It has no local storage; all the permanent files it accesses are provided by remote servers. Transient parts of the name space, such as the collected images of active processes or services provided by user processes, may reside locally but these disappear when the CPU server is rebooted. Plan 9 CPU servers are as interchangeable for their task—computation—as are ordinary terminals for theirs.

File Servers

The Plan 9 file servers hold all permanent files. The current server is another Silicon Graphics computer with two processors, 64 megabytes of memory, 600 megabytes of magnetic disk, and a 300 gigabyte jukebox of write-once optical disk (WORM). It connects to Plan 9 CPU servers through 20 megabyte-per-second DMA links, and to terminals and other machines through conventional networks.

The file server presents to its clients a file system rather than, say, an array of disks or blocks or files. The files are named by slash-separated components that label branches of a tree, and may be addressed for I/O at the byte level. The location of a file in the server is invisible to the client. The true file system resides on the WORM, and is accessed through a two-level cache of magnetic disk and RAM. The contents of recently-used files reside in RAM and are sent to the CPU server rapidly by DMA over a high-speed link, which is much faster than regular disk although not as fast as local memory. The magnetic disk acts as a cache for the WORM and simultaneously as a backup medium for the RAM. With the high-speed links, it is unnecessary for clients to cache data; instead the file server centralizes the caching for all its clients, avoiding the problems of distributed caches.

The file server actually presents several file systems. One, the "main" system, is used as the file system for most clients. Other systems provide less generally-used data for private applications. One service is unusual: the backup system. Once a day, the file server freezes activity on the main file system and flushes the data in that system to the WORM. Normal file service continues unaffected, but changes to files are applied to a fresh hierarchy, fabricated on demand, using a copy-on-write scheme. Thus, the file tree is split into two: a read-only version representing the system at the time of the dump, and an ordinary system that continues to provide normal service. The roots of these old file trees are available as directories in a file system that may be accessed exactly as any other (read-only) system. For example, the file /usr/nob/doc/plan 9. ms. as it existed on Apr. 1, 1990, can be accessed through the backup file system by the name /1990/0410/usr/rob/doc/plan 9. ms. This scheme permits recovery or comparison of lost files by traditional commands such as file copy and comparison routines rather than by special utilities in a backup subsystem. Moreover, the backup system is provided by the same file server and the same mechanism as the original files so permissions in the backup system are identical to those in the main system; one cannot use the backup data to subvert security.

Terminals

The standard terminal for Plan 9 is termed herein a Gnot (with silent 'G'). The Gnot is a locally-designed machine of which several hundred have been manufactured. The terminal's hardware is reminiscent of a diskless workstation: 4 or 8 megabytes of memory, a 25 MHz 68020 processor, a 1024×1024 pixel display with two bits per pixel, a keyboard, and a mouse. It has no external storage and no expansion bus; it is a terminal, not a workstation. A 2 megabit per second packet-switched distribution network connects the terminals to the CPU and file servers. Although the bandwidth is low for applications such as compilation, it is more than adequate for the terminal's intended purpose: to provide a window system, that is, a multiplexer interface to the rest of Plan 9.

Unlike a workstation, the Gnot does not handle compilation; that is done by the CPU server. The terminal runs a version of the CPU server's operating system, configured for a single, smaller processor with support for bitmap graphics, and uses that to run programs such as a window system and a text editor. Files are provided by the standard file server over the terminal's network connection.

Just like old character terminals, all Gnots are equivalent, as they have no private storage either locally or on the file server. They are inexpensive enough that every member of a research center can have two: one at work and one at home. A person working on a Gnot at home sees exactly the same system as at work, as all the files and computing resources remain at work where they can be shared and maintained effectively.

Networks

Plan 9 has a variety of networks that connect the components. CPU servers and file servers communicate over back-to-back DMA controllers. That is only practical for the scale of, say, a computer center or departmental computing resource. More distant machines are connected by traditional networks such as Ethernet or Datakit. A terminal or CPU server may use a remote file server completely transparently except for performance considerations. As the Datakit network spans the country, Plan 9 systems can be assembled on a large scale. To keep their cost down, Gnots employ an inexpensive network that uses standard telephone wire and a single-chip interface. (The throughput is respectable, about 120 kilobytes per second.) Since the terminal only mediates communication—it instructs the CPU server to connect to the file server but does not participate in the resulting communication—the relatively low bandwidth to the terminal does not affect the overall performance of the system.

FIG. 7 shows the components and topology of Plan 9. Plan 9 system 701 consists of file servers 705, CPUs 703, and Gnots 711. Clusters 717 of CPUs 703 and file servers 705 and clusters 719 of Gnots 711 are connected by a nationwide long-haul communications network 715; Gnots 711 within a cluster 719 are connected by a distribution network 713 such as a LAN and file servers 705 and CPUs 703 within a cluster 717 are connected by a high-speed DMA link 709.

Name Spaces

There are two kinds of name space in Plan 9: the global space of the names of the various servers on the network and the local space of files and servers visible to a process. Names of machines and services connected to Datakit are hierarchical nj/mh/astro/helix, for example defining (roughly) the area, building, department, and machine in a department. Because the network provides naming for its machines, global naming issues need not be handled directly by Plan 9. However one of Plan 9's fundamental operations is to attach network services to the local name space on a per-process basis. This fine-grained control of the local name space is used to address issues of customizability, transparency, and heterogeneity.

The protocol for communicating with Plan 9 services is file-oriented; all services must implement a file system. That is, each service, local or remote, is arranged into a set of file-like objects collected into a hierarchy called the name space of the server. For a file server, this is a trivial requirement. Other services must sometimes be more imaginative. For instance, a printing service might be implemented as a directory in which processes create files to be printed. Other examples are described in the following sections; for the moment, consider just a set of ordinary file servers distributed around the network.

When a program calls a Plan 9 service (using mechanisms inherent in the network and outside Plan 9 itself) the program is connected to the root of the name space of the service. Using the protocol, usually as mediated by the local operating system into a set of file-oriented system calls, the program accesses the service by opening, creating, removing, reading, and writing files in the name space.

From the set of services available on the network, a user of Plan 9 selects those desired: a file server where personal files reside, perhaps other file servers where data is kept, or a departmental file server where the software for a group project is being written. The name spaces of these various services are collected and joined to the user's own private name space by a fundamental Plan 9 operator, called attach, that joins a service's name space to a user's. The user's name space is formed by the union of the spaces of the services being used. The local name space is assembled by the local operating system for each user, typically by the terminal. The name space is modifiable on a per-process level, although in practice the name space is assembled at log-in time and shared by all that user's processes.

To log in to the system, a user sits at a terminal and instructs it which file server to connect to. The terminal calls the server, authenticates the user (see below), and loads the operating system from the server. It then reads a file, called the *profile*, in the user's personal directory. The profile contains commands that define what services are to be used by default and where in the local name space they are to be attached. For example, the main file server to be used is attached to the root of the local name space/, and the process file system is attached to the directory/proc. The profile then typically starts the window system.

Within each window in the window system runs a command interpreter that may be used to execute commands locally, using file names interpreted in the name space assembled by the profile. For computation-intensive applications such as compilation, the user runs a command CPU that selects (automatically or by name) a CPU server to run commands. After typing CPU the user sees a regular prompt from the command interpreter. But that command interpreter is running on the CPU server *in the same name space—even*

*the same current director—as the* cpu *command itself.* The terminal exports a description of the name space to the CPU server, which then assembles an identical name space, so the customized view of the system assembled by the terminal is the same as that seen on the CPU server. (A description of the name space is used rather than the name space itself so the CPU server may use high-speed links when possible rather than requiring intervention by the terminal.) The CPU command affects only the performance of subsequent commands; it has nothing to do with the services available or how they are accessed.

Although there is a large catalogue of services available in Plan 9, including the service that finds services, a few suffice to illustrate the usage and possibilities of this design.

The Process File System

An example of a local service is the 'process file system', which permits examination and debugging of executing processes through a file-oriented interface.

The root of the process file system is conventionally attached to the directory/proc (Convention is important in Plan 9; although the name space may be assembled willy-nilly, many programs have conventional names built in that require the name space to have a certain form. It doesn't matter which server the program/bin/rc (the command interpreter) comes from but it must have that name to be accessible by the commands that call on it.) After attachment, the directory/proc itself contains one subdirectory for each local process in the system, with name equal to the numerical unique identifier of that process. (Processes running on the remote CPU server may also be made visible; this will be discussed below.) Each subdirectory contains a set of files that implement the view of that process. For example, /proc/77/men contains an image of the virtual memory of process number 77. Plan 9's/proc implements other functions through other files. Here is a list of the files provided for each process.

mem The virtual memory of the process image. Offsets in the file correspond to virtual addresses in the process.

ctl Control behaviour of the processes. Messages sent (by a write system call) to this file cause the process to stop, terminate, resume execution, etc.

text The file from which the program originated. This is typically used by a debugger to examine the symbol table of the target process, but is in all respects except name the original file; thus one may type /proc/77/text to the command interpreter to instantiate the program afresh.

note Any process with suitable permissions may write the file of another process to send it an asynchronous message for interprocess communication. The system also uses this file to send (poisoned) messages when a process misbehaves, for example divides by zero.

status A fixed-format ASCII representation of the status of the process. It includes the name of the file the process was executed from, the CPU time it has consumed, its current state, etc.

The status file illustrates how heterogeneity and portability can be handled by a file server model for system functions. The command cat/proc/*/status presents (readably but somewhat clumsily) the status of all processes in the system; in fact the process status command Ps is just a reformatting of the ASCII text so gathered. The source for is a page long and is completely portable across machines. Even when contains files for processes on several heterogeneous machines, the same implementation works.

It is worth noting that the services/proc provides, although varied, do not strain the notion of a process as a file. For example, it is not possible to terminate a process by attempting to remove its process file nor is it possible to start a new process by creating a process file. The files give an active view of the processes, but they do not literally represent them. This distinction is important when designing services as file systems.

The Window System

In Plan 9, user programs, as well as specialized stand-alone servers, may provide file service. The window system is an example of such a program; one of Plan 9's most unusual aspects is that the window system is implemented as a user-level file server.

The window system is a server that presents a file/dev/cons similar to the /dev/tty or con: of other systems, to the client processes running in its windows. Because it controls all I/O activities on that file, it can arrange that each window's group of processes sees a private When a new window is made, the window system allocates a new /dev/cons file, puts it in a new name space (otherwise the same as its own) for the new client, and begins a client process in that window. That process connects the standard input and output channels to /dev/cons using the normal file opening system call and executes a command interpreter. When the command interpreter prints a prompt, it will therefore be written to /dev/cons and appear in the appropriate window.

It is instructive to compare this structure to other operating systems. Most operating systems provide a file like /dev/cons that is an alias for the terminal connected to a process. A process that opens the special file accesses the terminal it is running on without knowing the terminal's precise name. Since the alias is usually provided by special arrangement in the operating system, it can be difficult for a window system to guarantee that its client processes can access their window through this file. This issue is handled easily in Plan 9 by inverting the problem. A set of processes in a window shares a name space and in particular /dev/cons, so by multiplexing /dev/cons and forcing all textual input and output to go through that file the window system can simulate the expected properties of the file.

The window system serves several files, all conventionally attached to the directory of I/O devices/dev. These include cons, the port for ASCII I/O; mouse, a file that reports the position of the mouse; and bit blt, which may be written messages to execute bitmap graphics primitives. Much as the different cons files keep separate clients' output in separate windows, the mouse and bit blt files are implemented by the window system in a way that keeps the various clients independent. For example, when a client process in a window writes a message (to the bit blt file) to clear the screen, the window system clears only that window. All graphics sent to partially or totally obscured windows is maintained as a bitmap layer, in memory private to the window system. The clients are oblivious of one another.

Since the window system is implemented entirely at user level with file and name space operations, it can be run recursively: it may be a client of itself. The window system functions by opening the files /dev/cons,/dev/bit blt etc., as provided by the operating system, and reproduces—multiplexes—their functionality among its clients. Therefore, if a fresh instantiation of the window system is run in a window, it will behave normally, multiplexing its /dev/cons and other files for its clients. This recursion can be used profitably to debug a new window system in a window or to multiplex the connection to a CPU server. Since the window system has no bitmap graphics code—all its graphics operations are executed by writing standard messages to a file—the window system may be run on any machine that has /dev/bit blt in its name space, including the CPU server.

The CPU command connects from a terminal to a CPU server using a full-duplex network connection and runs a setup process there. The terminal and CPU processes exchange information about the user and name space, and then the terminal-resident process becomes a user-level file server that makes the terminal's private files visible from the CPU server. In a preferred embodiment, the CPU server builds the name space by re-executing the user's profile; in an alternative embodiment, the name space will be exported by a special terminal-resident server that can be queried to recover the terminal's name space. The CPU process makes a few adjustments to the name space, such as making the file /dev/con on the CPU server *be the same file as on the terminal*, perhaps making both the local and remote process file system visible in /proc and begins a command interpreter. The command interpreter then reads commands from, and prints results on, its file /dev/cons which is connected through the terminal process to the appropriate window (for example) on the terminal. Graphics programs such as bitmap editors also may be executed on the CPU server since their definition is entirely based on I/O to files 'served' by the terminal for the CPU server. The connection to the CPU server and back again is utterly transparent.

This connection raises the issue of heterogeneity: the CPU server and the terminal may be, and in the current system are, different types of processors. There are two distinct problems: binary data and executable code. Binary data can be handled two ways: by making it not binary or by strictly defining the format of the data at the byte level. The former is exemplified by the status file in/proc which enables programs to examine, transparently and portably, the status of remote processes. Another example is the file, provided by the terminal's operating system, /dev/time. This is a fixed-format ASCII representation of the number of seconds since the epoch that serves as a time base for programs requiring time stamps. Processes on the CPU server get their time base from the terminal, thereby obviating problems of distributed clocks.

For files that are I/O intensive, such as /dev/bit blt, the overhead of an ASCII interface can be prohibitive. In Plan 9, such files therefore accept a binary format in which the byte order is predefined, and programs that access the files use portable libraries that make no assumptions about the order. Thus is usable from any machine, not just the terminal. This principle is used throughout Plan 9. For instance, the format of the compilers' object files and libraries is similarly defined, which means that object files are independent of the type of the CPU that compiled them.

Having different formats of executable binaries is a thornier problem, and Plan 9 solves it as follows: directories of executable binaries are named appropriately: /mips/bin,/ 68020/bin etc., and a program may ascertain, through a special server, what CPU type it is running on. A program, in particular the CPU command, may therefore attach the appropriate directory to the conventional name bin so that when a program runs, say, /bin/rc the appropriate file is found. Although this is a fairly clumsy solution, it works well in practice. The various object files and compilers use distinct formats and naming conventions, which makes cross-compilation painless, at least once automated by make or a similar program.

Security

Plan 9 does not address security issues directly, but some of its aspects are relevant to the topic. Breaking the file server away from the CPU server enhances the possibilities for security. As the file server is a separate machine that can only be accessed over the network by the standard protocol, and therefore can only serve files, it cannot run programs. Many security issues are resolved by the simple observation that the CPU server and file server communicate using a rigorously controlled interface through which it is impossible to gain special privileges.

Of course, certain administrative functions must be performed on the file server, but these are available only through a special command interface accessible only on the console and hence subject to physical security. Moreover, that interface is for administration only. For example, it permits making backups and creating and removing files, but it does not permit reading files or changing their permissions. *The contents of a file with read permission for only its owner will not be divulged by the file server to any other user, even the administrator.*

Of course, this begs the question of how a user proves who he or she is. In a preferred embodiment, this is done using a simple authentication manager on the Datakit network itself, so that when a user logs in from a terminal, the network assures the authenticity of the maker of calls from the associated terminal. The need for trust in a local network may be eliminated by replacing the authentication manager by a Kerberos-like system.

Figure 1:
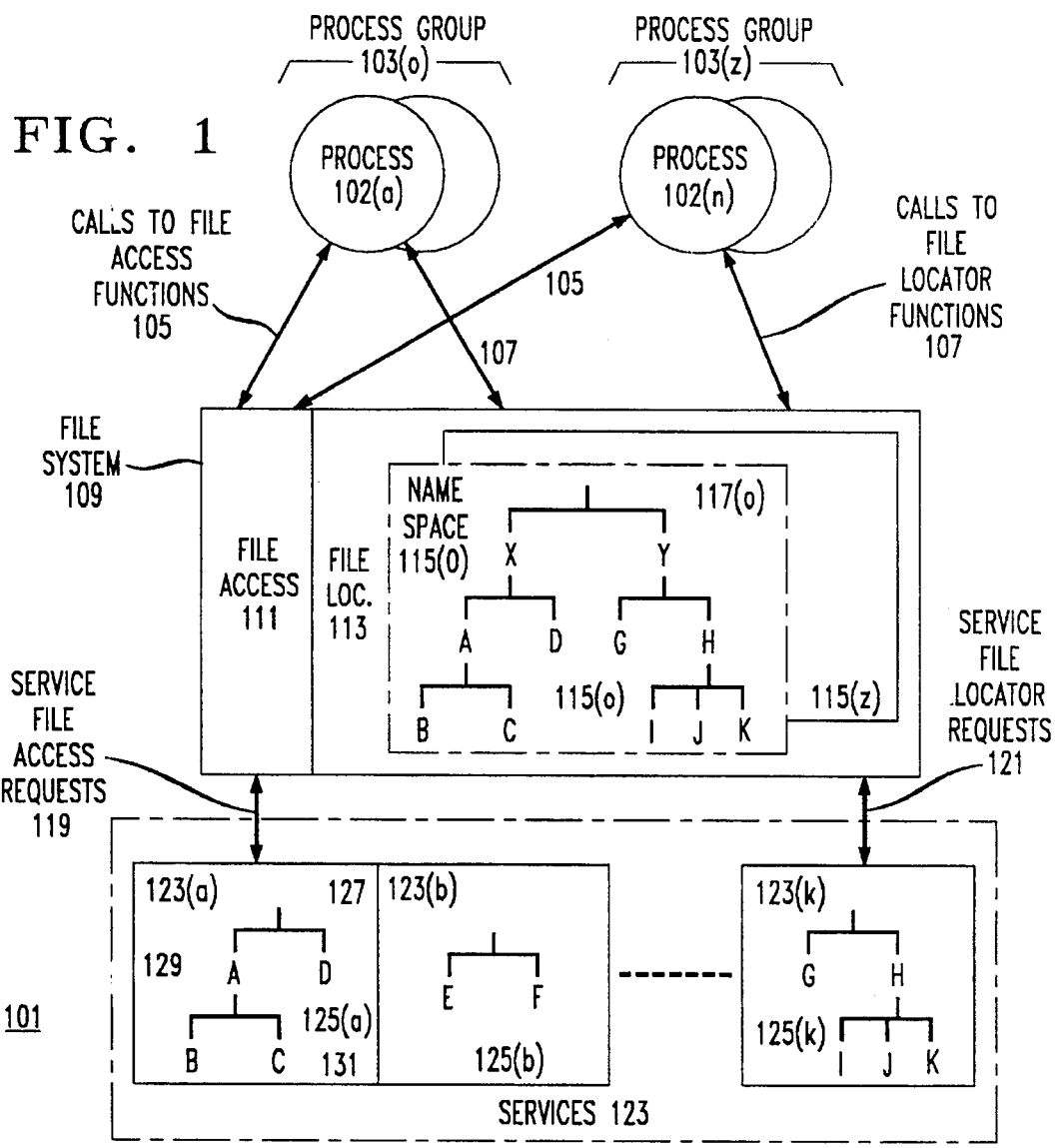
FIG. 1 is an overview of the per-process name spaces provided by the operating system described herein.

Overview of the Architecture of Plan 9 Services: FIG. 1

As already mentioned, Plan 9 services are implemented as file systems, that is, the service appears to a process executing on a computer with a Plan 9 operating system as a set of files. The process can obtain data from the service by performing file read operations on "files" provided by the service and can provide data to the service by performing file write operations on the "files". As already explained in detail with regarcl to the "file system" provided by the process service, the service need not actually maintain files, but must merely be able to respond to requests for file operations by a process as if it did maintain them. For example, when a process reads a "file" maintained by the service, the service must provide data to the process reading the "file".

FIG. 1 provides an overview of the relationship between Plan 9 services and processes. Service architecture 101 shows how processes 102 employ file system 109 to access one or more services 123. The processes 102 may be executing either on a Gnot 711 or a CPU 703 and the services may be implemented either locally to the processor where process 102 is executing or in a remote device such as a file server 705.

As shown in FIG. 1, each service 123 provides one or more trees of files 125 to the processes 102 which use the service. The trees of files are made up of data files 131 and directory files 127 and 129. A directory file is a file which contains a list of files. The files listed in the directory files may be either directory files or data files. As may be seen from file tree 125(*a*), data files 131 B,C, and D are the "leaves" of the file tree, while directory file 129 occupies the point where the tree branches. At the base of the entire tree, there is a single root directory file 127. Each file in a service 123 has a file name. In a preferred embodiment, the file name is a character string.

A process 102 accesses a file in a service 123 by means of calls to file system functions provided by the Plan 9 operating system. There are two main classes of functions: file locator functions (FL) 113, which locate files, and file access functions (FA) 111, which access files after they have been located by file access functions 111. Calls to file locator functions 113 are represented by arrows 107, and those to file access functions 111 are represented by arrows 105.

As mentioned above, each Plan 9 process 102 has a name space associated with it. A process 102's name space determines which files provided by services 123 a process 102 may access. A process 102's name space in a preferred embodiment consists of a single file tree 117 which is assembled out of file trees 125 and/or subtrees of those file trees. Thus name space 115(o) maintained and used by file locator functions 113 is the name space for process 102(a). As may be seen from FIG. 1, process 102(a)'s name space contains file tree 117(o) which includes 125(a) from service 123(a) and file tree 125(k) from service 123(k), but does not include file tree 125(b) from service 123(b). File tree 117(0) has been constructed by making the directory file "X" in process 102's file tree 117(o) equivalent to the root of tree 125(a) and making the directory file "Y" in file tree 117(o) equivalent to the root of file tree 125(k). How "X" and "Y" themselves came to be in name space 115(o) will be explained in detail later.

Within name space 115(o), a file may be located by means of a path name. A path name is a list of file nantes which includes the name of the file which is to be located and the names of all of the directory files between the point in the file tree from which the file is being located to the file. The point in the file tree from which the file is being located is termed the *working directory*. Thus, if the working directory is the directory file X, the pathname is A/C. The "/" character in A/C serves to separate the names in the path name. Additionally, any file may be located by specifying its *full path name*, that is, the "/" character, representing the root directory, the names of all of the directories between the root directory and the file, and the name of the files. The names of the files are again separated by "/". Thus, the full path name of Thus, the complete pathname for file C in name space 115(o) is/X/A/C.

In Plan 9, a number of processes 102 may share a name space. The processes 102 sharing a name space make up a process group 103; thus, the processes in process group 103(o) share name space 115(o) defined by file tree 117(o), while the processes in process group 103(z) share name space 115(z). Processes are created in Plan 9 by means of the "fork" system call. The newly-created process 102 remains associated with the same name space 115 as the process which made the "fork" system call and therefore belongs to the same process group 103 as the process 102 which made the fork system call. A new process group 103 is established when a process 102 makes the "forkpgrp" system call. The call has a single argument: a flag indicating whether the new process group should receive a copy of process 102's old name space 105 or receive a minimal default name space 105. Execution of the system call places the process 102 making the system call in the new process group. Once a new name space 115 has been established for a process 102 by the forkpgrp system call, changes in new name space 115 do not affect the old name space 115 of process group 103 to which the process 102 making the forkpgrp system call formerly belonged.

Any process 102 which belongs to a process group 103 may modify the name space 115 for the process group. To do so, the process uses one of two name space modification functions. The first of these is "bind", which makes a name which is already in the name space equivalent to file specified by a new path name. After the bind, references to the file specified by the old path name will be interpreted as references to the file specified by the new path name. For example, a "bind ("/Y/H","/X/A")" function call in name space 115(o) may be used to replace the subtree whose root is A in name space 115(o) with the subtree whose root is H in that name space. After the bind, the pathname/X/A/K will refer to the file K of subtree H.

The second operation is "mount", which makes a name which is already in the name space equivalent to the root of a service 123. As will be explained in more detail later, the root of the service is represented by a file descriptor, which is a small integer. Thus, the directory name "X" of file tree 117(o) was made equivalent to the root of file tree 125(a) of service 123(a) by the mount function "mount (FD,"/X")". After the mount, the pathname/X/A refers to file "A" in file tree 125(a).

A further refinement of "mount" and "bind" in Plan 9 is that three different kinds of relationships between the pathnames or between the file descriptor and the pathname may be specified. The first relationship is replacement. If that relationship is specified, whatever is referred to by the new name or the file descriptor completely replaces whatever is referred to by the old name. The second and third relationships establish what is termed *union directories*. When a union directory is established, the old name and the new name used in the bind function must both refer to directory files and the old name in the mount command must refer to a directory file, while the file descriptor must refer to the root of a file tree in a service 123. The effect of the bind or mount is to establish a new directory which is the union of the files in the old and new directory files. One relationship, *before*, establishes a union directory in which the new directory is searched before the old directory; the other relationship, *after*, establishes a union directory in which the new directory is searched after the old directory. Thus, the bind command "bind("/Y/H","/X/A",BEFORE)" establishes a directory in which the files I,J,K precede the files B and C, and when file locator functions 113 respond to the pathname/X/A/C, they will first search through the directory H and then through the directory A. By thus determining the order in which the locator functions search through directories for a file, the union directories provide the same kind of control as is provided by search lists in operating systems such as UNIX.

File locator functions 113 which locate files instead of rearranging the name space take a path name as an argument and return a file descriptor. In this context, the *file descriptor* is a small integer which is used in file access functions 111 to refe to the file. The file locator functions 113 include "chdir", which makes the directory file specified by the pathname into the process 102's working directory, and "open", which opens the file specified by the pathname. Both "chdir" and "open" rerum file descriptors for the working directory file and the opened file respectively. Additionally, the "create" function works as does "open", except that the file specified in the path name is created. File access functions 105 then use the file descriptor provided by the file locator functions to read the file, write the file, set and obtain the file's status, and to close the file.

In architecture 101, file system 109 translates the file access calls 105 and the file locator calls 107 made by a process 102 into service file operation requests. Each service file operation request requests a service 123 to perform an operation on a file in one of its file trees 125. Again, there are two classes of such requests: service file access requests, indicated by arrow 119, and service file locator requests, indicated by arrow 121. As will be explained in more detail, requests 119 and 121 for some services 123 take the form of function calls; for other services 123, the requests take the form of file protocols. In the case of the function calls, files are represented by file names or file descriptors; in the case of the file protocols, files are represented by file names or *file identifiers*; for the purpose of the following discussion, both file descriptors and file identifiers will be subsumed in the term *file specifiers*.

In file system 109, a file descriptor employed by a process 102 is associated with a *qid*, a file handle provided by service 123. The association may be either direct or indirect, by way of the association of a file descriptor with a file identifier and the association of the file identifier with the qid. When there is an association between a file descriptor used by a process 102 and a qid, the process 102 is said to have a *connection* to the file represented by the qid. Similarly, in service 123, the qid is associated with one or more file specifiers. Any file system call 105 or 107 which results in a service file request having a file specifier associated with a given qid will result in the file operation being performed on the file identified by the qid.

An advantage of representing a file by a name or a file specifier in file system 109 but by a name or a qid in services 123 is that different services can establish different relationships between file names and qids. For example, in some services, such as the process service explained above, it is advantageous for the file names used by all processes to refer to a single set of files; in other services, such as the 8.5 window service to be described in detail later, the file names used by each process refer to a set of files peculiar to that process. As a result, file names in architecture 101 have properties analogous to those of variables in programming languages such as C. Some file names are like global static variable names: as the global static variable name refers to the same memory location in all code in which the variable name appears, so file names like those provided by the process service refer to the same files in all processes. Other file names are like local variable names: as the local variable name refers to a different memory location in every invocation of a procedure, so file names like those provided by the 8.5 server refer to different files in each process. Which properties a file name has is of course determined by the service 123 which provides the file. In analogy with the terminology used with variables, services 123 are said to provide *instances* of their files; thus, the process service provides a single instance of each of its files, and any process 102 which has a connection to one of the files provided by the service has access to the same file as all of the other processes 102 which has a connection to that file. The window service, on the other hand, provides separate instances of the files in its file tree to each process 102 which establishes a connection with the root of the file tree; any process 102 which has a connection with a file provided by the window service has a connection to one of the multiple instances of that file.

Each service 123 is able to handle the following classes of service file locator requests 121:

attach: given a file specifier for the root of a file tree in a specified service 123, return a qid for the root to file system 109;

walk: search a directory file specified by a file specifier for a file having a given name, and if the file is found, associate the file specifier with the qid for the file and return the qid;

create: make a new file in a directory file specified by a file specifier, give the file a specified name, associate the file specifier with the qid for the new file; and return the qid;

remove: remove a file specified by a file specifier from the server, disassociate the file specifier from the qid, and return the name of the file being removed.

Each service 123 is further able to handle the following classes of service file access requests:

open: prepare a file specitied by a file specifier for file access operations and return the qid associated with the file specifier;

clone: given a first file specifier representing a file and a second file specifier which does not yet represent a file, associate the second file specifier with the file associated with the first file specifier;

read: given a file specifier, an offset in the file, and a count, read the number of bytes specified in the count beginning at the offset;

write: given a file specifier, an offset in the file, a count, and data, write the data into the number of bytes specified in the count beginning at the offset;

clunk: given a file specifier, end the association between the file specifier and the file.

stat: given a file specifier and information required by the service to obtain file status information, return the file's status;

wstat: given a file specifier and information required by the service to change the file's status, change the file's status.

While all services 123 must implement the above operations, in some cases, the operation may in fact have no effect or produce an error. For example, if a service 123 is a printer, and thus can implement only write-only "files", a read operation will produce an error.

Kernel Services and Protocol Services: FIG. 2

There are two types of services 123 in a preferred embodiment of Plan 9. *Kernel services* are services in which service file operation requests 205 and 207 are implemented by means of calls to Plan 9 kernel functions. *Protocol* services are services in which service file operation requests 205 and 207 are implemented by means of the Plan 9 file protocol. In the protocol services, each service file operation request is initiated by a *tmessage* transmitted for a process 102 to a protocol service. The protocol service replies to the tmessage with a *rmessage* which contains information returned from the protocol service to the process. The tmessage and rmessage making up a service file operation request for a protocol service are termed a *transaction*. For example the service file read operation request for a protocol service is a read transaction which consists of the following read tmessage and rmessage:

tread: type specifier, file identifier, tag, offset, count rread: type specifier, file identifier, tag, count, data The file identifier is associated with the file descriptor in file system 109 and with the qid in file system 109 and in the protocol service. The tread message includes a type specifier indicating that the message is a tread message, the file identifier, a tag identifying the message, the offset in the file at which the read is to begin, and the number of bytes. The rread message includes a type specifier indicating that the message is an rread message, the file identifier, another tag, the count of bytes actually read, and the data itself. If the read results in an error, protocol service 209 returns an rerror message instead of the rread message. It has the form:

rerror: type specifier, tag, error message string

Each protocol service 209 must be able to perform transactions corresponding to each of the service file operation requests listed above. Since this is all that is required of a protocol service 209, a protocol service 209 may be implemented on a processor which has an architecture completely different from the architecture of the processor upon which mount service 203 is executing. All that is required to use a protocol service 209 is a connection to the protocol service 209 over which the protocols may be transmitted and received. Further, in a preferred embodiment, the data sent and returned in the protocols has predetermined formats which are used by all protocol services 209 which provide a given file tree. Thus, a process 102 may use any protocol service which provides the given file tree, regardless of the type of machine the process 102 is executing on and the type of machine the protocol service 209 is executing on.

FIG. 2 shows the relationship between protocol services and the rest of architecture 101. As shown in the figure, protocol services (PS) 209 perform file locator transactions 205 and file access transactions 207 involving file protocols corresponding to the service file locator requests and service file access requests explained above. A special kernel service, mount service 203, receives function calls 217 specifying service file locator requests and function calls 219 specifying service file access requests from file system 109. Mount service 203 then responds to the function calls by performing corresponding transactions with protocol services 209. To perform the transactions, mount service 203 employs a number of communications services 215. There axe two types of such communications services: network communications services (NS) 214 and inter-process communications services (IPS) 216. Network communications services employ networks to communicate with remote protocol servers 213 which are connected via the networks to the CPU upon which process 102 is executed. Inter-process communciations services 216 employ an interprocess communications system to communicate with local protocol servers 211. In a preferred embodiment, the inter-process communications system employed by IPS 216 is a pipe system like that in the UNIX operating system. When a communications service 215 is connected to a protocol server 209, it is represented by a file descriptor. It is these file descriptors which are employed in the "mount" system call.

As may be seen by the reference numbers in parentheses, network communications services 215 may eraply distribution network 713, long haul network 715, and DMA network 705 of FIG. 7 and the remote protocol services 213 may include one or more file services 705. Local protocol services 211 may be devices such as the 8.5 services for GNOT 711 or even other processes 102 which communicate with the given process 102 by means of interprocess communications facilities. As indicated above, the distinction between a protocol service 209 and a kernel service like mount service 203 is not location, but merely that protocol service 209 performs transactions with mount service 203. As will be seen in detail in the following description of the 8.5 service, an advantage of this characteristic of protocol services 209 is that the same protocol service 209 may be used by both a process 102 running on a local processor and a process 102 running on a remote processor such as CPU 703 of FIG. 7.

Implementing File Operations in Plan 9

The following will discuss the implementation of file operations in Plan 9, beginning with the data structures used to represent files and relate them to processes 102 and services 123, continuing with the data structures used to represent process name space 115, and ending with examples of certain typical file operations.

Figure 4:
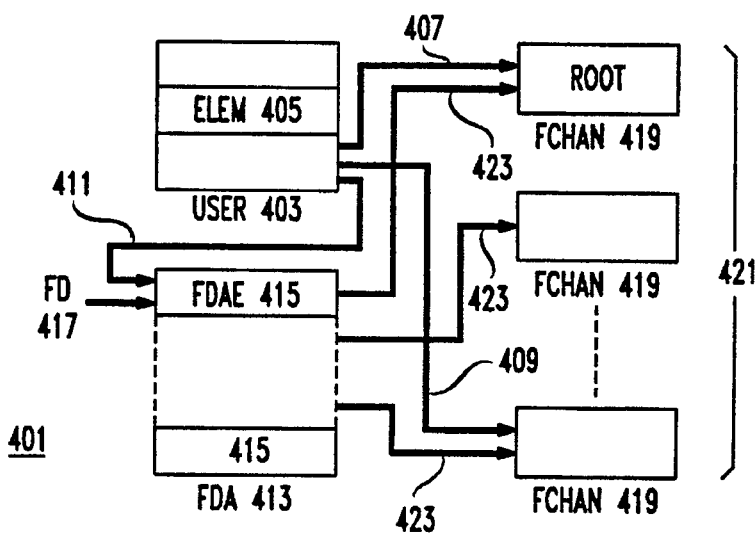
FIG. 4 is a diagram of the data structures used to locate open files.
Figure 5:
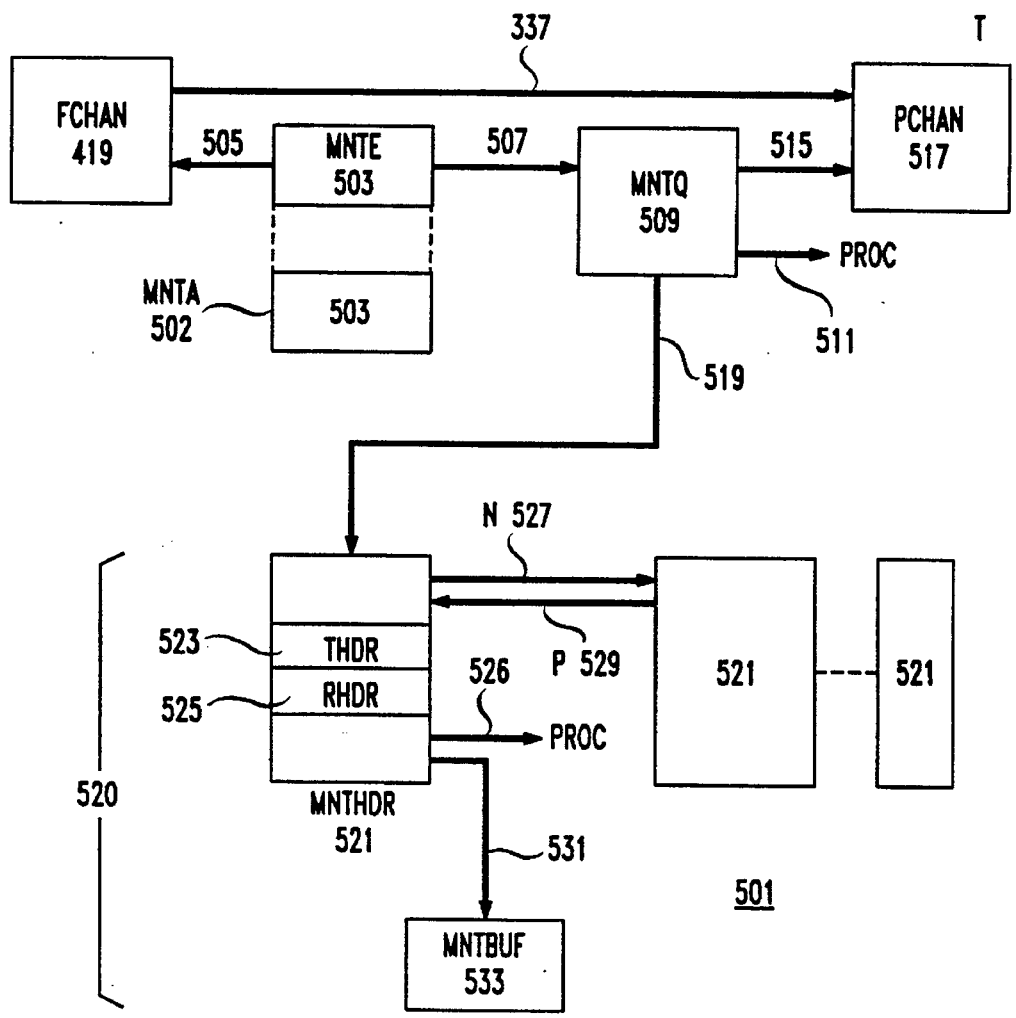
FIG. 5 is a diagram of the data structures used to send protocols to and receive protocols from protocol services.

Representing A Connection between a Process 102 and a File: FIGS. 3–5

Any file to which a process 102 has a connection is represented by a channel data structure. At a minimum, the channel data structure for a file specifies the service 123 which is providing the file and associates the qid provided by service 123 with the file descriptor which process 102 uses to refer to the file. If service 123 is a protocol service 209, the channel further associates the file identifier used for the file in the file protocols and a protocol channel for the file protocols with the file descriptor.

FIG. 3 is a diagram of the channel data structure. Channel data structure 301 has the following components:

lock 303, which bars more than one process from having access to channel 301 at the same time;

reference count (ref) 307, which indicates whether the channel is pointed to by other kernel data structures;

next/offset field 309: when channel 301 is not in use, it is stored in a list of unused channels 301, and in that case, the next/offset field points to the next unused channel 301; when the file represented by channel 301 is being accessed, next/offset specifies the current offset into the file.

Kernel service information (KSINFO) 311: The next two fields contain information which specifies the kernel service which provides the file represented by the channel 301;

type 313: this field specifies the kernel service by means of which the file represented by the channel 301 is accessed; for protocol services 209, type field 313 specifies mount service 203;

device (dev) 315: this field specifies a specific device represented by the kernel service; in the case of mount service 203, the device field 315 specifies the protocol service 209 which provides the file represented by channel 301;

Access information (AINFO) 317: the next three fields contain information needed to perform file accesses;

mode 319 indicates how the file represented by the channel may be accessed;

flag 319 contains status information about the file;

qid 323 is the qid which the service which provides the file has assigned to the file;

Mount Information (MINFO) 325 indicates where information concerning binds and mounts affecting the pathname of the file represented by the channel 301 may be found;

mountptr 327 is a pointer to a data structure from which the information concerning the binds and mounts may be found;

mountid 329 is an identifier for the data structure pointed to by mountptr 327;

file identifier (FID) 331 is the file identifier which mount service 203 provides to protocol service 209 providing the file represented by channel 301 and which protocol service 209 associates with qid 323 for the file as long as the file is connected; in a preferred embodiment, file identifier 331 is set to a unique value for each channel 301 when the channel 301 is created;

auxiliary information 333 is information whose meaning depends on device type 313;

protocol service information (PSINFO) 335 is information indicating how file protocols may be sent to the protocol service providing the file represented by the channel;

protocol channel (PCHAN) 337 is a pointer to a channel structure 301 which represents the communications service 215 used for transactions with the file represented by the present channel structure;

mqid 339 is the qid of the root directory of the file tree in the protocol service which contains the file represented by the channel 301.

Each process 102 is associated with a set of files with which it has connections. The set of files may include files with which connections were established by ancestors of process 102 and which were "inherited" by process 102 when it was created by the "fork" system call and files with which the connections were established by process 102 itself. The association is achieved by means of the data structures 401 shown in FIG. 4. Data structures 401 further associate each file in the set with the file descriptor which process 102 uses to refer to the file.

The starting point for access to data structures 401 is user data structure 403 for process 102. A pointer 411 in user data structure 403 points to file descriptor array (FDA) 413. File descriptor array 413 is an array of pointers 423 to channels 401 which is indexed by file descriptor (FD) 417. If a file belongs to the set of files connected to process 102, the entry (FDAE) 415 in array 413 corresponding to the file descriptor for the file will contain a pointer 423 to a channel structure 301 for the file. Such channel structures appear in FIG. 4 as file channel structures 419. There is a set 421 of such file channels 419 corresponding to the set of files with which process 102 is connected. In a preferred embodiment, file descriptor array 413 has 100 elements, and consequently, each process 102 may be connected to up to 100 files.

As previously indicated, file locator functions such as "bind", "mount", "chdir", or "open" take a path name as an argument and return the file descriptor 417 for the file. As will be explained in more detail below, access to file channels 419 for purposes of path name interpretation is provided by a pointer 407 in user structure 403 to file channel 419 for the root of process 102's file tree and another pointer 409 to file channel 419 for process 102's working directory. Another component of user 403 which is employed in path name interpretation is element (ELEM) 405, which contains the name in the list of names making up the pathname which is currently being interpreted.

When the file represented by file channel 419 is provided by a protocol service 209, file channel 419 is associated with a protocol channel which represents a connection via a communications service with a protocol service 209. Protocol channels are also implemented using channel structures 301. In a channel structure 301 serving as a protocol channel, TYPE field 313 specifies either inter-process communications services 216 or network services 214 (in a preferred embodiment, a pipe service or a DATAKIT™ network communications service). Fields 327, 329, and 337 have no meaning in a protocol channel. When the connection represented by the protocol channel is opened by a process 102, a pointer to the protocol channel is placed in file descriptor array 413 for the process 102 and the protocol channel receives the corresponding file descriptor. A connection to a local protocol service by means of a pipe is opened when the pipe system call creating the pipe is executed by the process 102, and a connection to a remote protocol service 209 by means of a DATAKIT connection is opened when the file representing the remote protocol service 209 in the srv service is opened.

FIG. 5 shows the data structures 501 employed in a preferred embodiment to associate a file channel 419 with a protocol channel and with data structures representing the treessages and rmessages. As previously indicated, PCHAN field 337 in file channel 419 points to protocol channel 517, which is implemented using a channel structure 301. The data structures representing the tmessages and rmessages are located using mount service array (MNTA) 502. There is an entry (MNTE) 503 in the array for every file channel 419 which represents a file provided by a protocol service 209. Each entry 503 includes an identifier and two pointers: one to file channel 419 corresponding to entry 503 and one to a mount service queue structure (MNTQ) 509. File channel 419 in turn contains the identifier for entry 503 as part of the information in dev field 315. Mount service queue structure 509 contains a pointer 511 to a data structure representing the procedure to which file channel 419 belongs, a pointer 515 to protocol channel 517 representing the connection to the protocol service 209 and file tree 125 containing the file represented by file channel 419, and a pointer 519 to a queue of messages 520. The messages in the queue are of course treessages concerning the file to protocol service 209 and rmessages from protocol service 209. Mount service queue 509 thus associates the queue of messages with protocol channel 517 and with process 102.

Each message 520 is made up at least of a mount service header (MNTHDR) 521. Since there may be more than one outstanding message for the combination of file and process represented by file channel 419, mount service header 521 contains pointers 527 and 529 linking header 521 to headers for other messages for the process-file combination represented by channel 419. Mount service header 521 further contains a pointer 526 to the process data structure for the process to which file channel 419 belongs.

If the message 520 is a rmessage, the parts of the message other than the data are placed in rhdr 525; when the message 520 is a treessage, the parts of the received message other than the data are placed in thdr 523; these fields thus contain the type of the message, the file identifier which mount service 203 has associated with the file, and other information as required. For example, if the message is a twrite message, thdr 523 contains the message type, the file identifier for the file, the number of bytes to be written, and the offset at which the write is to begin. Additionally, thdr 523 and rhdr 525 contain pointers 531 to mount buffers 533 which contain any data sent or received in the message.

A message 720 is transmitted by a function which takes entry 503 corresponding to file channel 419 and mount header 521 as arguments; the function uses entry 503 to locate protocol channel 517, and message 520 specified by mount header 521 is output to the connection specified by protocol channel 517. Upon transmission, the process 102 sending the message waits for the reply. When the reply arrives, it is placed in a message 520, the process is awakened, and the message 520 is read by the process 102. In a preferred embodiment, the tag in the rmessage is used to locate the proper mount header data structure 521. Functions in Plan 9 which must locate a structure 501 for a given file channel 419 do so by working through mount service array 502 until they find an entry 503 which contains a pointer 505 to the given file channel 419; the file channel is identifiable by the fact that its dev field 315 contains the identifier for the corresponding entry 503.

As is apparent from the foregoing discussion, the data structures shown in FIGS. 3–5 permit a process 102 which has a file descriptor 417 for a file to perform file access functions such as read and write on the file. They are, however, not sufficient to pertbrm file locator functions, since these functions involve path names as well as file descriptors.

Figure 6:
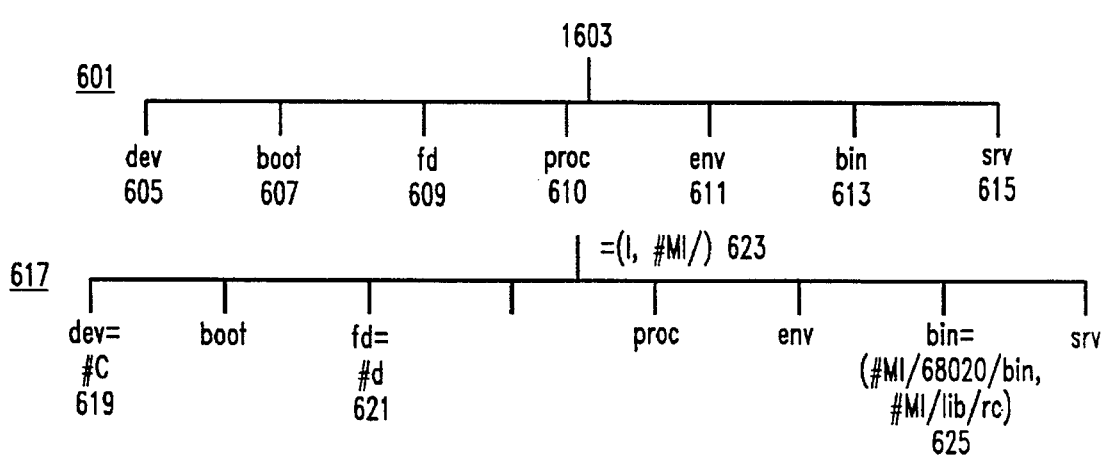
FIG. 6 is a diagram of the file tree provided by the root service and of the file tree after certain bind and mount operations have been performed.
Figure 8:
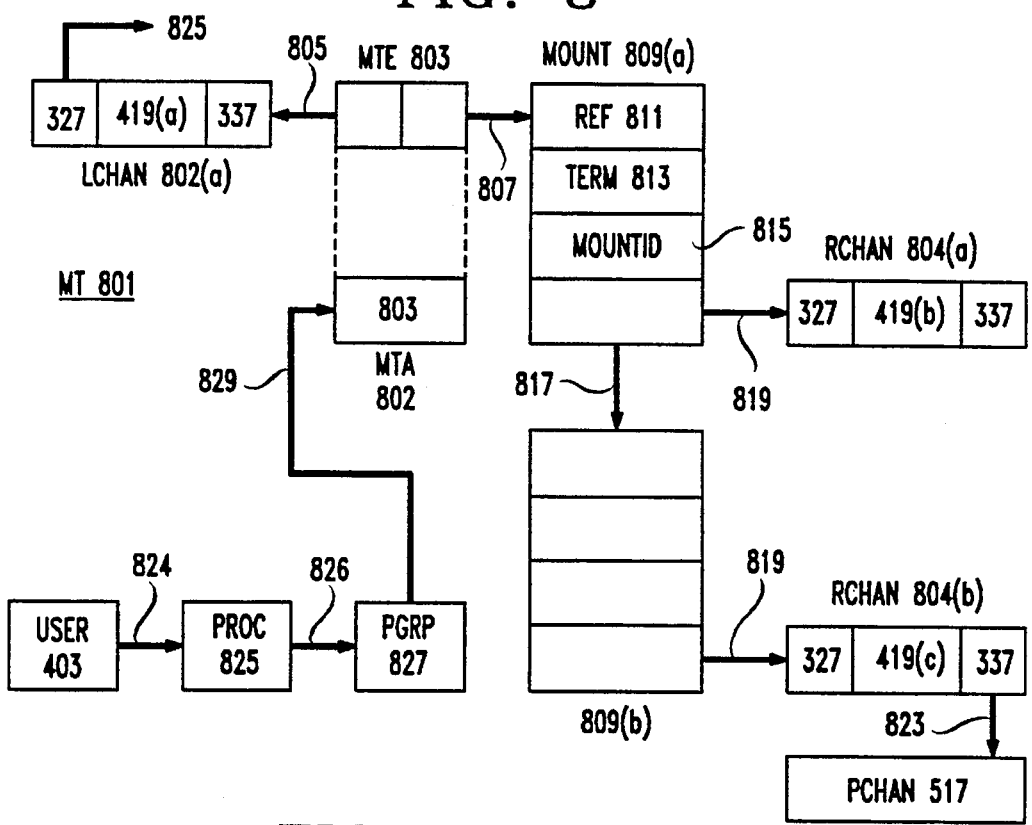
FIG. 8 is a diagram of the mount table of the present invention.
Figure 9:
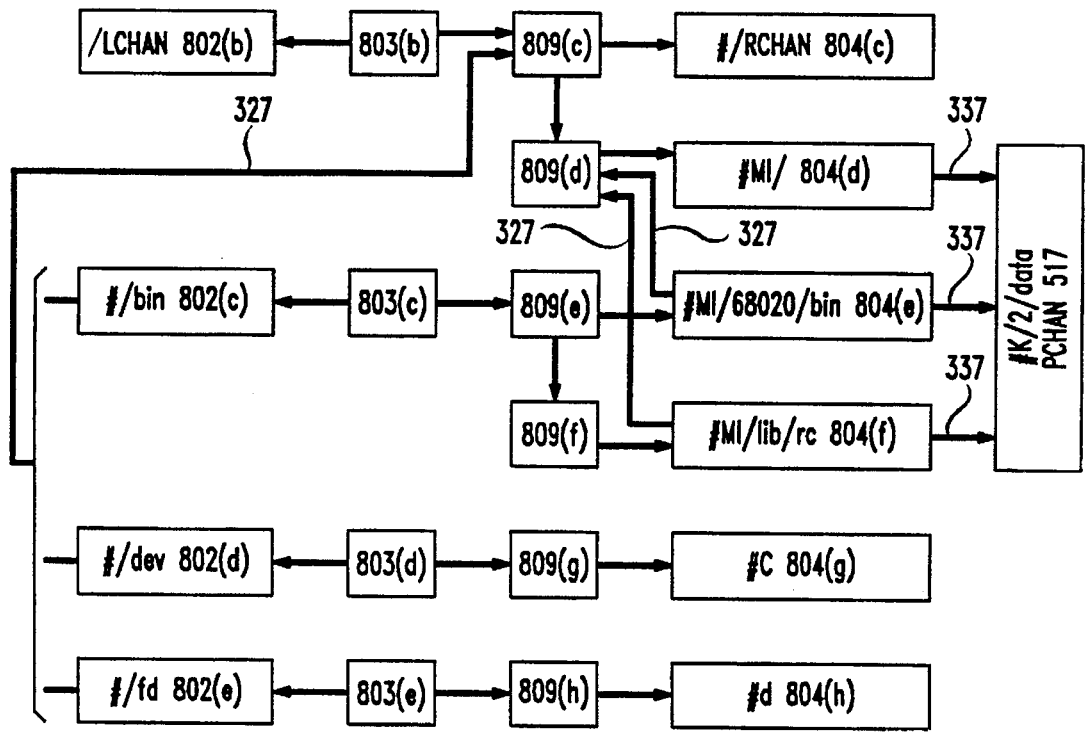
FIG. 9 is a diagram of the mount table for the second file tree of FIG. 6.

Representing Name Space 115: FIGS. 6,8,9

As previously indicated, a new process 102's name space 115 is either inherited from the process 102's parent or is built from a "stub" name space which Plan 9 makes available to a process 102 which does not inherit its parent's name space. FIG. 6 shows conceptually how a process 102's name space 115 is built from the "stub" name space. "Stub" name space 601 in FIG. 6 is provided by the root service, a kernel service which provides a root directory 603 with a single level of "files". Root directory 603 and files 605 to 615 serve only as points to which the roots of trees 125 belonging to other services 123 may be bound. In a preferred embodiment, the set of files 605 through 615 serves to divide up the kinds of services by function. The fie names correspond to functions as follows:

dev 605 is the primary location at which services are bound. Services which provide I/O functions and other services having miscellaneous functions are all bound to dev 605;

boot 607 is the location at which the service which boots the CPU upon which Plan 9 is executed is bound;

fd 609 is the location at which the service which provides duplicate file descriptors for a procees's connected files is bound;

proc 610 is the location at which the service which provides information about Plan 9 processes is bound;

env 611 is the location at which the service which provides environmental files for a process 102 is bound. These environmental files perform the same functions as the UNIX environmental variables;

bin 613 is the location at which the service which contains files of programs executed by process 102 is bound; and srv 615 is the location at which the service is bound which provides files representing protocol channels 517 for the protocol servers 209 available to process 102.

Plan 9 provides a set of built-in services which can be bound to the file names in stub tree 601; some of the services may only be bound by Plan 9 kernel functions executed by process 102; others may be bound by any function executed by process 102. In Plan 9 path names, the names of the built-in services are preceded by the "#" character. The built-in services which may be bound only by kernel functions are the following:

/: the kernel root service which provides stub tree 601;

: the kernel pipe service, which provides UNIX-style pipes for inter-process communication; and

M: mount service 603, which handles transactions with protocol servers 209.

The kernel binds the root service to the root of process 102's name space.

The built-in services which may be bound by any function executed by the process 102 include:

b: the boot service. The service has files which, when written to, cause the kernel to branch to a given address and which permits the kernel to write to a given location in virtual memory. The boot service is generally bound to boot 607;

b: the bit service. The service has files which represent a bit-mapped screen and a mouse. The bit service is generally bound to dev 605;

c: the console service. The service has files which represent a system console. The console service is generally bound to dev 605;

d: the duplicate service. The files provided by the service have names which are the file descriptors for connected files belonging to the process 102. The duplicate service is generally bound to fd 609;

e: the environment service. The files provided by the service are generally bound to env 611;

kname: the datakit service. The files provided by the service represent conversations on the datakit hardware represented by *name*. The service is generally bound to dev 605;

p: the process service described in the general overview; it is generally bound to proc 610; and s: the service registry service. The files provided by the service represent already-open protocol channels 517 which are connected to protocol services 209.

In a preferred embodiment of Plan 9, when a process 102 which has not inherited its name space 115 begins running on a Gnot 711, the Plan 9 kernel executing on the Gnot 711 performs bind operations which give its name space 115 the form shown as tree 617. Where a name in tree 609 has had a service bound to it, that fact is indicated by "=" followed by the name of the service; if the bind operation created a union directory, that fact is indicated by listing the components of the union directory in parentheses following the "=". The list is in the order in which the components will be searched. Tree 617 has been produced by the following sequence of bind and mount operations:

bind ("#/","/",MREPL), which binds the tree provided by the root service to the "/" representing the root in the path names interpreted by process 102; references to "/" are now interpreted as references to "/" 603;

mount (FD,"/",MAFTER,""), which mounts a protocol channel 517 belonging to mount service 203 on "/", and thereby creates a union directory consisting of the files accessible from the root of the root service and the root of the protocol service 209 represented by protocol channel 517. In Plan 9, that protocol service 209 provides a default file tree 125 in a default file server 705.

bind ("/68020/bin", "/bin",MREPL), which binds the tree whose root is the directory/68020/bin in default file tree 125 to the name bin 613 in stub file tree 601. The directory/68020/bin contains executable code for Gnot 711, which in a preferred embodiment has a Motorola 68020 microprocessor;

bind ("/lib/rc","/bin",MAFTER), which binds the tree whose root is the directory/lib/rc in default tree 125 to the name bin 613. Since/68020/bin has already been bound to bin 613 and MAFtER was specified, the result is a union director,/in which the directory/68020/bin will be searched before the directory/lib/rc.

bind ("#c","/dev",MREPL), which binds the tree provided by the console service #c to the name dev 605; and bind ("#d","/fd",MREPL), which binds the tree provided by the duplicate service #d to the name fd in stub tree 601.

As a result of these bindings, process 102 can refer to a file called "cc" in the directory/68020/bin of the protocol service 209 to which #M1 is connected by the path name "/bin/cc" and can refer to a file called "pwd" in /lib/rc of that same protocol service by the path name "/bin/pwd", unless, of course, there is a file "pwd" in/68020/bin. Similarly, the file "pid" provided by the #c service may be referred to by the path name "/dev/pid" and the file "0" provided by the service #d may be referred to by the path name "/fd/0".

As is apparent from the foregoing, name space 115 for a Plan 9 process 102 must contain a record of all of the bind and mount operations which have been performed on names in name space 115. That record is termed herein a *mount table*. The mount table of the preferred embodiment takes advantage of the fact that a file channel 419 for a file implicitly represents the path name for the file. Because this is the case, a record of the bind and mount operations may be made by establishing relationships between the file channels 419 representing the files represented by the old pathnames employed in the bind operations or mount operations and the file channels 419 representing the files specified by the new path names employed in the bind operations or the file channels 419 corresponding to the file descriptors employed in the mount operations. Of course, all of these file channels 419 represent files connected to some process 102 in a process group 103 from which the current process group 103 inherited its name space or by some process 102 in the current process group 103.

FIG. 8 shows a portion of mount table (MT) 801 as it is implemented in a preferred embodiment. The components of mount table 801 are located from mount table array 802, which in turn is located from user data structure 403. As shown in FIG. 8, user structure 403 includes a pointer 824 to process (PROC) data structure 825. Each process 102 has a user structure 403 and a process data structure 825. Pointer 824 in user structure 403 points to that process 102's process data structure. Process data structure 825 is further pointed to by pointer 511 in mount service queue structure 509 and itself contains a pointer to process group (PRGRP) structure 827, which represents the process group 103 to which process 102 belongs. Process group structure 827, finally, contains a pointer 829 to mount table array 802, and thereby permits location of mount table 801 for process 102 to which user structure 403 belongs.

Mount table array 802 contains an element (MTE) 803 for each old path name to which a new path name or file descriptor has been bound. A given mount table entry 803 contains two pointers. Pointer 805 is to a file channel data structure 419 which represents the file specified by the old path name. In the context of mount table 801, such data structures 419 are termed left-hand channels (LCHAN) 802. Pointer 807 is to a mount structure 809. Each mount structure 809 represents the results of one bind or mount operation. The contents of a mount structure 809 include the following:
reference field (REF) 811: This indicates whether left-hand channels other than the one pointed to by mount table entry 803 are using the mount structure;
termination field 813: this indicates whether mount structure 809 is the last in a list of mount structures 809 which define a union directory;
mount identifier field 815: this is a unique identifier for this mount structure 809 and thus for the results of the bind or mount operation represented by mount structure 809;
pointer 817: if mount structure 809 is part of a list of mount structures 809 defining a union directory and is not the last mount structure 809 on the list, pointer 817 points to the next mount structure on the list;
pointer 819: this pointer points to a file channel 419 which represents the file identified by the new path name (or in the case of mount, by the file descriptor); in the mount table context, such a file channel is termed a right-hand channel (RCHAN) 804.

As may be seen by the foregoing, each mount table entry 803 establishes a relationship between a left-hand channel 802 and one or more right-hand channels 804. Additionally, in any file channel 419 which represents a file whose path name's meaning has been altered because of a mount or bind operation, mount ptr field 327 points to mount structure 809 representing the mount or bind operation and mount identifier field 329 contains the mount identifier 815 for that mount structure 809. Furthermore, any file channel 419 which represents a file provided by a protocol server 209 includes a pointer in field 337 to protocol channel 517 for the connection to the protocol service 209 providing the file.

FIG. 8 also illustrates how mount table 801 permits implementation of the replace, before, and after options of the "mount" and "bind" functions. With the replace option, the mount structure 809 which points to right channel 804 representing the new path name simply replaces any list of mount structures 809; the before option adds the mount structure 809 to the head of any list of mount structures 809; an error results if there is no list of mount structures 809. With the after option, the mount structure 809 is added to the end of the list; again, an error results if there is no list. When a union directory is searched, the search begins with the directory represented by right-hand channel 804 pointed to by the first mount structure 809 in the list; the next directory to be searched is the directory represented by the right-hand channel 804 pointed to by the second mount structure 809 in the list, and so forth. Thus, if left-hand channel 802(a) represents the path name/M and the right-hand channel 804(a) represents a first root directory from a service 123 bound to /M and the right hand channel 804(b) represents a second root directory from a second service 123 bound to /M, then a file locator function such as "chdir("/M/.")" will result in a search for "O" first in the first root directory and if it is not found there, then in the second root directory.

As previously mentioned, a new name space 115 for a process 102 is created whenever the process 102 executes a "forkpgrp" system call; "forkpgrp" takes a single argument; if the argument has any value other than 0, the existing name space for the process 102 executing forkgrp is not to be copied into the new name space 115; if the argument has the value 0, the existing name space is to be copied When "forkgrp" is executed with a non-"0" argument, forkgrp simply makes a new process group structure 827 and a new mount table array 802 for process 102; the mount table entries 803 are then created as required for the bind and mount operations which define the new name space 115. If forkpgrp is executed with an "0" argument, mount table array entries 803 in the mount table array 802 for the process 102 executing the "forkpgrp" system call are copied into the new mount table array 802; when this is done, ref field 307 in each left-hand channel 802 pointed to by a given mount table entry 803 and ref field 811 in each mount structure 809 pointed to by that entry is incremented. As may be seen from the foregoing, the implementation of mount table 801 in a preferred embodiment is such that the creation of a new name space 105 for a process is a relatively efficient and inexpensive operation.

FIG. 9 shows the entire mount table 901 for file tree 617. In the figure, channel structures 301 are represented by long oblongs; the label on a channel structure 301 indicates the path name of the file represented by the channel 301. The first mount array entry 803(b) records the results of the bind and mount operations on the root, "/". LCHAN 802(b) representing the root, "/", is connected via entry 803(b) and two mount structures 809(c) and 809(d) to two right-hand channels, one, 804(c), for the root of the file tree provided by the kernel root service, and one, 804(d), for the root of the file tree provided by the protocol service 209 to which #M1 is connected. A mchan pointer 337 in right-hand channel 804(d) points to protocol channel 517 representing the connection to the root.

The second mount array entry 803(c) records the results of the bind operations on #/bin, represented by left-hand channel 802(c). Channel 802(c) is connected to two right-hand channels, 804(e), representing #M1/68020/bin, and

804(*f*), representing #M1/lib/rc. Since the files represented by the right-hand channels 804(*d*) and (*e*) are provided by the protocol service 209 to which #M1 is connected, both right-hand channels contain mchan pointers 337 to protocol channel 517 which provides the connection to service 209. Further, the path name #/bin of the file represented by left-hand channel 802(*c*) includes the path name #/. That directory file is represented by right-hand channel 804(*c*), and consequently, left-hand channel 802(*c*)'s mount pointer field 327 contains a pointer to mount structure 809(*c*) which points to right-hand channel 804(*c*).

As may be seen from the remainder of mount table 901, every file channel 419 in mount table 901 which represents a path name which includes a component which is represented by a right-hand channel 804 includes a pointer in mount pointer field 327 to mount structure 809 which points to the right-hand channel 804 which represents the component. Thus, left-hand channels 802(*c*), 802(*d*), and 802(*e*), all of which represent files with path names including #/, all point to mount structure 809(*c*), while right-hand channels 804(*e*) and 804(*f*), both of which represent files with path names including #M1, all point to mount structure 809(*d*). Of course, when mount pointer field 327 points to a mount structure 809, mount id field 329 in the channel 301 is set to the mount identifier for the mount structure 809.

The remaining entries 803(*d*) and 803(*e*) record bindings of built-in kernel services to the "stub" directories "dev" and "fd" provided by the kernel root service #/. In these cases, each entry 803 relates the left-hand channel 802 representing the stub directory to the right-hand channel 804 representing the built-in kernel service. Since the built-in kernel services are not protocol services, the right-hand channels have no pointers to protocol channels 517.

Figure 10:
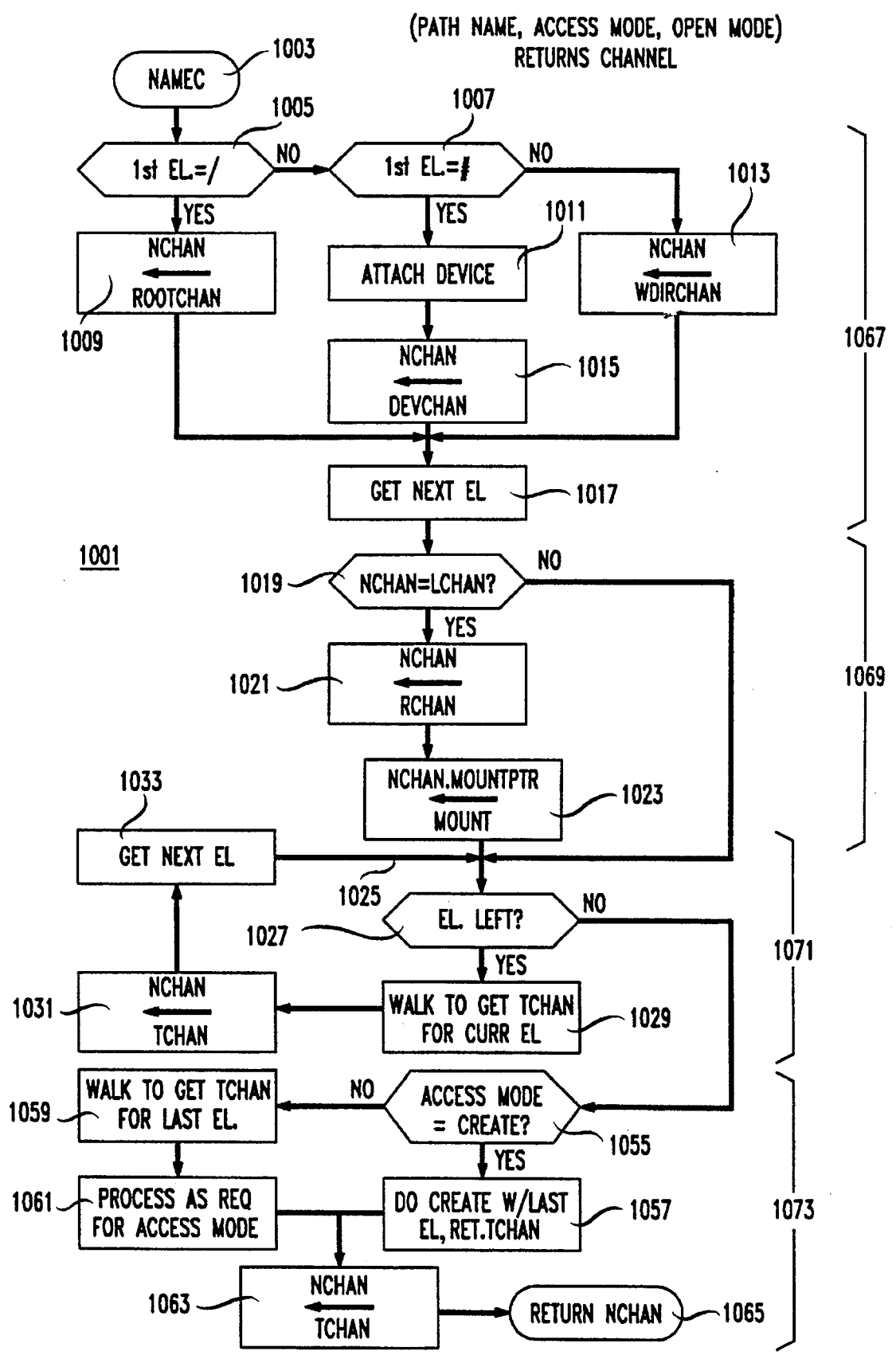
FIGS. 10A and 10B are a flow chart of the namec function in a preferred embodiment.
Figure 11:
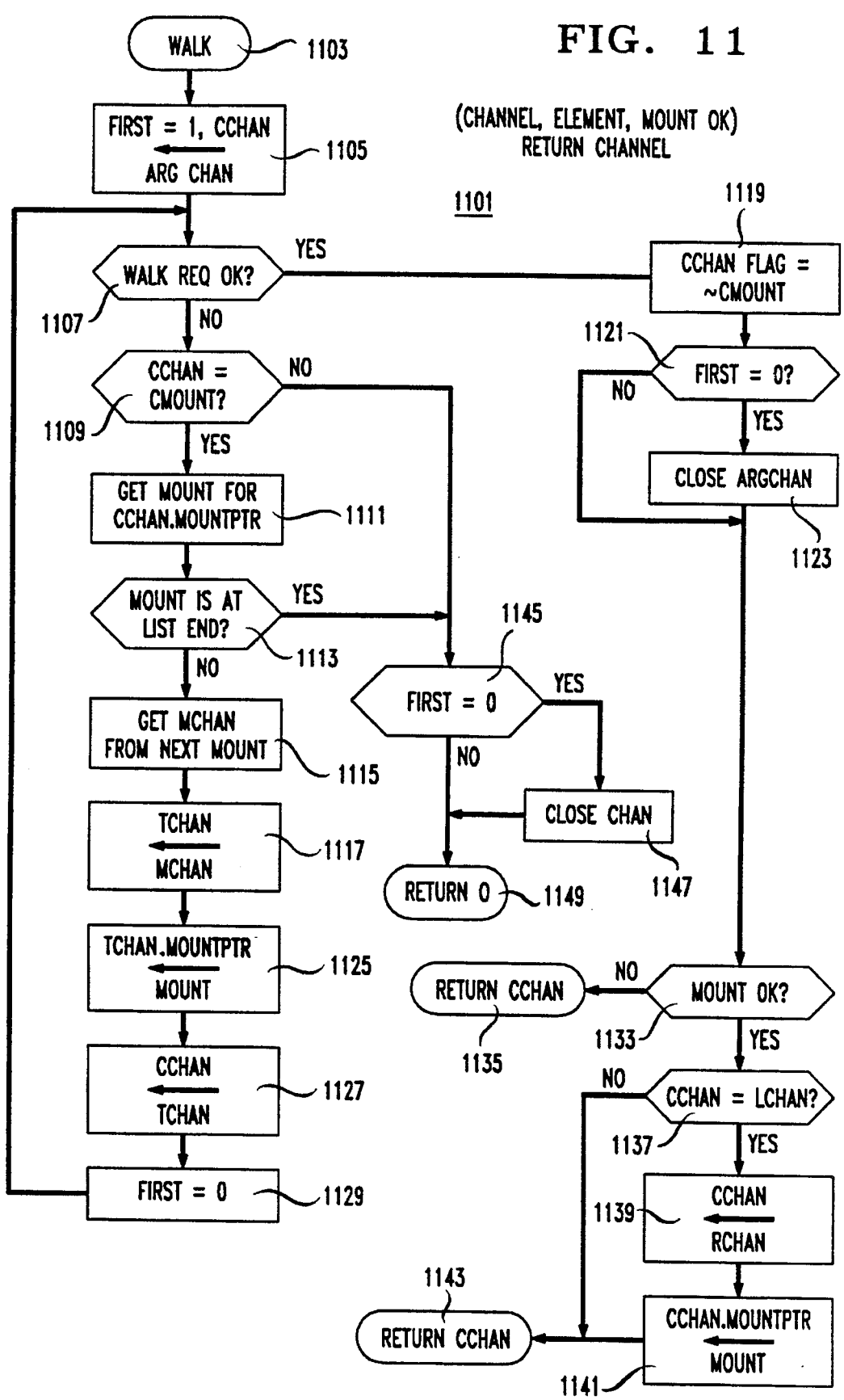
FIGS. 11A and 11B are a flow chart of the walk function in a preferred environment.

Resolving Path Names in Name Space 115: FIGS. 10 and 11

As already pointed out, mount table 801 takes advantage of the fact that every Plan 9 file channel 419 implicitly represents the path name of the the file represented by the file channel 419. When the Plan 9 operating system is presented with a path name in a file locator function such as "bind", "mount", "chdir", or "open", it *resolves* the path name by obtaining a file channel 419 representing the file specified by the path name and returning a pointer to the file channel 419. Since a process 102's file tree 117 is made up of file trees provided by services 123, the resolution of a path name involves both mount table 801 and the service requests which each service 123 responds to. The specific service requests are the walk service file locator request and in some cases the attach service file locator request.

The Plan 9 kernel function which resolves path names is termed "namec" (for name to channel). A flow chart for the function appears in FIG. 10. As shown at call oval 1003, namec takes as arguments a path name, a code for the kind of file access required by the system call which uses namec, and a code indicating how a file being opened by namec is to be opened. namec returns a pointer to a channel. namec handles the first character in the path name specially, but otherwise treats the path name as a list of names separated by "/" characters. Each of the names is termed an *element*.

The first part of namec (1067) obtains a channel 301 which represents the point at which the path name begins. The manner in which the channel is obtained depends on how the path name begins. There are three possibilities:
If the path name is a full path name, it begins with "/";
If the path name specifies a file provided by a built-in kernel service and the service has not yet been bound to another file name, the path name begins with "#";
If the path name begins at the working directory, the path name begins with a file name.
If the path name begins with "/", branch y of decision block 1005 is taken and the contents of the file channel 419 for the root are copied to a channel 301 "nchan" (1009). As previously indicated, the root file channel 419 can be located from user data structure 403 for the process.

If the path name begins with anything else, the n branch of block 1005 is taken and the first element is then tested at block 1007 to determine whether it is "#". If it is, an attach service file locator request is executed by the kernel built-in service specified by the character following the "#". The result of the attach locator request is a channel 301 which represents the root of a file tree 125 provided by the built-in service. The manner in which a given service handles the attach request depends of course on the service. For example, the attach function for the root service invokes a generic attach function, devattach, which takes the name of the built-in service as an argument, in this case, "/". devattach gets a new channel data structure 301, sets qid field 323 to the value specifying the root, and sets type field 315 to a value derived from the "/" argument. If the first element is neither "/" nor "#", the path name begins at the working directory, and as shown in block 1013, the file channel 419 representing the working directory is copied to nchan. That file channel can of course be located from user data structure 403 for the process.

The next stage, indicated by 1069, is finding out whether the path name for the file represented by nchan has been used as the old path name in a bind or mount function call. First, the next element in the path name is obtained. The function that does this sets the field ELEM 405 in user 403 to the file name which is the next element. Thereupon, mount table array 802 for the process group 103 is located from user data structure 403 for process 102. The left-hand channel 802 for each mount table entry 803 is compared with nchan in turn, until one is found that is "equal" to nchan. "Equal" in this contexts means that the two channels 301 represent the same file in the same service 123, i.e., that they have equal values in their type fields 313, their dev fields 315, and their qid fields 323.

If such a left-hand channel 802 is not found, the n branch of decision block 1019 is taken; otherwise, the y branch is taken, and the contents of right-hand channel 804 pointed by by entry 803 whose left-hand channel 802 is equal to nchan are copied to nchan (1021); thereupon mountptr field 327 in nchan is set to point to mount 809 which points to right-hand channel 804 and mountid field 329 is set to the value of mount 809's mountid. Thus, if the path name has been used as the old path name in a bind or mount call, nchan now represents the file represented by right-hand channel 804. Otherwise, it is unchanged.

Continuing with FIG. 10B, portion 1071 of namec consists of a loop 1025 which examines each remaining element in the path name. Each time through the loop, a call to a "walk" kernel function is made. The arguments used in the call are nchan, the current element (block 1029), and a flag indicating whether the current name can have a left-hand channel 802 representing its file (this is impossible only in the case of kernel built-in service names). As will be explained in more detail below, the walk function returns a channel 301 which represents the file specified by the element. That channel, termed tchan in FIG. 10, is assigned to nchan, as shown by block 1031; then, the next element is obtained from the path name (block 1033). As before, ELEM field 405 in USER structure 403 is set to the next element. When the loop is finished, the last element of the path name remains to be processed.

The manner in which the last element is processed depends on which system call invoked namec. If it was a create system call, the last element represents the name of the new file; otherwise, it represents the file to be accessed. Which system call invoked namec is indicated by the access mode argument, and as shown in decision block 1055, further processing depends on that argument. For purposes of the present discussion, it need only be noted, as shown in block 1057, that when the access mode argument indicates that a file is to be created, a create service file request is made using the last element and tchan, which at this point is a copy of the file channel 419 for the directory in which the new file is to be created. tchan consequently contains values in its type field 313 and its dev field 315 which specify the service 123 which contains the directory and the qid for the directory in its qid field 323. As a result of the create service file request, the new file is created and assigned the last element as its name and tchan's qid field is set to the qid of the new file (1057).

Otherwise, the last element represents the name of a file which already exists. In this case, the walk function is invoked again using the last element to obtain tchan, which represents the file referred to by the last element (1059). Thereupon, fields in tchan are set as required by the access mode and open mode arguments of namec (1061) and tchan is copied to nchan (1063). As shown in return oval 1065, nchan is then returned as the channel 301 representing the file specified in the path name argument.

FIG. 11 is a flow chart of the walk function. As is apparent from start oval 1103 of FIG. 11, walk takes a channel data structure 301, an element of a path name, and a flag indicating whether a mount on the element is legal. The channel data structure 301 represents a directory to be searched for a file having the element name. If the element name is found in the directory or a directory which is unioned with the directory represented by the channel data structure, the function returns a channel data structure 301 which represents the file specified by the element of the path name.

In overview, the algorithm is the following: First, a walk file service request is made to the service specified by type 313 and device 315 fields of channel 301 used as an argument. The walk file service request includes the element used as an argument. If the file service request succeeds, it returns a channel 301 for the file specified by the element; thereupon a check is made of mount table 308 to determine whether the channel 321 returned by the walk request is a left-hand channel 802; if it is not, the channel returned by the walk request is returned by the walk function; if it is, the right-hand channel 804 corresponding to the left-hand channel 802 is copied into the channel 301 to be returned by the walk function and the mount ptr and mountid fields of the channel 301 are set as required for the mount data structure 809 pointed to by the mount array element 803 which points to left-hand channel 802.

The walk file service request does not succeed if the file service cannot find a file having the name specified by the element in the directory specified by the channel. There are two reasons why this might be the case:
the directory has had another name bound to it; or
the file corresponding to the element does not exist in the directory.
In the first case, mount ptr 327 and mount id 329 specify mount structure 809 created when the other name was bound. and the walk service file locator request is attempted again with the service specified in right-hand channel 804 pointed to by mount structure 809. If the walk file service request succeeds, processing continues as indicated above. If it fails, either of the above possibilities may again hold. Assuming this time that the problem is that the file corresponding to the element does not exist in the directory, there are still two possibilities: that the file in fact does not exist, or that the directory which was searched is part of a union directory and other directories which are part of the union directory remain to be searched. If the file in fact does not exist, term field 813 in mount structure 809 for the directory which was just searched will indicate that mount structure 809 is the last one in the list of mount structures 809 making up the union directory; if not, next field 817 in mount structure 809 will point to the mount structure 809 for the next directory in the union directory, and from that next mount structure, the right-hand channel 804 to be searched can be determined. In this case, the walk service file locator request is repeated using the right-hand channel 804 pointed to by the next mount structure.

In more detail, in block 1105, a flag first, indicating that it is the first time the service file locator request will be done, is set, and the channel provided as an argument is copied into cchan. In block 1107, the walk service file locator request is performed using cchan and the element. The action which the service performs in response to the request depends on the service. Two examples may suffice here. The root service responds to the walk request by determining whether cchan has a special value in qid field 323 which is reserved for the root of the root service and if it does, whether the element is one of the names which the root service provides as "stubs". If the latter is the case, cchan's qid field 323 is set to the special value reserved for that stub name; otherwise, the walk service locator request fails.

Mount service 203 responds to the walk request as follows: as previously mentioned, part of dev field 315 of channels 301 representing files provided by protocol services 209 contains an identifier specifying a mount service array entry 503. Using that identifier, mount service 203 locates mount service queue 509 for the protocol channel 517 for the protocol service 209; allocates a mount header 521 for the treessage required for the walk service locator request, and places the file identifier from the channel and the element in the tmessage. If the protocol service 209 has a file with the name specified by the element in the directory specified by the file identifier from the channel, it returns an rmessage containing a qid for the file, and that qid is placed in qid field 323 of cchan.

If the walk request succeeds, flag 321 in cchan is set to indicate that the channel 301 is not the result of a mount or bind operation (1119). The next step is to determine whether the walk request has been done more than once (1121). If that is the case, the channel received as an argument will not be the one returned, and the channel received as an argument may be closed (1123). The close operation decrements the count in the channel's ref field, and if the ref field then has the value 0, sends a clunk service request to the service indicated by the channel's dev field 315 and returns the channel structure 301 to the free list. If it's still the first time that the walk request has been made, that step is skipped. The next step (decision block 1133) is to determine whether cchan represents a component of a pathname which may have another component mounted on it. This is true for any component other than "#" and is indicated by the "mountok" argument of walk. If there can be no mounted component, there is no need to look in mount table 801, and cchan is returned as it is (1135). Otherwise, mount table 801 is examined for a left-hand channel 802 which is equal to cchan, and if such a left-hand channel 802 is found, the value of right-hand channel 804 corresponding to left-hand channel 802 is copied into cchan, along with the mount ptr and the mount identifier for mount structure 809 pointing to the right-hand channel 804. cchan is then returned as thus modified (blocks 1137 to 1143).

Returning to walk service request block 1107, if the request fails, the first step is to determine whether cchan is the result of a mount or bind request. If it is, the search has failed and as may be seen at connector "B", the walk function returns 0, indicating failure (oval 1149). As shown in blocks 1145 and 1147, if the walk request has been done more than once, cchan is closed. Next, the value in cchan's mount ptr field 327 is used to locate a mount structure 809 (block 111). If the mount structure 809's term field 813 indicates that the mount structure is at the end of the list of mount structures 809 defining a union directory, the search has failed, and walk ends as shown at connector B. Otherwise, the pointer next 817 in the current mount structure 809 is followed and the right-hand channel 804 pointed to by the next mount structure 809 is copied into a temporary channel, tchan (block 1115). The mount ptr 327 field in tchan is then set to point to the next mount structure (block 1125), tchan is copied to cchan (1127), first is set to 0, and as shown by the connector "D", the walk service request in block 1107 is repeated. As indicated above, the loop 1131 defined by connector D is repeated until either the walk request in block 1107 succeeds or it is clear that the file corresponding to the element has not been found.

Implementing File Locator Operations

Once name resolution in Plan 9 is understood, the implementation of file locator system calls such as "open", "bind", and "mount" is straightforward. Beginning with open, the system call takes a path name and an integer specifying a mode of opening as argument and returns a file descriptor 417 for the opened file. The system call first locates an element 415 in file descriptor array 413 which does not presently point to a channel 301; the number of that element is the file descriptor for the newly-opened file. Then the system call invokes namec. The arguments are the path name, an access mode specifier specifying open, and the mode of opening. As indicated above, namec resolves the path name, specifies that the service indicated by the path name performs an operation on the file specified by the path name, and returns a channel 301 with fields set such that the channel 301 is now a file channel 419 representing the file. The open system call places a pointer to the file channel 419 in the file descriptor array element 415 specified by the file descriptor and returns the file descriptor.

The "bind" system call in a preferred embodiment takes as arguments a pointer to the new pathname, a pointer to the old path name, and a flag indicating whether the bind is being done with the replace, before, or after options. It returns an integer which has the value "1" if the bind succeeded and "0" if it did not. The system call calls a kernel function called "bindmount" which does both binds and mounts. A flag provided by the "bind" or "mount" system call indicates which is to be done. When a "bind" system call is indicated, bindmount calls namec with the first path name to obtain a first channel 301 representing the file specified by the first path name. Then it calls namec with the second path name to obtain a second channel 301 representing the file specified by the second path name. The next step is to call a kernel mount function. The function rearranges mount table 801 as required for the bind operation.

Figure 12:
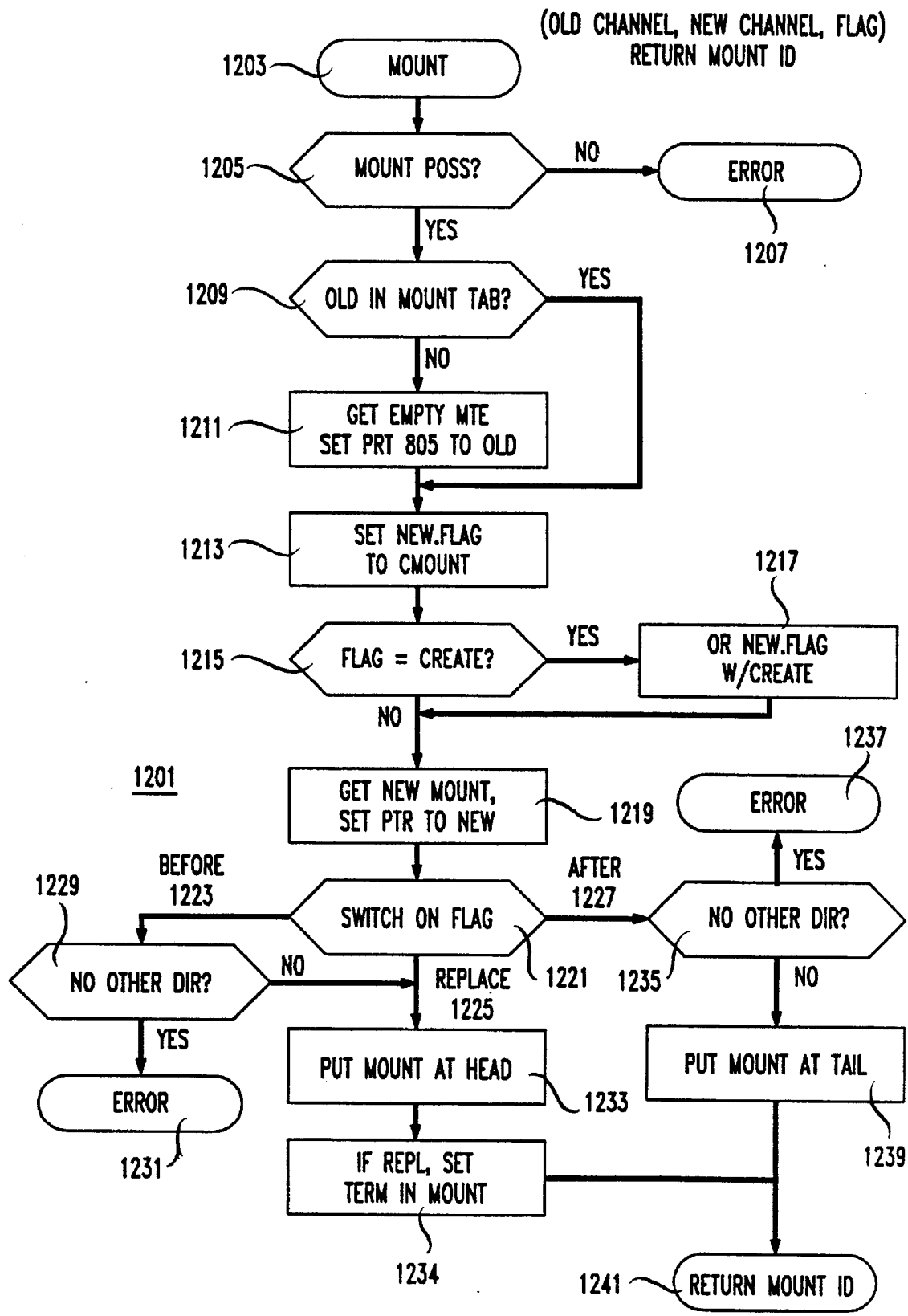
FIGS. 12A and 12B are a flow chart of the mount function in a preferred environment.

FIG. 12 is a flow chart of the kernel mount function. As shown at oblong 1203, the function takes the old channel, the new channel, and a flag as arguments, and returns the mount id of mount structure 809 resulting from the bind or mount. The flag is set from the options flag of the bind or mount system call. In the present case, the actual argument for the old channel is first channel 301, and the actual argument for the new channel is second channel 301.

The first step in the algorithm is to determine whether the bind or mount operation can be performed on the channels 301 received as arguments (1205). The operation is not permitted if both channels specify the same file (i.e., have the same qid 323) or if the old channel represents a file which is not a directory and the flag specifies an option other than replace. When the operation is not permitted, an error results, as indicated in 1207. The next step is to search mount table 801 as already described to determine whether old channel 301 is equal to a left-hand channel 802 which is already in mount table 801. If it is, no new mount table entry 803 is required, and block 1211 can be skipped. If not, block 1211 obtains an empty mount table entry 803 and sets pointer 805 in that entry 803 to point to the old channel.

Next, flag field 321 in new channel 301 is set to indicate CMOUNT, indicating that it is a right-hand channel 804 (1213). Flag field 321 may also indicate a CREATE option, which specifies that files may be created in the directory represented by right-hand channel 804. When that option is specified, flag field 321 in new channel 301 is set to indicate the CREATE option as well as CMOUNT (1215,1217). Thereupon, the mount function gets a new mount structure 809 to link the mount table entry for the left-hand channel 802 corresponding to the old channel with the right-hand channel 804 being made from new channel 301. Pointer 819 in the new mount structure is set to point to new channel 301 (1219).

Following connector "A", it may be seen that the next step is a switch statement 1221 which specifies one of three paths, depending on whether the flag argument indicates the replace, before, or after option. With before path 1223, a check is made at 1221 to determine whether another directory has already been bound to left-hand channel 802; if not, no union directory is possible and the before option is in error (1231). If such a directory already exists, processing continues as for replace option 1225. In that option, the new mount structure 809 is put at the head of the list of mount structures 809 corresponding to left-hand channel 802 equivalent to old channel 301 (1233). If replace option 1225 is being exercised, term 813 in the new mount su-ucture is set to indicate the end of the list (1234). In after option 1227, finally, a check is again made at 1235 to determine whether a union directory is possible, and if not, error 1237 results. Otherwise, as shown in block 1239, the new mount structure 809 is put at the tail of the list of mount structures 809. mount then returns mount identifier 815 belonging to the new mount structure 809. Continuing with bindmount, that function finishes by closing the old and new channels 301, returning whichever of them was not added to the mount table and is not otherwise in use to the list of tree channels.

The system mount function call differs from the system bind function call in that there is no new path name argument. Instead, that argument is replaced by an argument which is a file descriptor 417 which represents an open protocol channel 517. The manner in which such a file descriptor 417 is obtained will be desribed in more detail below. Additionally, the system mount function call includes an argument which consists of data which is passed through to the protocol service 209 being mounted. In response to the flag, bindmount first uses file descriptor 417 and file descriptor array 413 to locate the protocol channel 517 specified by the file descriptor argument.

Next, a mount service attach operation is performed using the protocol channel 517. The first thing done in the attach operation is to locate an unused mount service array element 503. That done, the generic devattach operation previously described above is performed, except that the argument used to invoke it is "M", specifying mount service 203. devattach returns a channel structure 301 with its type field 313 field set to specify mount service 203, and the attach function for the mount service sets dev field 315 in the channel to the value of the identifier for the unused mount service array element 503 and sets pointer 505 in the unused element to point to the channel structure. Next, the protocol channel argument is used to determine whether there is already a message queue, represented by a mount serviced queue structure 509, for the protocol channel 517 specified by the argument. If there is not, one is allocated. Thereupon, an attach tmessage is sent which contains the file identifier for the channel 301 returned by devattach and the argument which was to be passed on to the protocol service 209. When the rmessage returns, it contains a qid for the root of file tree 125 in the protocol service 209. The qid is copied into the qid field 323 and mqid field 339 of the channel 301 returned by devattach, and a pointer to protocol channel 517 to which the message queue belongs is copied to pchan field 337. The channel resulting from the mount service attach operation is then provided as the new channel 301 argument to the mount function. When mount is specified for the bindmount function, bindmount finishes by closing protocol channel 517 from file descriptor array 413 and removing it from file descriptor array 413.

Obtaining an Open Protocol Channel 517: FIG. 13

The arguments for the mount system call include a file descriptor 417 for an open protocol channel 517. The protocol channel 517 is a channel 301 which represents a file which is a connection to a protocol service 209. In a preferred embodiment, the connection may either be a file in a pipe by which a local protocol service 211 sends and receives messages or a file which represents a conversation via a communications system with a remote protocol service 213. In a preferred embodiment, file descriptors for the files in a pipe are provided by the "pipe" system call which creates the pipe. File descriptors for files representing a conversation via a communications system are obtained as follows: first, a "dial" function is invoked. The function returns the path name of the directory which contains the file representing the conversation. Then the path name of the file representing the conversation is used in an "open" function, and the open function returns the file descriptor for the file representing the conversation.

A protocol channel 517 may be made available for general use by processes 102 by *registering* the protocol service 209 for which protocol channel 517 represents the connection in srv 615. As is the case with all services, srv 615 presents the resources it manages as files; consequently, to register a protocol service 209 in srv 615, one creates a file representing the protocol service 209 in the directory represented by srv and then writes the file descriptor for the file representing the connection to the created file.

Of course, the invocation of the system create function results in a create file request to srv, and srv responds to the create request by making a directory entry for the file and placing a qid for the directory entry in field 323 of the channel 301 for the created file and a pointer to the directory entry in auxiliary field 333. The invocation of the system write operation similarly results in a write file request to srv, and srv responds to the write request by placing a pointer to the protocol channel 517 specified by the file descriptor in the directory entry for the protocol service 209. When the open system call is made using the name of the file representing the protocol service 209, the resulting open file request to srv 615 results in srv 615 returning protocol channel 517 for the protocol service 209. Open then provides protocol channel 517 with a file descriptor 417 as already described, and that file descriptor 417 may be used in the mount system call.

FIG. 13 shows data structures 1301 employed by srv service 615 to register a protocol service 209. The directory maintained by srv 615 is made up of a tree of directory entries 1303. Each directory entry 1303 contains directory information 1305 and a number of pointers. The pointers organize directory entries 1303 into a tree. There may be one or more directory entries 1303 at each level of the tree and an entry 1303 at a given level may either be an interior node, i.e., point to the next lower level of the tree, or a leaf node representing a protocol service 209. Interior nodes are termed hereinafter "parents". Entries 1303 having a given parent are connected into a child list 1310 by next pointers 1311 and back pointers 1313; additionally, each entry 1303 in a given child list 1310 has a pointer 1309 to its parent entry 1303. Parent entries 1303 further have a pointer 1307 to the first entry 1303 in child list 1310. Leaf nodes may have a pointer 1314 to protocol channel 517 representing the connection to protocol service 209 represented by the leaf node. Additionally, when an entry 1303 is represented by a channel 301, aux field 333 in that channel 301 contains a pointer 1302 to entry 1303 represented by the channel.

Directory information 1305 contains the following fields:
name 1315: the name used to identify protocol service 209 when it is registered;
qid 1317: the qid which represents directory entry 1303 in channels 301 representing that directory;
type 1319 and dev 1321: these specify srv 615;
mode 1323: set when the directory represented by entry 1303 is opened to indicate the open mode;
atime 1325: indicates when entry 1303 was allocated;
mtime 1327: indicates when entry 1303's parent was allocated, or if entry 1303 is a parent, the latest time when a child was created;
length 1329: if entry 1303 is a parent, indicates the number of child entries 1303; and
uid 1331: a string value naming the user who owns the entry 1303; and
gid 1333: a string value identifying a group to which the user identified in uid 1331 belongs.

The foregoing has shown in detail how the Plan 9 operating system implements a per-process name space, how the name space may be modified by means of bind and mount operations, how the name space may be employed to locate files, and how file operations may be performed on the files thus located. In the following, two particularly advantageous uses for the per-process name space will be explored.

The Plan 9 Window System: FIGS. 14–23

A *window* system is the subsystem of the operating system which provides a process 102 executing under the operating system with a window on a graphics terminal and which responds to inputs from the keyboard or a pointing device such as a mouse to the window. Prior-art window systems such as X windows are large and complex systems. Plan 9's definition of functions available to processes as file trees and the capability of a Plan 9 process 102 to define its own name space 115 have made it possible to construct a window system which has substantially the same functionality as a prior-art window system such as X windows, but requires substantially less code. A presently-preferred embodiment is less than 1/10 the size of X windows. Further, the principles employed in the design of the Plan 9 window system may also be used to design efficient window systems for other operating systems. In the following, there will first be presented an overview of the Plan 9 window system; thereupon, certain aspects of the system which are responsible for its efficiency will be discussed in more detail.

Figure 15:
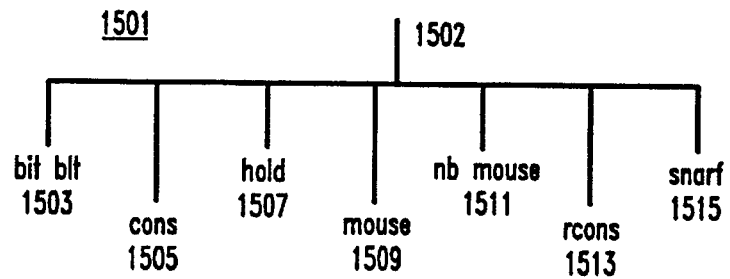
FIG. 15 is a diagram of the file tree provided by the window service.

Overview of the Plan 9 Window System: FIGS. 14 and 15

The Plan 9 terminal, Gnot 711, includes a keyboard, a graphics display, and a mouse. These devices may be incorporated into the name space 115 of a plan 9 process 102 by binding the kernel services #b and #c to the directory/dev 619. When such bindings are performed,/dev/mouse refers to the mouse, /dev/cons refers to the keyboard, and/devfoitblt refers to the graphics display. Graphics operations can be carried out by opening these files and performing read and write operations as appropriate. For example, motion of the mouse may be determined by a read operation on/dev/mouse and a display may be created on the graphics display by writing to/dev/bitblt.

The Plan 9 window system is implemented as a protocol service 209. The window protocol service provides instances of files to processes 102 which have windows on Gnot 711. A process controls its window by reading and writing files provided by the window service. The window service is implemented by means of a set of processes which have name spaces which include the files/dev/mouse,/dev/cons, and/dev/bitblt. As will be explained in more detail later, those files may be provided by any service 123; the only requirement is that a read or write operation to the file eventually result in a read of data from a window displayed on a terminal or a write of data to a window displayed on a terminal. Most commonly, the files are provided by the kernel services #b and #c or by another window protocol service of which the window protocol service in question is the client and the windows controlled by the files are displayed on a Gnot 711.

Because the window service is a protocol service 209, the read and write operations go to mount service 203, which translates the operations into tmessages to the window service and awaits the return of data in rmessages from the window service. When the data returns to mount service 203, it is returned to process 102 which performed the read or write operations. The window service responds to the tmessages by translating them into reads and writes on the files/dev/mouse,/dev/cons, and/dev/bitblt which are part of the window service's name space; the responses to these reads and writes are translated into rmessages and returned to mount service 203. The window service thus effectively multiplexes the/dev/cons,/dev/mouse, and/dev/bitblt files in its name space among a plurality of processes 102. Or put another way, the window service provides processes 102 with a set of virtual terminals.

FIG. 15 shows file tree 1501 which the window service provides to a process 102. Root 1502 is a directory which contains the following files:

bitbit 1503: writes to this file result in changes in the graphics display in the window for the process 102; reads from the file return information about the display in the window for the process;

cons 1505: reads from this file obtain input from the keyboard connected to Gnot 711; writes to the file cause characters to be output to the display at the cursor position;

hold 1507: This file indicates how process 102 is to respond to newline characters obtained in reads from cons 1505;

mouse 1509: reads from this file obtain input from the mouse connected to Gnot 711;

nbmouse 511: reads from this file also obtain input from the mouse, but do not wait for a change in the state of the mouse;

rcons 1513: reads from this file obtain unprocessed input from the keyboard connected to Gnot 711; and snarf 1515: this file is used to transfer data between windows; a write writes data from a window into the snarf file; a read reads the data in the snarf file into a window. Each time a process 102 mounts file tree 1501 in its name space 115, it receives a new instance of file tree 1501, i.e., instances of the files in that file tree 1501 are accessible only via connections which stem ultimately from the process 102 which did the mount operation. As indicated in the general discussion of services 123, the window service can provide a new instance of file tree 1501 each time file tree 1501 is mounted in a process 102's name space because the channels 301 which represents the files provided by the window service to process 102 identify the files by qids which are provided by the window service. Thus, a file/dev/bitblt for one process 102 has a qid different from the file dev/bitblt for another process 102, and a write by a process 102 to the file dev/bitblt is a write only to the file/dev/bitblt for that process 102.

FIG. 14 provides an overview of a window service 1405 which has the files provided by kernel service #b 1411 and #c 1419 in its name space and which is providing windows on Gnot 711 to a set of processes P 102(*a*) through P 102(*n*). Each process P 102 is connected by means of pipe 1403 to window service 1405. As previously explained, operations on the files provided by window service 1405 become treessages and rmessages 205 and 207 on pipe 1403 between window service 1405 and the processes 102. The files provided by window service 1405 appear as 1406 in FIG. 14. Each time a process 102 mounts the file tree 1502 provided by service 1405, the process receives a slot 1407 in files 1406. The slot includes a full set of the files 1409(0..k) provided by service 1405 to the process 102; thus, slot 1407(*a*) contains instances of files 1409(0..k) for process 102(*a*), and so forth.

Window service 1405 translates the messages 205 and 207 specifying file operations on files 1409 for a given process 102 into function calls 217 and 219 specifying operations on the files provided by kernel #b service 1411 and kernel #c service 1417. When #b is bound to/dev 605, read function calls 1421 on/dev/mouse 1413 obtain input from mouse 1423, while read and write function calls 1425 on/dev/bitblt 1415 control display 1427. Similarly, when #c is bound to/dev 605, read function calls 1429 on/dev/cons 1419 obtain input from keyboard 1431.

Figure 18:
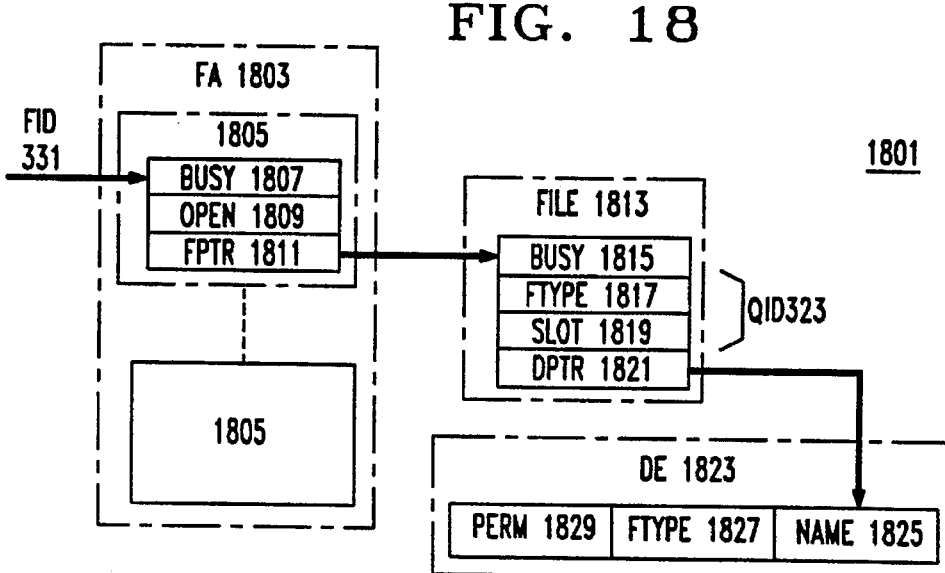
FIG. 18 is a diagram of the implementation of the file tree provided by the window service.
Figure 19:
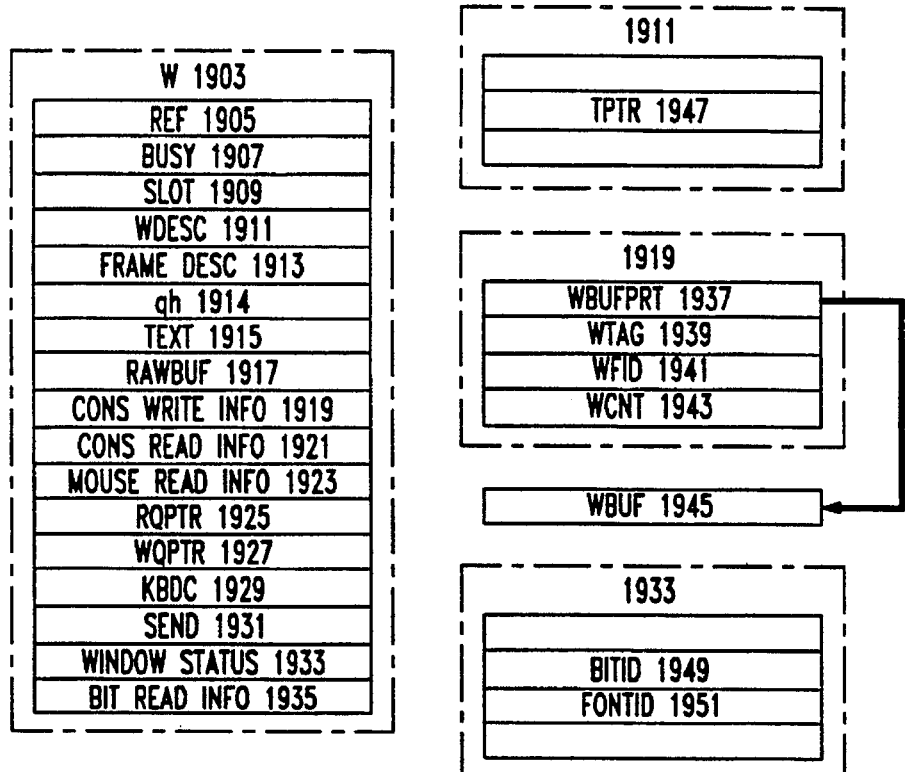
FIG. 19 is a diagram of the window data structure employed in the window service.

Implementation of File System 1406; FIGS. 18 and 19

FIG. 18 shows the data structures 1801 employed in a preferred embodiment to implement and locate the instances of files in the file trees 1501 which window service 1405 provides to processes 102. As previously mentioned, when a file provided by a protocol service 209 is opened, the open tmessage sent by mount service 203 to the protocol service 209 includes a file identifier (FID) 331; in response to the open tmessage, protocol service 209 associates the file identifier 331 with a qid 323 which protocol service 209 uses internally to identify the file. The open rmessage returned by protocol service 209 includes the qid 323, and both fid 331 and the qid 323 associated with it by protocol service 209 are included in channel 301 representing the open file.

Beginning with file array 1803, array 1803 contains an entry 1805 for every instance of a file being currently provided by protocol service 209. An entry 1805 for a given instance is indexed by file identifier 331 for the instance. Each entry 1805 contains three fields: busy field 1807, indicating whether the entry 1805 is in use; field 1809, indicating whether the instance is open; and file pointer field 1811, which points to file structure 1813 for the instance. File structure 1813 contains the following fields:

busy 1815, indicating whether the instance is busy;
file type 1817, indicating which of the files in file tree 1501 the file is.
slot 1819: a value which indicates which slot 1407 the file belongs to; file structures 1813 for all files in a given file tree 1501 have the same value in slot 1819; and
description pointer (dptr) 1821, which points to an entry 1823 in an array of descriptors for the files which may be present in a directory tree 1501.

File type 1817 and slot 1819 are concatenated together to produce qid 323 for the instance. Descriptor entry (DE) 1823, has three fields: a character string name 1825, which is one of the names in file tree 1501, a file type value 1827 which is the file type corresponding to the name and which has the same value as ftype field 1817, and a permissions field 1829, which specifies how the field may be used.

Each of the possible values of slot 1819 corresponds to a data structure which represents the window in display 1427 which will be controlled by tmessages to file tree 1501 represented by the slot. Window data structure 1903 is shown in FIG. 19; it contains the following classes of information:

ref field 1905 indicates whether there is a file tree 1501 corresponding to the value of slot 1819;
busy 1907 indicates whether window data structure 1903 is currently in use;
slot 1909 is the slot value to which window 1903 corresponds;
wdesc 1911 is information which describes the window represented by structure 1903;
frame desc 1913 is information which describes which portion of the window specified by wdesc 1911 is presently being displayed;
qh 1914 is a pointer to a character in text 1915;
text 1915 contains text to be displayed in the window;
rawbuf 1917 is a buffer containing raw (unprocessed) input to the window from keyboard 1431;
console write information 1919 is information received in a twrite message specifying the file cons 1505;
console read information 1921 is information to be sent in response to a tread message specifying the file cons 1505;
mouse read information is information to be sent in response to a tread message specifying the file mouse 1509;
read queue pointer (rqptr) 1925 is to a queue of tread messages specifying files in the file tree 1501 represented by the slot;
write queue pointer (rqptr) 1927 is to a queue of twrite messages specifying files in the file tree 1501 represented by the slot;
kbdc 1929 contains a keyboard character of interest to the window;
send 1931 is a flag indicating that a change in the window requires that an rmessage be sent;
window status 1933 is information indicating the present status of the window; and
bit read information 1935 is information needed to read bits from the window's bit map.

File Locator Operations on a File Tree 1501

As a protocol service 209, window service 1405 receives tmessages from mount service 203 and responds to the tmessages with rmessages which it returns to mount service 203. In the following, the manner in which window service 1405 responds to certain of the tmessages will be explained to provide an example of the interaction between mount service 203 and protocol service 209 as seen from the protocol service 209.

Two of the operations specified by treessages are the attach and walk file locator operations. Beginning with the attach operation, as previously described, the execution of a mount system call results in mount service 203 sending an attach rmessage to the protocol service 209 represented by the protocol channel 517 whose file descriptor 417 is used in the mount system call. In a preferred embodiment, the mount system call further includes data which mount service 203 sends in the tattach message to protocol service 209; when protocol service 209 is a window service 1405, the data includes a slot number. Window service 1405 responds to the tattach message by finding entry 1805 for the file identifier included in the tattach message and setting busy 1807 to 1 and open 1809 to 0; then it allocates a file structure 1813 for the instance, sets slot field 1819 to the value provided in the tattach message, sets busy 1815 to 1, ftype 1817 to a value which specifies a root directory, and dptr 1821 to point to directory entry 1823 for root 1502. The rattach message returned by window service 1405 includes a qid 323 made from ftype 1817 and slot 1819. Finally, the reference count in window 1905 associated with the slot is incremented.

As previously described, the walk tmessage is generated when a channel 301 involved in the resolution of a path name represents a file in a protocol service 209. The treessage specifies the file identifier 331 for a directory in protocol service 209 and the name of a file in that directory. The rmessage returns the qid for the instance specified by the name. The file identifier 331 in the tmessage is now associated with the returned qid. In a preferred embodiment, window service 1405 responds to the walk tmessage by locating entry 1805 for the file identifier 331 and then looking at the name. If the name is ".", indicating root 1502, file 1813 pointed to by file pointer 1811 in entry 1805 will describe the root directory. In this case, the qid 323 in that file 1813 is returned in the rmessage; otherwise, the array of file descriptions is searched until description entry 1823 is found which has name field 1825 corresponding to the name. The value of ftype field 1827 from the entry 1823 and the value of slot 1819 from file 1813 for the directory are saved. Then, all of the file structures 1813 which are currently in use are searched for one which has the saved slot value in slot 1819 and the saved ftype value in ftype field 1817; if one is found, the saved values are returned as qid 323; if one is not found, a new file structure 813 is allocated, field 1817 is set from the saved ftype value, field 1819 is set from the saved slot value, dptr 1821 is set to point to the entry in the array of file descriptions which had the name, busy is set to 1, and fptr 1811 in entry 1805 for the file identifier 331 is set to point to the new file structure. The saved slot and ftype values are then returned as qid 323.

Internal Structure of Window Service 1405: FIGS. 16-19 and 21

Figure 16:
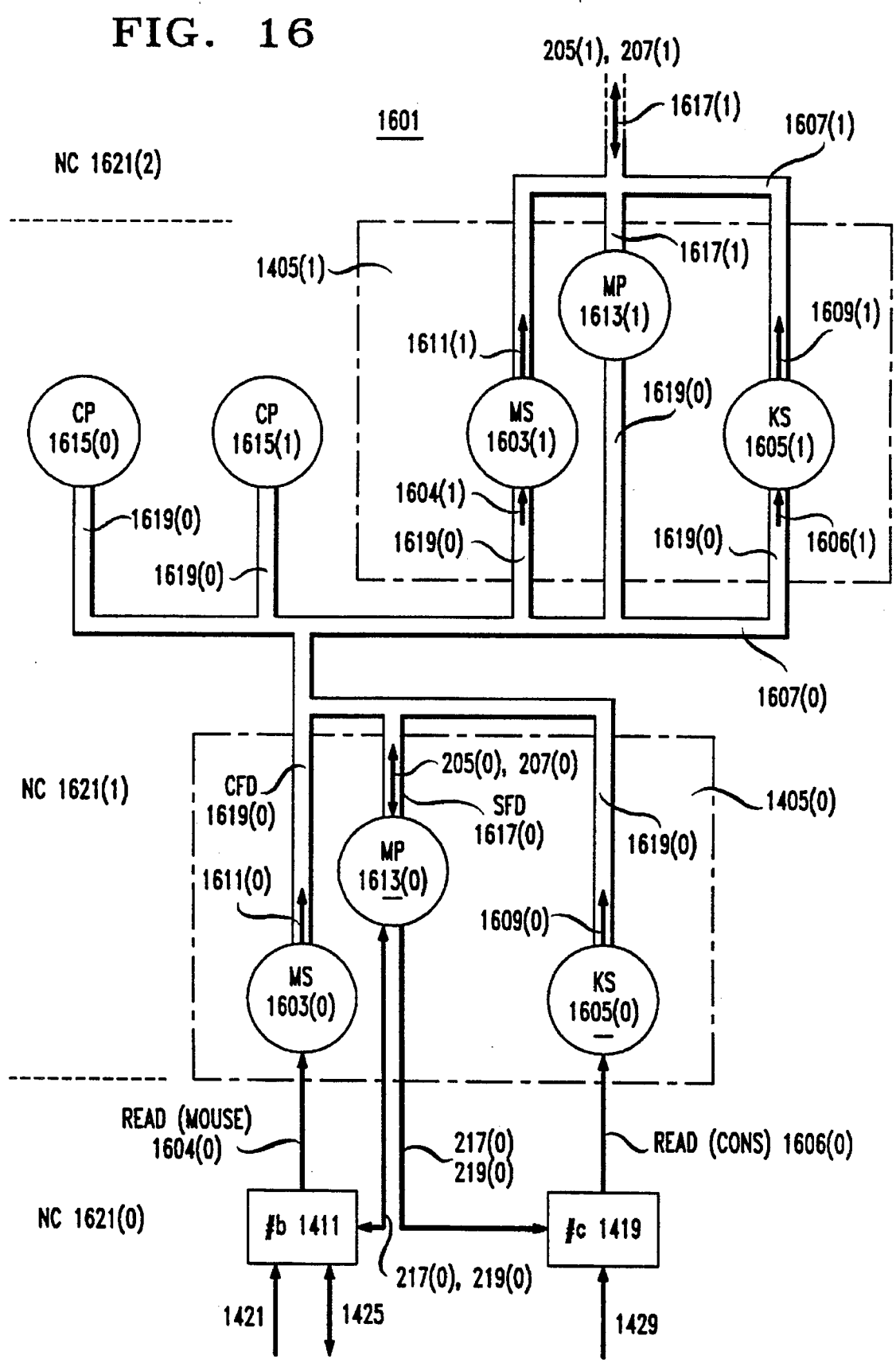
FIG. 16 is an overview of the structure of the window service.

In a preferred embodiment, a window service 1405 is implemented by means of three processes 102 executing under the Plan 9 operating system. FIG. 16 shows these three processes in window service 1405(0) and their relationship to the kernel services #b 1411 and #c 1419 and to processes 102 which are clients of window service 1405. The client processes appear in FIG. 16 as CP 1615(0), CP 1615(1), and the three processes which make up a second window service 1405(1), which is also a client of window service 1405(0) and itself has clients which are not shown in FIG. 16 There are thus three levels of terminal services present in FIG. 16: real terminal services provided by the kernel services #b and #c, a first level of virtual terminal services provided by window service 1405(0) to its clients, and a second level of virtual terminal services provided by window service 1405(1) to its clients. As will be explained in more detail below, each level of terminal services corresponds to a different name context (NC) 1621. For example, in name context 1621(0), the file name "mouse" refers to the mouse file provided by kernel service 1411; in name context 1621(1), the file name "mouse" refers to a file in one of the file trees 1501 provided by window service 1405(0); in name context 1621(2), the file name "mouse" refers to a file in one of the file trees 1501 provided by window service 1405(1).

Beginning with window service 1405(0), the three processes making up window service 1405(0) are main process 1613(0), mouse slave process (MS) 1603(0), and keyboard slave process (KS) 1605(0). Main process 1613(0) receives tmessages from the clients of window service 1405(0) via pipe 1607(0) and responds by providing rmessages via pipe 160F(0) to the clients. The tmessages and rmessages appear as 205(0) and 207(0) in FIG. 16. Where a tmessage requires an operation on a file provided by #b 1411 or #c 1419, main process 1613(0) uses Plan 9 read and write system calls to perform the necessary operation. As previously explained, the Plan 9 operating system automatically converts the file system calls into requests 217 and 219 of the kinds which are proper to file services #b or #c.

Mouse slave process 1603(0) and keyboard slave process 1605(0) are necessary because a process 102 which performs a file read operation on the mouse file provided by #b 1411 or the cons file provided by #c 1419 will block until there is actually data to be read from the file. Since main process 1613(0) must be continually available to respond to tmessages from its clients, it cannot block, and therefore cannot directly perform read operations on the mouse file in #b or the cons file in #c. These reads are done by mouse slave process 1603(0) and keyboard slave process 1605(0) respectively. The two slave processes are both clients of main processor 1613(0). The operation of mouse slave process 1603(0) is typical for both. Mouse slave process 1603(0) simply executes a loop in which it does a Plan 9 system read call on the file mouse provided by #b 1411 and then does a plan 9 system write call on the file mouse in one of the file trees 1501 provided by window server 1405(0). By convention in a preferred embodiment, the file tree 1501 written to by slave processes 1603(0) and slave process 1605(0) is always the one which has slot 1407 0. The Plan 9 operating system of course automatically converts the file system calls to the mouse file provided by #b to the appropriate request 215 and the file system calls to the mouse file provided by window server 1405(0) to write tmessages 1611(0) which are sent via pipe 1607 to main process 1613, which responds to them in the same fashion as to treessages from any other client.

Figure 17:
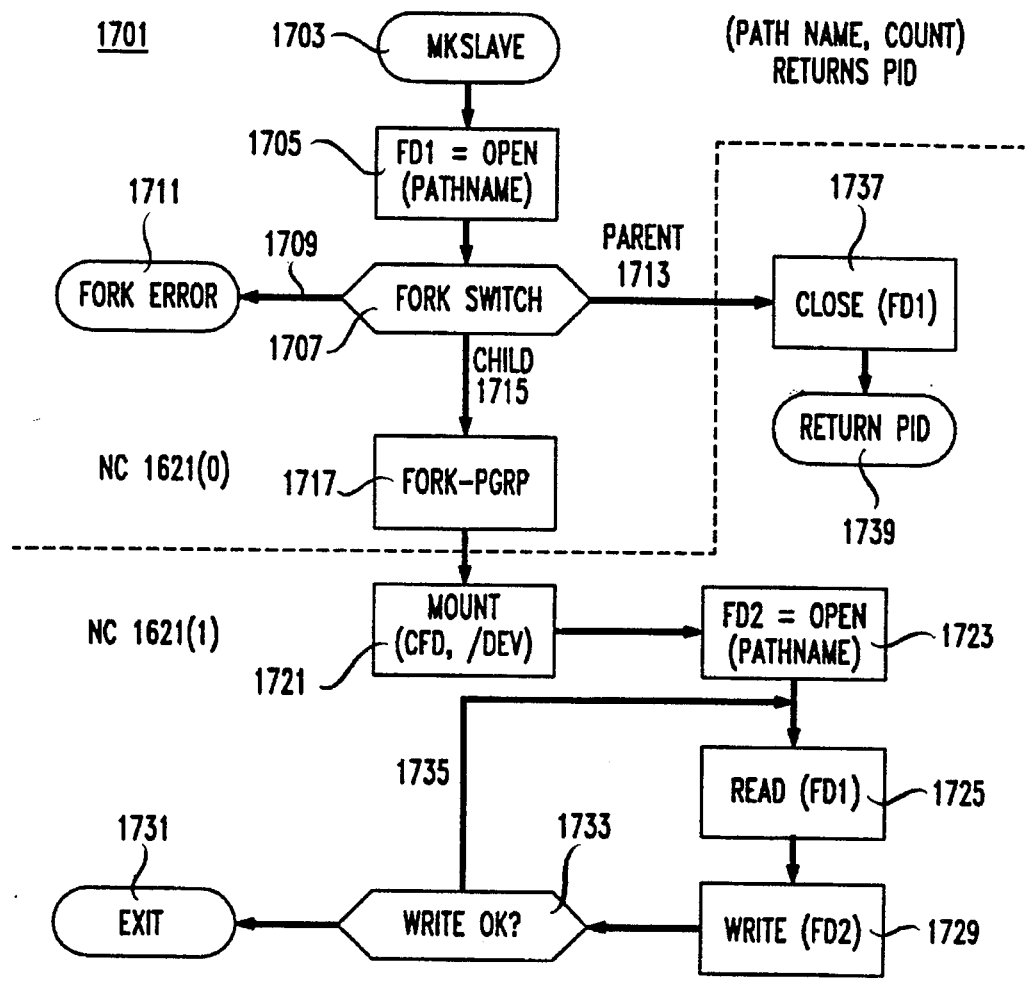
FIG. 17 is a flow chart of the mkslave function executed in the window service.

As is apparent from the foregoing, mouse slave process 1603(0) is performing file operations on mouse files which exist in two different name contexts 1621. The read operations are on a mouse file in name context 1621(0), while the write operations are on a mouse file in name context 1621(1). This situation is achieved in mouse slave process 1603(0) by employing the Plan 9 open, forkpgrp, and mount operations. The manner in which this is done is shown in FIG. 17, which is a flowchart of the mkslave function. mkslave 1701 is used to make both mouse slave process 1603(0) and keyboard slave process 605(0). The function has two arguments, a pathname and a count specifying the number of bytes to be read on each read operation. It returns the process identifier (pid) of the slave process it creates.

mkslave 1701 is invoked by main process 1613(0) with the arguments "/dev/mouse" and "10". Main process 1613(0) has a name space 115 in which kernel service #b 1411 has been bound to the file/dev provided by the kernel root file service, and consequently, the path name "/dev/mouse" will be resolved to a file descriptor 417 specifying a channel 301 which represents the file "mouse" provided by kernel service #b 1411. This fact is indicated in FIG. 1701 by the notation "name context 1621(0)" at the top of the figure. At the time that main process 1613(0) uses mkslave 1701 to create mouse slave 1603(0), it has already created pipe 1607(0) and registered window service 1405(0) in srv. The file descriptor written to the file in srv representing window service 1405(0) is one of the file descriptors for the files represented by pipe 1607(0). This file descriptor, termed in the following "cfd", represents the file to which clients of window service 1405(0) write tmessages.

The first thing that mkslave 1701 does is open the file specified by the path name argument (1705). Since we are still in name context 1621(0), that file is the file "mouse" provided by #b 1411. As a result of the open operation, the file descriptor fdl now represents the file "mouse" of #b. Next comes a switch statement which includes a fork function (1707). The fork function creates a new child process 102 which has a copy of parent process 1613(0)'s context, and therefore has a copy of fdl. The child process 102 also has the same name space 105 as parent process 1613(0). There are three branches to the switch statement. The first branch, 1709, deals with errors occurring during execution of the fork function; the second branch, 1713, is code which is executed by parent process 1613(0) but not by child process 1603(0). As indicated by blocks 1737 and 1739, the code closes parent process 1613's copy of fd1 and returns a pid which is the pid of child process 1603(0).

The third branch of the switch statement, 17 15, is code that is executed only by child process 1603(0). First, "forkpgrp" is executed to give child process 1603(0) a new name space 115; since forkgrp is invoked with the "0" argument, the new name space is a copy of the parent process 1613's name space 115. Next, a system mount operation is performed (1721). The mount binds cfd, which represents the end of pipe 1607(0) which is used by clients of window service 1405(0), to the directory/dev in the new name space 105 using the BEFORE option. As a consequence of the mount operation, the file tree 1501 in slot 0 of service 1405(0)'s files 1406 has been bound to/dev and a reference to a file such as/dev/cons is now a reference to the file cons in slot 0 of files 1406. The next step is to open the file represented by the path name argument, "/dev/mouse". However, since process 1603(0)'s name space 105 has been changed and "cfd" has been mounted on/dev, the path name argument in the open system call now resolves not to the file "mouse" in service #b 1411, but rather to the file "mouse" in the slot 0 file tree of service 1405(0). The change in name context is shown in FIG. 17 by the dashed line following block 1717 which divides name context 1621(0) from name context 1621(1).

The file descriptor 417 returned by the open system call is assigned to "fd2". Thus, at this point, fd1 represents the file "mouse" in service #b 1411 and fd2 represents the file "mouse" in slot 0 of service 1405(0). The rest of the third branch of switch 1707 is a loop 1735 in which mouse slave process 1603 does a read system call using fd1, which reads the mouse file in service #b 1411 (1725), and then does does a write system call using fd2 and the data received from the mouse file in service #b 1411 which writes the data to the mouse file in slot 0 of service 1405(0) (1733). If the write fails, i.e., if not as much data can be written to service 1405(0) as was received from service #b 1411, the process exits (1731). Keyboard slave 1605(0) is created in exactly the same way, except that the invocation of mkslave 1701 specifies "dev/rcons" as the path name and "1" as the byte length. Consequently, each read on fd1 by keyboard slave 1605(0) will read one character from the keyboard, and each write on fd2 by keyboard slave 1605(0) will write the character to the "rcons" file of the file tree 1501 in slot 0. "rcons" is used here so that window service 1405(0) receives the characters exactly as they are input at the keyboard.

mkslave function 1701 illustrates some fundamental consequences of the semantics of file access operations and of the "fork" and "forkpgrp" system calls in Plan 9. Beginning with the file access operations, those operations refer to files by means of file descriptors 417, not path names; the file descriptors in turn refer to channels, and as long as a channel represents a given file, a file access operation using a file descriptor which refers to the channel will access the given file. Further, when "fork" creates a new process 102, the new process 102 receives a copy of the old process 102's context. Included in this context is file descriptor array 413; accordingly, the new process 102 can perform file access operations on any file which was open for the process 102 which executed the fork system call. Finally, when "forkpgrp" creates a new name space 115, it only creates a new mount table 801 for the process 102 executing forkpgrp; file descriptor array 413 for the process 102 remains unchanged. Because this is the case, a process 102 which executes inkslave 1703 can use the same pathname to open the file "rcons" of kernel device #c 1419 and the file "rcons" of window service 1405. As will be explained in more detail below, the semantics of file access operations, of "fork", and of "forkpgrp" also permit recursive creation of services, i.e., a service may have another instance of itself as a client.

Pipe 1607(0) also connects main process 1613(0) to its clients 1615(0 and 1) and window service 1405(1). Pipe 1607 was created by main process 1613(0), and consequently, main process 1613(0) has service file descriptor 1617(0) representing the file in pipe 1607(0) to which main process 1613 writes rmessages. Each client process has client file descriptor 1619(0) representing the file in pipe 1607(0) to which the client writes tmessages. Client processes are created and given client file descriptor 1619(0) by main process 1613(0). A new client process is created each time a user of Gnot 711 requests a new window in screen 1427. In a preferred embodiment, a new window is requested by using mouse 1423 to select that choice from a menu on screen 1427.

Figure 21:
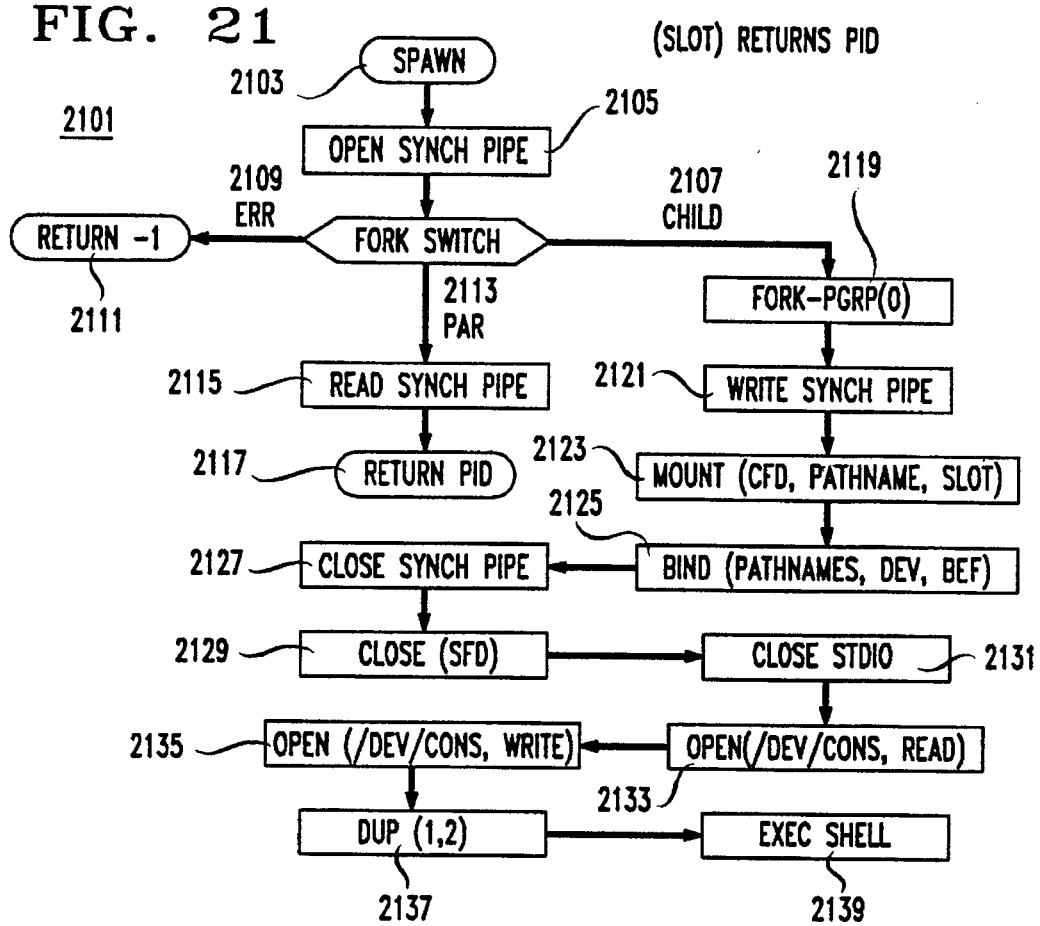
FIG. 21 is a flow chart of the spawn function executed in the window service.

When mouse 1423 selects the new window from the menu, the result is that mouse slave 1603(0) completes a read on the mouse file provided by service #b 1411 and writes the data read from that mouse file to the mouse file in service 1405(0)'s slot 0. The result is a tmessage on pipe 1607(0) to main process 1613(0), which responds to the tmessage by locating and setting up a window structure 1903 for the new window. Main process 1613(0) then calls a function "spawn" using the slot for the new window as an argument. spawn creates a client process 1615, makes the file tree 1501 in window service 1405(0) for the slot specified in the argument pan of the name space 105 of client process 1615, and executes the shell program in the new client process 1615. FIG. 21 is a flow chart of the spawn function in a preferred embodiment.

spawn function 2101 begins by opening a synchronization pipe (2105). The purpose of the synchronization pipe is to make sure that main process 1613(0) does not proceed until new client process 1615 is running. Next, the client process 1615 is created by executing the fork system call in a switch statement (2107). If there is an error on the fork, branch 2109 is taken, and the value −1, indicating an error, is returned. If the fork succeeds, main process 1613(0) proceeds as indicated in branch 2113: it reads the synch pipe (2115) and returns the pid of the child (2117). Since main process 1613(0) cannot complete the read until new client process 1615 has placed data in the synch pipe, main process 1613 will not return until new client process 1615 is running.

Branch 2107 shows how the new client process proceeds. First, the new client process 1615 obtains a new name space 105 by executing forkpgrp (2119). Since the argument "0" is used, the new name space 105 is a copy of the name space of main process 1613. Then the new client process 1615 does a write to the synch pipe, so that main process 1613(0) can continue executing (2121). Next, it mounts cfd 1619(0) onto a pathname which indicates a standard place to mount a file tree 1501 from window service 1405(0). The mount system call used to do this includes the slot number as an argument (2123). As previously explained, as a result of the mount system call in client process 1615, a tattach message is sent via pipe 1607(0) to window service 1405(0); window service 1405(0) responds to the tattach message by returning the qid for root 1502 of the file tree 1501 in the slot specified by the slot number, and that qid is placed in channel 301 specified by cfd 1619 (of course, client process 1615 was given a new copy of cfd 1619 when it was created). Next, the bind system call is used to bind the pathname upon which the file tree 1501 was mounted to /dev (2125). The "BEFORE" option is used, and consequently, a path name such as dev/mouse will now be resolved to the file "mouse" in file tree 1501 in the slot specified by the slot number.

Next, the files represented by the file descriptors for the synch pipe, the service end of pipe 1606(0), and standard I/O are closed. (blocks 2127,2129,2131). By convention in Plan 9, the files for standard I/O belonging to a process have file descriptors 0 and 1; thus, closing these files in step 2131 makes sure their descriptors will be available for subsequent use. The next step is to open/dev/cons for reading (2133). The open system call results in a walk tmessage, which in turn results in the creation of a file structure 1813 for dev/cons in the proper slot of files 2406, and in an open tmessage, which results in open field 1809 for entry 1805 for the file being set to 1. Open begins looking for file descriptors 417 at the beginning of file descriptor array 413 for client process 1615, so the file descriptor returned by open will be file descriptor 0, and dev/cons will function as the standard input file. Following that, an open system call is made to open/dev/cons for reading, with the results just indicated (2135) except that the file descriptor 417 returned by open will be file descriptor 1, and dev/cons will function as the standard output file. The next two steps are simple. In 2137, file descriptor 1 is cloned, so that file descriptor 2, which by convention represents the standard error file will represent the same file as file descriptor 1 and error messages will be output to/dev/cons. Finally, the shell program, which provides the Plan 9 user interface, is executed (2139).

If the new client process 1615 then executes the program for window service 1405, the result is a new window service 1405(1) which is a client of window service 1405(0). Window service 1405(1) has the same components as window service 1405(0), and is connected to its slave processes and client processes by pipe 1607(1). Window service 1405(1) functions in exactly the same way as window service 1405(0), except that it is set up in the name space 105 of new client process 1615, i.e., path names such as/dev/mouse or/dev/cons refer to files in file tree 1501 in the slot 1407 of service 1405(0) belonging to new client process 1615. Consequently, writes to and reads from these files result in tmessages via pipe 1607(0) to window service 1405(0) instead of requests to kernel services #b and #c. Window service 1405(0) then produces the requests to kernel services #b and #c in response to the tmessages from window service 1405(1).

Figure 20:
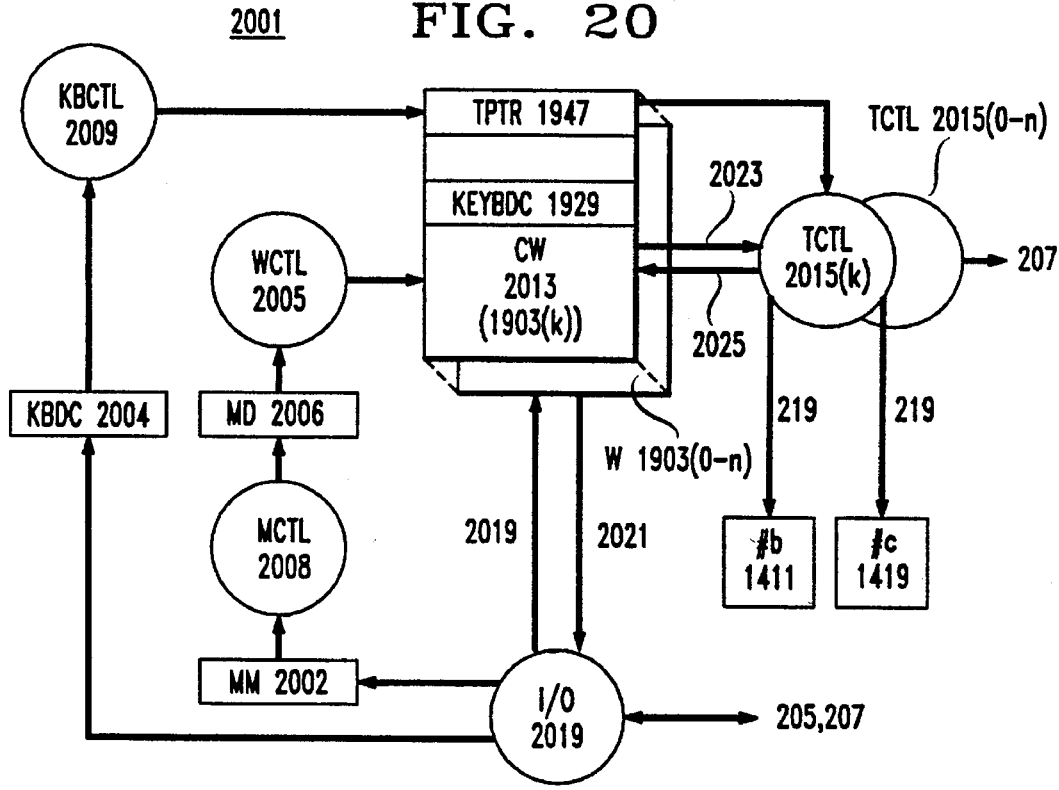
FIG. 20 is a diagram of the internal structure of a portion of the window service.

Internal Structure of Main Process 1613: FIG. 20

FIG. 20 shows internal structure 2001 of main process 1613 of a preferred embodiment of window service 1405. Main process 1613 handles tmessages 205 and 207 from client processes 1615 and from mouse slave 1603 and keyboard slave 1605 and updates window data structures 1903 in response to the tmessages. It then uses the information in window data structures 1903 in file access system calls to the files provided by #b 1411 and #c 1419. In a preferred embodiment, main process 1613 includes the following principal components:

I/O function 2019: I/O function 2019 responds to tmessages 205 and 207 from window service 1405's clients and from mouse slave process 1603 and keyboard slave process 1605;

mouse control task 2008: a task which handles the tmessages which I/O 2019 receives from mouse slave 1603;

keyboard control task 2009: a task which handles the tmessages which I/O 2019 receives from keyboard slave 1605;

window control task 2005: a task which updates data in windows 1903 as required by inputs from mouse 1423;

terminal control 2015(0 . . n) a task corresponding to each window 1903(0 . . n) which changes the state of its corresponding window 1903 as required by the inputs from keyboard control 2009 and window control 2005 and then sends messages as required to the client process 1615 to which the window belongs and does write operations on the files provided by #b 1411 and #c 1419 to display the window as modified.

The task components of main process 1613 are entities internal to main process 1613 which main process 1613 schedules and runs in response to events which change the state of a window 1903. The tasks thus have some of the general properties of processes, but they are not Plan 9 processes 102. In particular, they all share main process 1613's context, including its name space 105. The rule for scheduling of the tasks is the following: whenever a message is received in I/O 2019 which changes the state of a resource for which a task is responsible, the task is placed on a queue of tasks to be run; whenever the queue is empty, I/O function 2019 is executed.

Operation of components 2001 is broadly as follows: I/O 2019 reads the file identified by service file descriptor 1617 of pipe 1607 to obtain a tmessage. If the tmessage specifies a file location operation, I/O 2019 handles the message itself and returns the appropriate Rmessage. If the treessage specifies a file access operation, I/O 219 finds the window 1903(i) belonging to the process which sent the message, updates the information in window 1903(i), as shown by arrow 2019, and schedules terminal control 2015(i) to run. When terminal control task 2015(i) runs, it updates window 1903(i) as shown by arrows 2023 and 2025 and takes any action required by the update. One example of such an action is an rmessage to the process to which window 1903(i) belongs, as shown by the arrow labelled 207. The rmessage is written to the file represented by client file descriptor 1619 in pipe 1607. Another example is write operations to #b 411 and #c 1419 which redraw the window in screen 1427 corresponding to window 1903(i), as shown by the arrows labelled 219. At some still later time, I/O 2019 resumes execution and reads another tmessage from pipe 1607.

Messages from mouse slave process 1603 and keyboard slave process 605 are special cases. If the message is from mouse slave process 1603, I/O 2019 writes the message to global storage mouse message 2002 and schedules mouse control task 2008, which runs, translates mouse message 2002 into mouse data 2006, and schedules window control 2005. Window control 2005 examines mouse data 2006 to determine the current window 2013, i.e., the window 1903 which corresponds to the window in display 1427 in which the cursor was located when the data was received from mouse 1423. If mouse data 2006 indicates a window in display 1427 which does not correspond to the current window 2013, then window control 2005 makes the window 1903 corresponding to the window in display 1427 specified by mouse data 2006 into the new current window 2013. It then updates current window 2013 as required by the mouse message and schedules terminal control 2015 for the new current window. When terminal control 2015 executes, it does write operations which redraw the screen and sends the required rmessage to mouse slave 1603. If the message is from keyboard slave 1605, I/O 2019 proceeds as indicated for the mouse slave, except that the new input character is written to the global variable KBDC 2004 and keyboard control task 2009 is scheduled. Keyboard control task 2009 runs, modifies current window 2013, and schedules terminal control process 2015 for current window 2013, which performs the operations just described.

Figure 22:
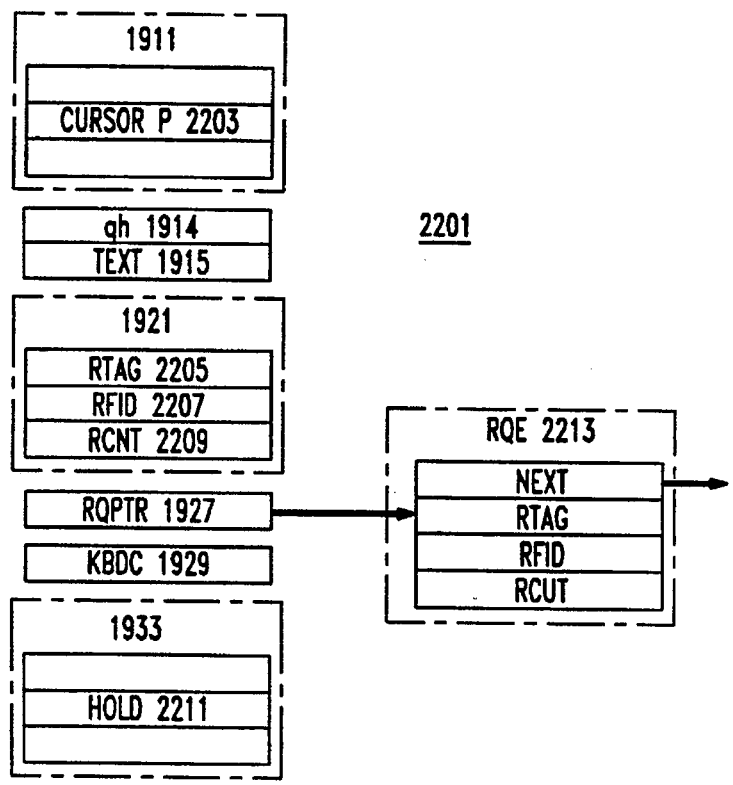
FIG. 22 is a diagram of certain parts of the window data structure which are important to a preferred embodiment of the hold mode.
Figure 23:
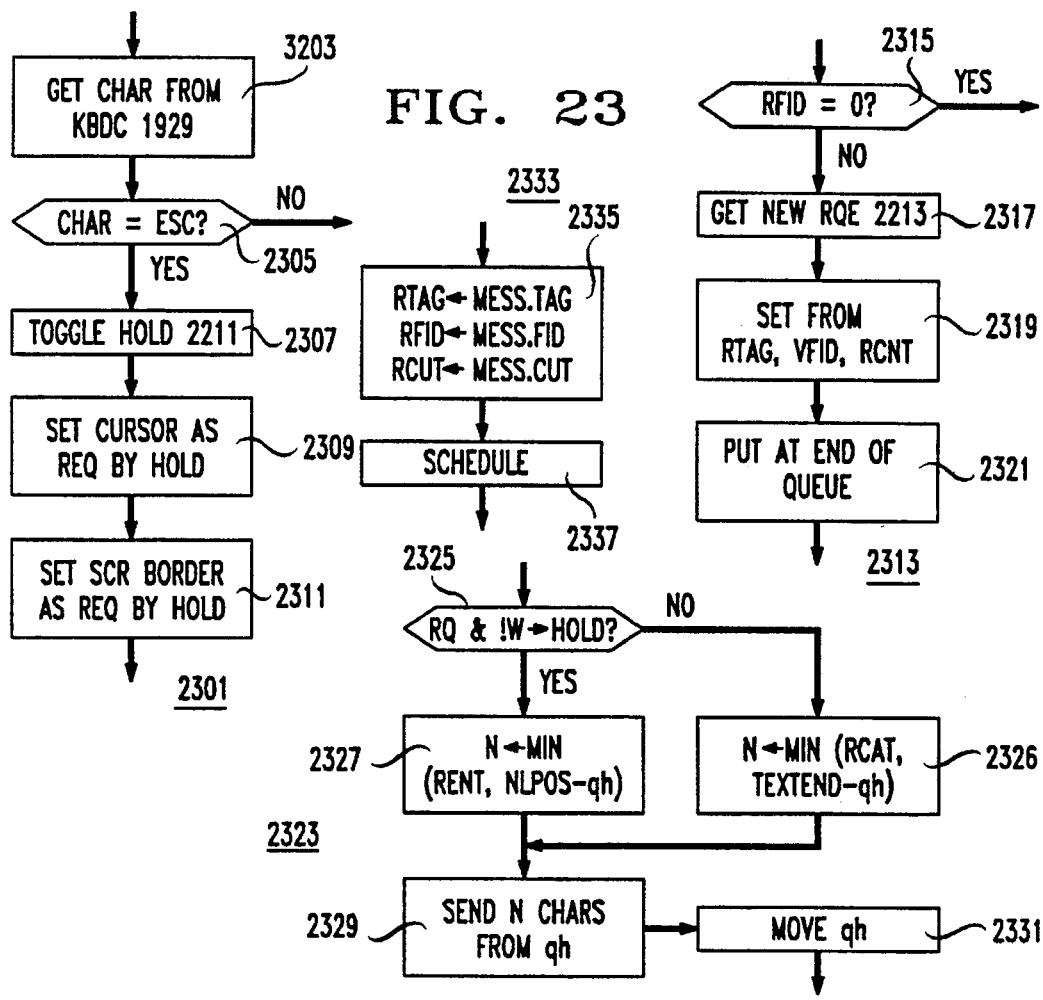
FIG. 23 is flow charts of certain aspects of the processing done for the hold mode in a preferred embodiment.

A Detailed Example: Operation on Hold File 1507: FIGS. 22 and 23

"hold" file 1507 of file tree 1501 provided by window service 1405 is used to implement an improvement in character input interfaces for interactive programs. The improvement solves part of a classic problem in such interfaces: the fact that the line termination codes (typically new line or carriage return) used to indicate the end of the line have three different functions in such interfaces:

They specify how a string of text is to be divided into lines when the string is displayed;

They specify that the string of text between the last line terminator and the current line terminator is to be sent from the terminal where it is being entered to the interactive program; and In the case of command line interfaces, they specify that the string of text between the last line terminator and the present line terminator is to be executed.

Thus, in a typical interactive user interface, when a user specifies a line termination code, he has finished with the line; it will be displayed, sent, and executed as it is when the user specifies the line termination code.

The problems inherent in this arrangement are obvious, and the prior art has solved some of them with special characters; thus, one special character may be used to override the new line for display purposes, and another character may be used in most command line interfaces to indicate that command line input continues into the next line. What has heretofore not been solved is the problem arising from the fact that the line is sent to the interactive program in response to the line termination character. In consequence, while many interactive programs allow a user to edit a line until he enters a line terminator code, only editing programs typically permit a user to enter a line, enter a line terminator code, and then return to edit the entered line. The only solution available to the problem has been to design the interactive program so that it will read input from a file, use an editor to create the input file, and then provide the file to the interactive program. What is needed, and what is provided by window service 1405, is a way of letting the user prevent the character string he is inputting from being sent until he so specifies.

Window service 1405 handles the problem as follows: in a first mode, the line termination code causes the line to be sent to the interactive program as heretofore; in a second mode, entered by striking a key at the terminal, characters input from the time the mode is entered until the time the mode is exited are sent at the time the mode is exited. The second mode is termed herein the *hold* mode. In a preferred embodiment, the hold mode is exited by striking the same key used to enter it. Further, the form of the cursor and of the window border employed in the preferred embodiment indicate whether or not the window is currently in hold mode. In the preferred embodiment, the cursor is an arrow. In hold mode, the cursor is an outline arrow; otherwise, it is a solid arrow.

FIG. 22 shows the data structures in a window 1903(*i*) which are used to implement the above improvement; FIG. 23 shows portions of code executed by I/O 2019, window control task 2005, and terminal control task 2015(*i*). Beginning with FIG. 22, window description information 1911 in window 1903 includes a field cursorp 2203 which points to a bit map for the current cursor. As previously indicated, qh 1914 is a pointer to a current position in text 1915, which in turn contains the text being displayed in the window represented by window structure 1903(*i*).

Cons read info 1921 contains three fields which store information from the most recent tread message specifying a read on the files cons and rcons in file tree 1501 corresponding to window structure 1903(*i*). The fields are rtag 2205, which contains the tag from the message, rfid 2207, which contains the fid from the message, and rcnt 2209, which contains a count from the message which specifies the number of characters to be read. RQPTR 1927 points to a queue of pending reads to be done to satisfy prior tread messages; each element 2213 of the queue has rtag, rfid, and rcnt from the tread message to which element 2213 corresponds. KBDC 1929 contains the last character to be read from keyboard 1431, and hold 2211 is a flag which indicates whether window 1903(i) is in hold mode.

Since the hold mode is employed to send data in response to a tread message, the discussion begins with a description of how tread messages are handled in a preferred embodiment. In the preferred embodiment, when I/O 2019 receives a tread message specifying a read on rcons or cons, it uses qid 323 to determine the slot for file tree 1501 containing rcons or cons and thereupon locates window 1903(*k*) corresponding to the slot. Then, as shown in flow chart 2333 of FIG. 23, I/O 2019 writes the tag from the tread message to rtag 2205 of window 1903(*k*), the fid from the message to rfid 2207, and the count to rcnt 2209 (2335). Thereupon, I/O 2019 invokes a scheduler which runs whichever of tasks 2008, 2005, 2009, or 2015 is next in the queue of tasks to be executed (2337).

When terminal control task 2015(k) next runs, it performs the operation shown in flowchart 2313. If rfid 2207 is not equal to 0 (2325), a new tread message has been received; consequently, task 2015(k) makes a new rqe 2213 (2317), sets its fields from Hag 2205, rfid 2207, and rcnt 2209 (2313), sets rfid 2207 to 0, and places the new rqe 2213 at the end of the queue. After making a entry in the read queue for any read operation indicated in cons read info 1919, terminal control task 2015(*k*) next determines whether the read queue is empty and if it is, processes the first entry 2213 in the queue (2325). As shown in flowchart 2323, the manner in which the entry is processed depends on whether hold 2211 indicates that window 1903(*k*) is in hold mode. If hold field 2211 indicates that window 1903(*k*) is in hold mode, the number of characters sent in the read operation is set to the minimum of rcnt in entry 2213 and the number of characters between the end of text 1915 and the position presently marked by qh 1914 (2327), i.e., any line termination characters between the position marked by qh 1914 and the end of text 1915 are simply ignored. Thereupon, an rread message containing the tag and the fid from entry 2213 and the characters is sent to the process to which window 1903(*k*) belongs (2329). Finally, qh is updated to point to the character in text 1915 following the last character sent and RQPTR 1925 is updated to point to the next element 2213 in the request queue.

If hold 2211 indicates that window 1903(k) is not in hold mode, control goes to block 2326. There, n is set to the minimum of rcnt and the number of characters from the next new line to the position marked by qh 1914, i.e., n specifies only the number of characters in text 1915 from qh through the next new line character. These are then the characters which are sent in block 2329, and qh 1914 is updated to point to the character following the next new line character.

In a preferred embodiment, hold mode is entered by striking the escape key and left by again striking the escape key. The escape key thus serves as a toggle between the hold mode and the mode in which a line terminator causes the line to be sent (termed hereinafter non-hold mode). Flowchart 2301 shows how hold field 2211 is set and reset in response to the escape key. As previously described, when keyboard slave 1605 receives a character, it does a write to the file rcons of slot 0 of window service 1405. The write results in a twrite message received by main process 1613. I/O 2019 deals with twrite messages to rcons of slot 0 by placing the character in KBDC 2004 and scheduling keyboard control task 2009. Keyboard control task 2009 writes the contents of KBDC 2004 into KEYBDC 1929 of current window 2013, places terminal control 2015 corresponding to current window 2013 in the queue of tasks to be run, and then calls the scheduler. Some time later, terminal control task 2005 runs; when it does so, it executes code which examines KEYBDC 1929 in its window 1903. In block 2303, KEYBDC 1929 is fetched from KEYBDC 1929; at decision block 2305 it is tested; if it is the escape character, hold 2211 is toggled (2307), the cursor is set as required by the new value of hold 2211 (2309), and the screen border is set as required by the new value (2311). In a preferred embodiment, flowcharts 2301, 2313, and 2314 are executed in that order by terminal control task 2015. After execution of the flowcharts, terminal control task 2015 redraws window 2013, so that the results of striking the escape key are immediately visible to the user of Gnot 711.

The preferred embodiment of window service 1405 provides client processes 1615 with a way of setting hold 2211 in the window 1903 corresponding to the process 1615. To do so, the client process 1615 performs a close system call on hold file 1507; the close system call results in a tclunk message, and I/O 2019 responds to the tclunk message by setting hold 2211 in the corresponding window 1903. The preferred embodiment also provides an example of how reads and writes are handled for files for which those operations are not meaningful: when I/O 2019 receives a tread message specifying hold 1507, it returns an rread message in which the length of the data returned is 0; similarly, when I/O 2019 receives a twrite message to that file, it returns an rwrite message in which the length of the data written is 0.

Figure 24:
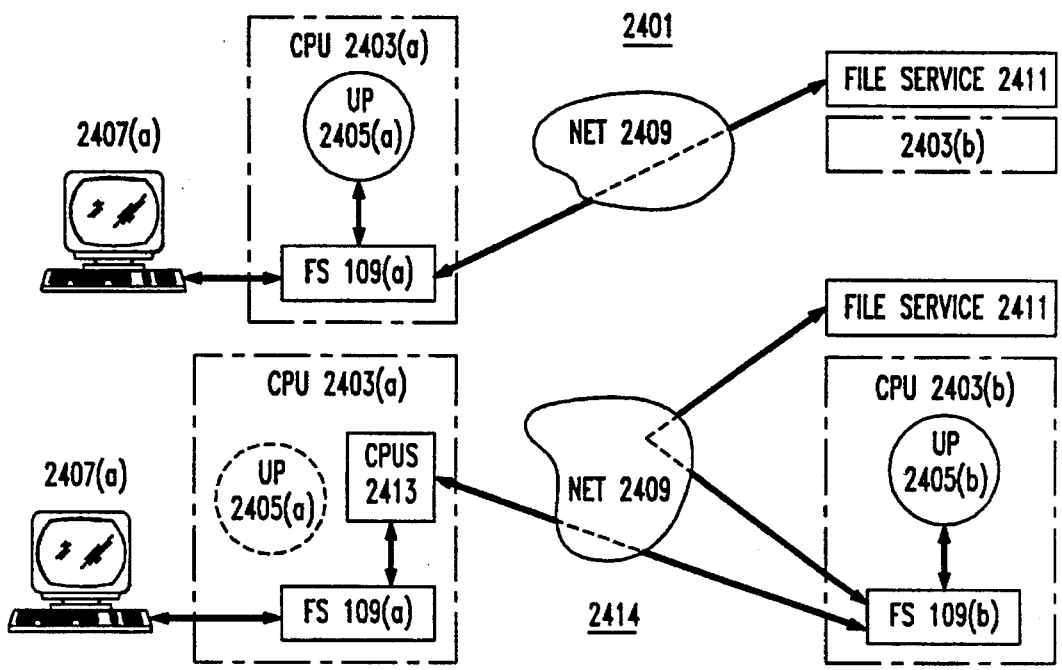
FIG. 24 is an overview of the operation of the CPU command.
Figure 25:
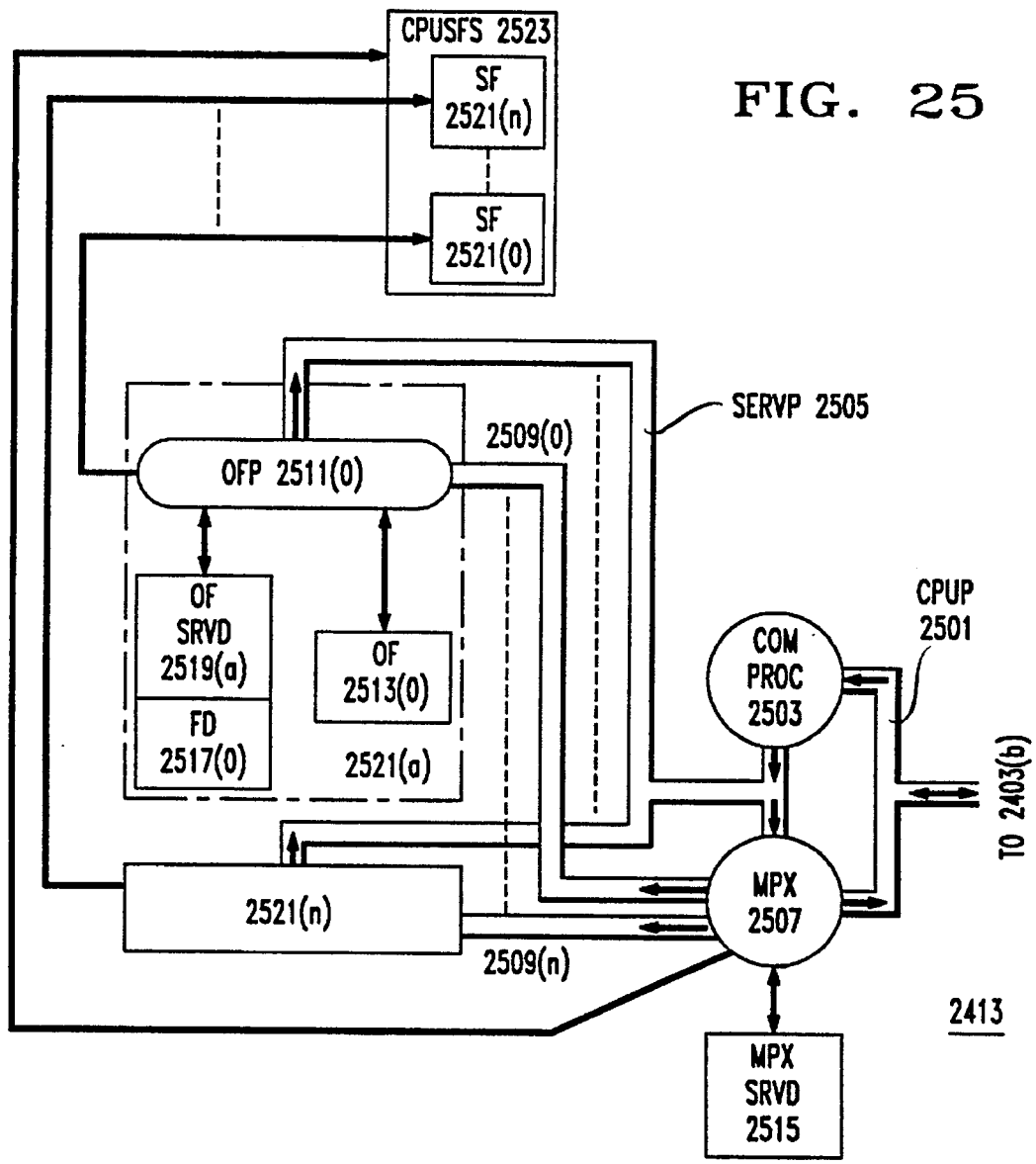
FIG. 25 is a diagram showing the internal structure of the CPU service.
Figure 26:
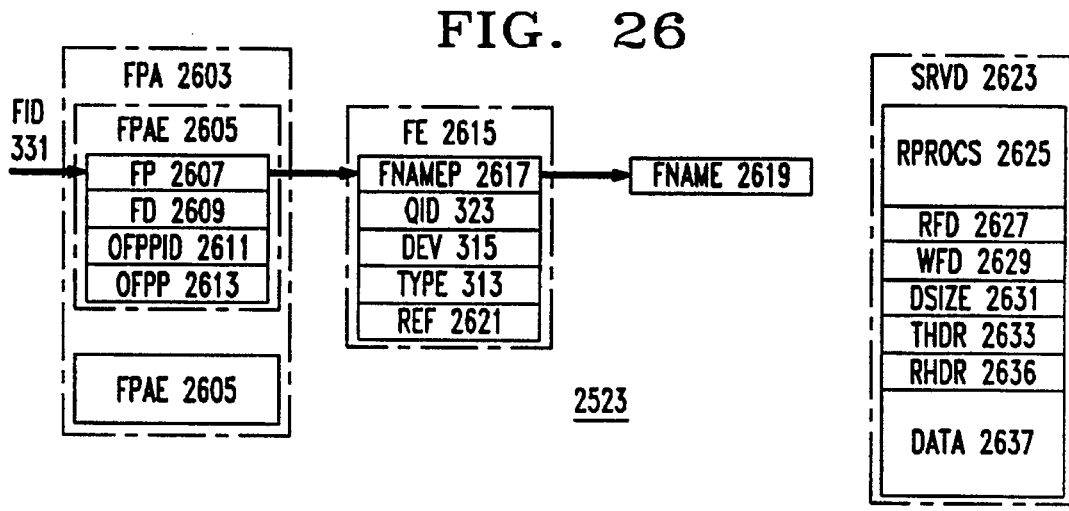
FIG. 26 is a diagram showing data structures used by the CPU service.

Implementation of the CPU Command: FIGS. 24–26

As shown in FIG. 7, the Plan 9 operating system is preferably implemented in a distributed system 701 which includes high-performance CPUs 703 and file services 705 as well as Gnot terminals 711. While any program may be executed on the processor in Gnot terminal 711, it is generally more efficient to employ the Gnot processor to execute interactive programs such as editors or debuggers and to use a high-performance CPU 703 for the execution of computationally-intensive programs such as compilers or data base systems. To do so, a user at Gnot terminal 711 who is running the shell employs the CPU command.

The CPU command takes as an optional argument the name of a CPU 703; if no argument is supplied, a default CPU 703 is selected. When the user inputs the CPU command, either by typing it or selecting it with the mouse, the result is that the window in which the user inputs the CPU command becomes the window for a process 102 which is running on the CPU 703 selected in the CPU command. The process 102 is executing the shell program, and consequently, the user can execute other programs on the CPU 703 simply by specifying their names to the shell. An important consequence of the manner in which the CPU command is implemented is that the process 102 running on CPU 703 has a name space 115 which is substantially the same as that of the process 102 which executed the CPU command on Gnot 711. A given path name will generally resolve to the same file in the process 102 running on CPU 703 as it does in the process 102 running on Gnot 711; the only differences are those made necessary by the change in location. For example, the files in the process service will contain information about the processes on CPU 703, rather than those on Gnot 711.

FIG. 24 provides an overview of the relationships between the components of a system 701 before and after execution of the CPU command. The section of the figure labelled 2401 shows the relationships before execution. A CPU 2403(a), which could be the CPU of a Gnot 711, is running a user process 2405(a). Through file system 109(a), user process 2405(a) is reading from and writing to files on file service 2411, one of file services 705, via network 2409, which may be made up of networks 713, 715, and 709. User process 2405(a) is also using file system 109(a) to perform operations on files provided by window service 1405, and is thereby controlling display, keyboard, and mouse 2407(a), which in this case are the display, keyboard, and mouse of Gnot 711. CPU 2403(b), which is one of CPUs 703, has nothing whatever to do with the interactions between user process 2405(a) and other components of the system.

At the time the user process 2405(a) receives the CPU command, it is running the shell program. In response to the CPU command, the shell program creates a child process 102 which has the same environment, including name space 115 as user process 2405(a) and suspends itself until the other process terminates. As will be described in more detail below, the child process sets up CPU service (CPUS) 2413. CPU service 2413 sends a message to processor 2403(b) which results in the creation of process 2405(b) in processor 2403(b). Thus, after execution of the CPU command, user process 2405(a) has ceased running on CPU 2403(a), and user process 2405(b) is running on processor 2403(b). User process 2405(b) is reading to and writing from files by means of file service 109(b). Because user process 2405(b) has substantially the same name space 115 as user process 2405(a) had, the files being read from and written to are those provided by file service 2411 and those provided by the services 123 which executed on CPU 2403(a). Included in those files are of course those provided by window service 1405. Operations on the files provided by services 123 located on CPU 2403(a) are handled by CPU service 2413. When user process 2405(b) specifies an operation on a file provided by a service on CPU 2403(a), file system 109(b) converts the operation into a tmessage which goes via network 2409 to CPU service 2413. CPU service 2413 then uses file system 109(a) to perform the operation specified in the tmessage on the file in CPU 2403(a) and returns the result via an rmessage. From the point of view of user process 2405(b), CPU service 2413 is thus a service which provides files from the name space 115 of user process 2405(a) to user process 2405(b). Implementation of CPU Service 2413: FIGS. 25 and 26

Implementation of CPU Service 2413: FIGS. 25 and 26

FIG. 2413 is an overview of a preferred embodiment of CPU service 2413. Along with window service 1405, CPU service 2413 illustrates the simplicity, flexibility, and power of Plan 9 services 123. CPU service 2413 has a number of component processes 102. The name space 115 of the component processes includes a copy of the name space 115 of user process 2405. Communications process 2503 receives tmessages via CPU pipe 2501 from file system 109(b) and writes the messages to service pipe (SERVP) 2505. Multiplexer process (MPX) 2507 reads service pipe 2505 and responds to the tmessages by performing operations on files in CPU service file system 2523. There is a service file 2521 in file system 2523 corresponding to each file 2513 which user process 2405(b) has open in a service 123 located in CPU 2403(a). rmessages resulting from the operation are returned to file system 109(b) via CPU pipe 2501.

File access operations on open files 2513 are performed by open file processes 2511. There is an open file process 2511 for each open file 2513; each open file process 2511 has a separate pipe 2509 by means of which it receives file access tmessages concerning its file from multiplexer process 2507, and each process 2511 is connected to service pipe 2505. Each process 2511 further has as part of its data a file descriptor 2517 for its open file 2513. After responding to a file access tmessage from multiplexer 2507 by using file descriptor 2517 to perform the access operation on its open file 2513, the process 2511 writes the results of the treessage to service pipe 2505 as an rmessage from an open file process 2511. Multiplexer process 2507 responds to such rmessages by simply writing them to cpu pipe 2501. As will be explained in more detail later, information needed by each of processes 2511 and 2507 to carry out its operations is contained in a service data structure (SRVD) 2519 for each of the processes 2511 and a service data structure 2515 for multiplexer process 2525.

FIG. 26 shows a detail of service data structure 2623 and of the data structures used to represent files in CPU service file system 2523. Beginning with service data structure 2623, field 2625 contain pointers to the procedures which the process to which service data structure 2623 belongs use to carry out iile operations. In the case of MPX SRV data 2525, there is a ,procedure for each of the service file requests. The procedures for all requests other than read and write perform operations on file system 2523; the procedures for read and write perform write operations to pipe 2509 for the file's open file process 2511 and thereby pass the operation on to open file process 2511 corresponding to the file 2513 being read or written. In the case of open file SRV data 2519, there are only procedures for the read and write operations, and these simply perform the relevant operation on the file specified by FD 2517 for the open file process 2511 and write the rmessage received in return to service pipe 2505.

The remaining contents of SRVD 2623 are the following:
RFD 2627 is the file descriptor which the process to which SRVD 2623 belongs uses to read messages;
WFD 2629 is the file descriptor used to write messages;
DSIZE 2631 is the size of DATA 2637;
thdr 2633 contains the tmessage header when a tmessage is read ved by the process on RFD 2627;
rhdr 2633 contains the rmessage header when an rmessage is written by the process on WFD 2629; and
DATA 2637 contains the data for the tmessage or rmessage.
In MPX SRVD 2515, WFD 2629 is a file descriptor for the file in service pipe 2505 to which messages read by MPX 2507 are written (i.e., MPX 2507 writes messages to itself) and RFD 2629 is invalid. In OF SRVD 2519, RFD 2627 is a file descriptor for the file in pipe 2509 from which open file process 2511 reads messages and WFD 2629 is a file descriptor for the file in service pipe 2505 to which open file process 2511 writes messages.

Continuing with CPU service file system 2523, that file system is implemented using the data structures appearing under 2523 in FIG. 26. Each CPU service file 2521($i$) provided by CPU service 2413 corresponds to a file 2513($i$) provided by a service executing on CPU 2403($a$) to user process 2405($b$) operating on CPU 2403($b$). Each CPU service file 2521($i$) has an entry in file pointer array (FPA) 2603. Each entry 2605($i$) is indexed by fid 331 provided by file system 109 in tmessages requesting operations on file 2513($i$). The fields in the entry are the following: FP 2607 is a pointer to file entry 2615, which contains information about open file 2513($i$) corresponding to service file 2521($i$). FD 2609 is a file descriptor for open file 2513($i$); OFPPID 2611 is the process identifier for open file process 2511($i$) corresponding to open file 2513($i$) and service file 2521($i$); and open file process pipe (OFPP) 2613 is an array of file descriptors for pipe 2509($i$). File entry 2615 contains information about open file 2513($i$). The information is obtained in the course of the walk requests from file system 109($b$) which locate file 2513($i$). FNAMEP 2617 is a pointer to FNAME 2619, a string which is the path name of file 2513($i$). QID 323, DEV 315, and TYPE 313 are the corresponding values from channel 301 for file 2513($i$). REF 2621 is a reference counter which indicates whether FE 2615 can be reused. In a preferred embodiment, file pointer array 2603 and an array of file entries 2615 are created when CPU service 2413 commences operation.

Operation of CPU Service 2413

Examples of operation of CPU service 2413 are provided by the attach, walk, open, and clunk requests. The attach request makes the file tree provided by a service 123 available to the process 102 making the attach request. The tmessage for the attach request contains a fid 331 for the root of the service 123 being attached to. If the attach is successful, the rmessage contains the fid 331 and the qid 323 for the root. In the case of CPU service 2413, the file tree provided by the service is the file tree belonging to user process 2405($a$). When MPX process 2507 receives the tmessage, it invokes the attach function specified in mpx process 2507's MPX SRVD 2515. The function creates an FPAE 2603 corresponding to the fid 331. In the FPAE 2603, fields 2609, 2611, and 2613 all have void values. Next, the function does a slat request on the root, "/", which returns the qid 323 of the root of user process 2405's name space 115. Thereupon, the function creates a file entry 2615, places "/" in file name 2619, the qid in qid 323, and sets the reference count to 1. After that, it sets the qid 323 in thdr 2633 of SRVD 2525 to the qid 323 of the root. Finally, it invokes the function "srvreply", which makes an rmessage containing the qid and writes it to service pipe 2505. When MPX process 2507 receives the rmessage, it writes it to cpu pipe 2501.

The tmessage for the walk request contains a fid 331 associated with the qid 323 for a directory and the name of a file in the directory; if the walk is successful, the fid 331 is associated with the named file and the qid 323 for the named file is returned in the rmessage along with the fid 331. When MPX process 2507 receives the walk treessage, it invokes the walk function specified in SRVD 2515. That function locates FPAE 2605 corresponding to the fid 331 and then locates file entry 2615 for the FPAE 2605. Next, it constructs the pathname for the file specified by the name in the tmessage by adding the name for the specified file to the path name contained in FNAME 2619. Thereupon, the function does a star request to get the status information for the file specified by the path name. Next, REF 2621 is examined. If REF 2621 has the value 1, FE 2615 can be used for the named file. In that case, the values for qid, dev, and type obtained from the stat request are written to fields 323, 315, and 313 in FE 2615, FNAME 2619 is set to the path name for the file, and qid 323 in thdr 2633 of MPX SRVD 2515 is set to the qid for the file. If REF 2621 has a value greater than 1, a new FE 2615 is allocated, its fields and thdr 2633 are set as described above, and FP 2607 is set to point to the new FE 2615. Thereupon, an rmessage is returned with the fid 331 and qid 323.

The tmessage for the open request contains the fid 331 for the file being opened and a value indicating the mode of the opened file. The rmessage contains the fid 331 and the qid 323 for the opened file. The open function executed by multiplexer process 2507 in response to the open tmessage uses fid 331 to locate the proper file pointer array entry 2605, locates file entry 2615 for array entry 2605, and does an open system call using the path name in fname 2619 and the mode value. The call returns a file descriptor for the file. Next, a pipe 2509 is created for the open file. The file descriptor for the opened file is then placed in FD field 2609 of array entry 2605 and the file descriptors for the pipe 2509 are placed on open file process pipe field 2613. Then the open file process 2511 corresponding to the opened file is created and its SERVD 2519 structure set up so that the open file process reads from pipe 2509 and writes to service pipe 2505. The process identifier for the open file process is placed in open file process pid field 2611. Thereupon, the qid field of thdr 2633 is set from file entry 2615 and the fid and qid are returned in the rmessage.

The clunk request requests service 123 to end the association between a fid 331 and a qid 323. The tmessage for the request contains a fid 331, and the rmessage simply returns the fid. The clunk function executed by multiplexer process uses fid 331 to locate the proper file pointer array entry 2605. Having found the entry, it terminates the open file process 2511 specified in field 2611, closes the file in pipe 2509 from which open file process 2511 was reading, closes open file 2513 specified by the file descriptor in field 2609, and sets fields 2609, 2611, and 2613 to values indicating that the fields are not in use. Then it decrements ref field 2621 in file entry 2615, and if the decremented field has the value 0, it frees fname 2619 and sets file pointer 2607 in entry 2605 to 0. Finally, it returns an rmessage with the fid 331.

Connecting CPU Service 2413 with User Process 2405(b)

The child process 102 which was created when user process 2405(a) executed the shell command, and which has the same name space as user process 2405(a) first creates a file called "cpudir" in the file tree provided by the kernel environment service and writes the name its current working directory, which is that of user process 2405(a), to the file. Then the process uses the name of the CPU 703 specified in the CPU command in the dial function, which calls the specified CPU 703 over network 2409 for the user of process 2405(a) (which is also the user of the child process) and on completion of the call, provides a connection to the specified CPU 703, which appears in FIG. 24 as CPU 2403(b). Thereupon, service pipe 2505 and the data structures for CPU service file system 2523 are created. Finally, communications process 2503 is created and connected to the file descriptors for the network connection and multiplexer process 2507 is created and connected to service pipe 2505 and cpu pipe 2501. Communications process 2503 of course performs a read on CPU pipe 2501, and thus CPU service 2413 is at this point waiting for input from user process 2405(b).

In CPU 2403(b), there is a process 102 which listens to the connections to network 2409 and responds when CPU 2403(b) receives a call from another entity connected to network 2409. That process responds to the call from user process 2405(a) by starting a child process 102. Child process 102 gets the path name for the file representing the network connection and then does forkpgrp with the 0 argument to get a new name space 115. Child process 102 sets up the new name space 115 so that/dev/user contains the name of the user which made the call, opens/srv/boot to get a file descriptor for a connection to the root of the default file service 2411, and binds "/" to "#/" and the root of the file tree provided by file service 2411. Then it uses the user name in/dev/user to make child process 102's working directory the user's working directory and sets standard input, output, and error so that they are connected to the network connection. Next, more bind operations are performed. At the end of them,/bin resolves to a directory which contains code executable by CPU 2403(b),/bin has been unioned with/lib/rc, which contains the code for the shell program, and the kernel services have been bound to the proper points in stub file tree 601. At this point, child process 102 forks to produce user process 2405(b), which inherits child process 102's name space 115.

User process 2405(b) executes the shell program, giving it the name of a program called CPUserve which finishes setting up user process 2405(b)'s name space 115. Next, user process 2405(b) does a system mount call with the replace option which mounts the directory "/mnt/term" on the file descriptor representing the network connection./mnt/term is the directory in user process 2405(b)'s name space which is used for files by which which a keyboard, mouse, and display are controlled.

As a result of the mount, "/mnt/term" now includes the files in user process 2405(a)'s name space 115. Included in these files is the directory/fd 609, whose files have as values the file descriptors presently being used by user process 2405(a). The files/fd/0,/fd/1, and/fd/2 thus contain the file descriptors for std in, std out, and std error for process 2405(a). Since process 2405(a) is using window service 1405 and has bound the file cons provided by window service 1405 to/dev/cons, the file descriptors for std in, std out, and std error will specify the file cons provided by window service 1405. User process 2405(b) then closes its own std in, std out, and std error, thereby freeing up file descriptors 0, 1, and 2, and immediately opens the files specified by the descriptors in/fd/0,/fd/1, and/fd/2; consequently, reads and writes on std in, out, and error in user process 2405(b) result in reads and writes on cons in user process 2405(a), which in turn represents the keyboard and display in terminal 2407(a).

Similarly, as a result of the mount,/mnt/term includes the directory mnt/term/env, which in turn contains the file "cpudir", which was set by user process 2405(a) to contain user process 2405(a)'s working directory. User process 2405(b) next opens/mnt/term/env/cpudir, does a read on it, and executes the shell specifying the change directory command. The value read from "cpudir" is used as an argument in the change directory command, and as a result, the new shell begins running in the working directory of user process 2405(a). The new shell then executes a user-defined shell script which is run every time the user executes the shell and which may further personalize user process 2405(b)'s name space. Typically, the shell script will include shell commands which result in the execution of system bind calls which do the following:

bind("/mnt/term/mnt/8.5","/dev/",AFTER)

bind("/mnt/term/mnt/8.5/cons","/dev/cons",REPLACE)

The first bind call binds the files in 8.5, which are the files provided by window service 1405 to user process 2405(a), to/dev; since the AFTER option was used, all previously-bound directories will be searched for the files provided by window service 1405 before its directory will be searched. The second bind call binds the file cons provided by window service 1405 to/dev/cons./dev/cons itself is the result of an earlier binding in which the #c kernel device was bound to/dev; consequently, it is that file to which the file cons provided by window service 1405 is bound. Since REPLACE was used, the path name/dev/cons will henceforth refer to the file cons provided to user process 2405(a)

by window service 1405, and reads from cons will receive data input at the keyboard of terminal 2407(*a*), while writes to cons will display data on the screen of terminal 2407(*a*).

CONCLUSION

The foregoing Detailed Description has disclosed to those of ordinary skill in the arts to which the inventions pertain how an operating system may be constructed in which a process may have its own hierarchy of names and may modify the hierarchy. It has further been shown how a service may represent an entity as a set of files, how operations on the files may be used to control the entity, and how all services may employ the same set of file protocol messages. Additionally, the Detailed Description has disclosed how services may be constructed for the operating system which offer every process an independent tree of files and which may form a recursive hierarchy in which a first one of the services is a client of a second one of the services. Also disclosed is a novel type of user interface to a computer display which is implemented in a service employed in the operating system. There has finally been disclosed a technique whereby a process executing on one processor may employ a name space for a process executing on another processor.

While the Detailed Description describes the best mode presently known to the inventors, other modes of implementing the inventions disclosed herein will be immediately apparent to those of ordinary skill in the art once they become aware of the principles disclosed herein. For that reason, the Detailed Description is to be understood as being in all respects exemplary, but not restrictive, and the scope of the invention is to be determined not from the Detailed Description, but rather from the appended claims as interpreted in light of the Detailed Description and the doctrine of equivalents.

What is claimed is:

1. An improved computer system, the improved computer system executing a multiprocess operating system, the multiprocess operating system creating a plurality of processes for executing programs and one or more name spaces, each of the processes being associated with a current one of the name spaces and the name space associated with a given process being a set of names of entities in the computer given process being the set of names of entities in the computer system which are referencable by the given process in executing its program, and the improvement comprising:

new name space creation means in the operating system which are usable by any one of the processes in executing its program to create a new name space for the process executing the program which is separate from the current name. space for the process and replaces the current name space for the process.

2. The computer system set forth in claim 1 wherein:

the set of names in the new name space is organized as a single tree of names.

3. The computer system of claim 1 wherein:

in using the new name space creation means, the process executing the program either specifies that the new name space creation means create a new name space which contains the names from the process's present name space or create a new name space which is empty and the new name space creation means responds as specified by the process.

4. The computer system of claim 1 wherein:

the operating system funher includes means which are usable by any one of the processes in executing its program to make any of the entities accessible to the process; and once one of the entities has been made accessible to the process, the accessibility is not affected by creation of a new name space for the process.

5. The computer system of claim 1 further comprising:

one or more service means for providing a set of files which have file names and which represent entities controlled by the service means in response to operations on the named files and file operation means available to the processes for making files with names in the process's name space accessible to the process and performing operations on the accessible files; and current name space modification means for changing the binding of a name in the name space by relating the file names to the name.

6. The computer sstem set forth in claim 1 further comprising:

current name space modification means which are usable by any one of the processes in executing its program to change a binding of any name within the current name space for the process to another name in the current name space.

7. The computer system of claim 6 wherein:

the set of names in each name space is organized as a single tree of names.

8. The computer system of claim 7 wherein:

the operating system provides a set of predefined names which is organized as a stub tree to the current name space modification means and the current name space modification means binds the stub tree to the root of the single tree of names.

9. The computer system set forth in claim 6 wherein:

the current name space modification means changes the binding of a first name in the name space by relating the first name to a set of names of the entities.

10. The computer system set forth in claim 9 wherein:

the set of names being related to the first name is a set of names which is already in the name space.

11. The computer system set forth in claim 9 wherein:

the current name space modification means changes the binding of the first name by relating the first name to a further set of names of the entities.

12. The computer system set forth in claim 11 wherein:

when the current name space modification means relates the first name to the further set of names, the current name space modification means operates in the alternative to replace the set of names currently related to the first name with the further set of names and to union the tunher set of names to the set of names currently related to the first name.

13. The computer system set forth in claim 12 wherein:

when the current name space modification means operates to union the further set of names to the set of names currently related to the first name, the current name space modification means responds to a specification by the process executing its program of how the names currently related to the first name are to be ordered with respect to the names in the further set of names by ordering them according to the specification.

14. The computer system set forth in claim 9 wherein:

the set of names which are being related to the first name are added thereby to the current name space.

15. The computer system set forth in claim 14 wherein:

the multiprocess operating system does not enter a special mode when the process executing its program uses the current name space modification means.

16. The computer system set forth in claim 14 wherein:

the set of names is a tree thereof and the current name space modification means relates the first name to a root of the tree.

17. The computer system set forth in claim 14 further comprising:

service means in the operating system for providing the set of names and performing operations on a set of entities represented by the set of names.

18. The computer system set forth in claim 17 wherein:

the set of entities represented by the set of names provided by the service means is unique for each process which adds the set of names to its name space.

19. The computer system set forth in claim 17 wherein:

the service means is one of a plurality thereof; and each of the service means uses an identical set of operations to control the entities represented by the set of names provided by the service means.

20. The computer system set forth in claim 19 wherein:

certain of the service means are protocol service means; and communication between the process and the protocol service means is by means of a protocol which is the same for all protocol service means.

21. The computer system set forth in claim 20 wherein:

the computer system runs in a distributed computing system which includes components connected by communications means;

certain of the protocol service means are located on components remote to the component upon which the process is executing; and communication between the process and a protocol service means located on a remote component is by means of the communications means.

* * * * *

UNITED STATES PATENT AND TRADEMARK OFFICE
CERTIFICATE OF CORRECTION

PATENT NO. : 5,623,666
DATED : April 22, 1997
INVENTOR(S) : Pike et al.

It is certified that error appears in the above-indentified patent and that said Letters Patent is hereby corrected as shown below:

Column 51, Line 54: "current name. space"
                should read --current name space--.

Signed and Sealed this

Second Day of September, 1997

BRUCE LEHMAN

*Attest:*

*Attesting Officer*         *Commissioner of Patents and Trademarks*